United States Patent
Bass et al.

(10) Patent No.: US 12,486,516 B2
(45) Date of Patent: Dec. 2, 2025

(54) MODIFICATION OF GLUTAMINE SYNTHETASE TO IMPROVE YIELD IN PLANTS

(71) Applicant: PIONEER HI-BRED INTERNATIONAL, INC., Johnston, IA (US)

(72) Inventors: Steven Henry Bass, Hillsborough, CA (US); Ericka Bermudez, Aptos, CA (US); Zhenglin Hou, Ankeny, IA (US); Shai Lawit, Urbandale, IA (US); Marian Beecher Sandoval, Oakland, CA (US); Bo Shen, Johnston, IA (US); Peter Thelen, Des Moines, IA (US); Yang Wang, Johnston, IA (US); Robert W Williams, Minneapolis, MN (US); Jingrui Wu, Johnston, IA (US); Jun Zhang, Johnston, IA (US)

(73) Assignee: PIONEER HI-BRED INTERNATIONAL, INC., Johnston, IA (US)

( * ) Notice: Subject to any disclaimer, the term of this patent is extended or adjusted under 35 U.S.C. 154(b) by 0 days.

(21) Appl. No.: 17/056,817

(22) PCT Filed: May 20, 2019

(86) PCT No.: PCT/US2019/033130
§ 371 (c)(1),
(2) Date: Nov. 19, 2020

(87) PCT Pub. No.: WO2019/226553
PCT Pub. Date: Nov. 28, 2019

(65) Prior Publication Data
US 2021/0180079 A1  Jun. 17, 2021

Related U.S. Application Data

(60) Provisional application No. 62/674,250, filed on May 21, 2018.

(51) Int. Cl.
*C12N 15/82* (2006.01)
*C12N 9/00* (2006.01)

(52) U.S. Cl.
CPC ........... *C12N 15/8251* (2013.01); *C12N 9/93* (2013.01); *C12N 15/8261* (2013.01); *C12Y 603/01002* (2013.01)

(58) Field of Classification Search
None
See application file for complete search history.

(56) References Cited

U.S. PATENT DOCUMENTS

| 9,416,367 | B2 | 8/2016 | Mclaren et al. | |
|---|---|---|---|---|
| 2004/0034888 | A1* | 2/2004 | Liu et al. | C07H 21/04 536/23.6 |
| 2007/0039067 | A1* | 2/2007 | Feldmann et al. | C07K 14/415 536/23.6 |
| 2011/0265221 | A1* | 10/2011 | Abad et al. | C12N 15/8271 435/317.1 |
| 2016/0108415 | A1 | 4/2016 | Gupta et al. | |

FOREIGN PATENT DOCUMENTS

| EP | 1 586 652 A1 * | 9/2005 |
|---|---|---|
| WO | WO 2010/039750 A2 * | 4/2010 |
| WO | WO 2015/026886 A1 * | 2/2015 |
| WO | SA * PCT/US2019/033130 | 10/2019 |
| WO | WO2019/226553 A1 * | 11/2019 |

OTHER PUBLICATIONS

Watanabe et al. (1994) Plant Mol Biol 26:1807-17.*
Hill & Preiss (1998) Biochem Biophys Res Commun 244(2):573-77.*
Guo et al. (2004) Proc Natl Acad Sci USA 101:9205-10.*
Miao & Verma (1993) Swiss-Prot: P32289.1.*
Varshney et al. (1993) A0A151U9S3_CAJCA.*
Limani et al., NP_001105297; glutamine synthetase root isozyme 5 [*Zea mays*] (2010).*
Konishi, Noriyuki; et al.: "Contributions of two cystosolic glutamine sythetase isozymes to ammonium assimilation in *Arabidopsis* roots", Journal of Experimental Botany, Dec. 21, 2016 (Dec. 21, 2016), vol. 68, Iss. 3, pp. 613-625.
Perchlik, Molly; et al.: "Improving Plant Nitrogen Use Efficiency through Alteration of Amino Acid Transport Processes", Plant Physiology, Jul. 21, 2017 (Sep. 21, 2017), vol. 175, Iss. 1, pp. 235-247.
International Search Report and Written Opinion for International Application No. PCT/US2019/033130, Mailed Oct. 4, 2019.
International Preliminary Report on Patentability for International Application No. PCT/US2019/033130, mailed Dec. 3, 2020, 8 Pages.
Masalkar P.D., et al., "Glutamine Synthetase Cytosolic Isozyme 1 [Glycine max]," NCBI Accession No. NP_001238531.2, 2015, 2 Pages.

* cited by examiner

*Primary Examiner* — Russell T Boggs

(57) ABSTRACT

Provided are compositions comprising polynucleotides encoding glutamine synthetase (GS) polypeptides having improved properties, such as increased enzymatic activity and/or increased thermostability. Also provided are recombinant DNA constructs, plants, plant cells, seed, grain comprising the polynucleotides. Additionally, various methods of employing the polynucleotides in plants, such as methods for increasing GS activity in a plant, methods for increase seed protein content in a seed of a plant, and methods for increasing yield of a plant, are also provided herein.

16 Claims, 12 Drawing Sheets

Figure 1A:
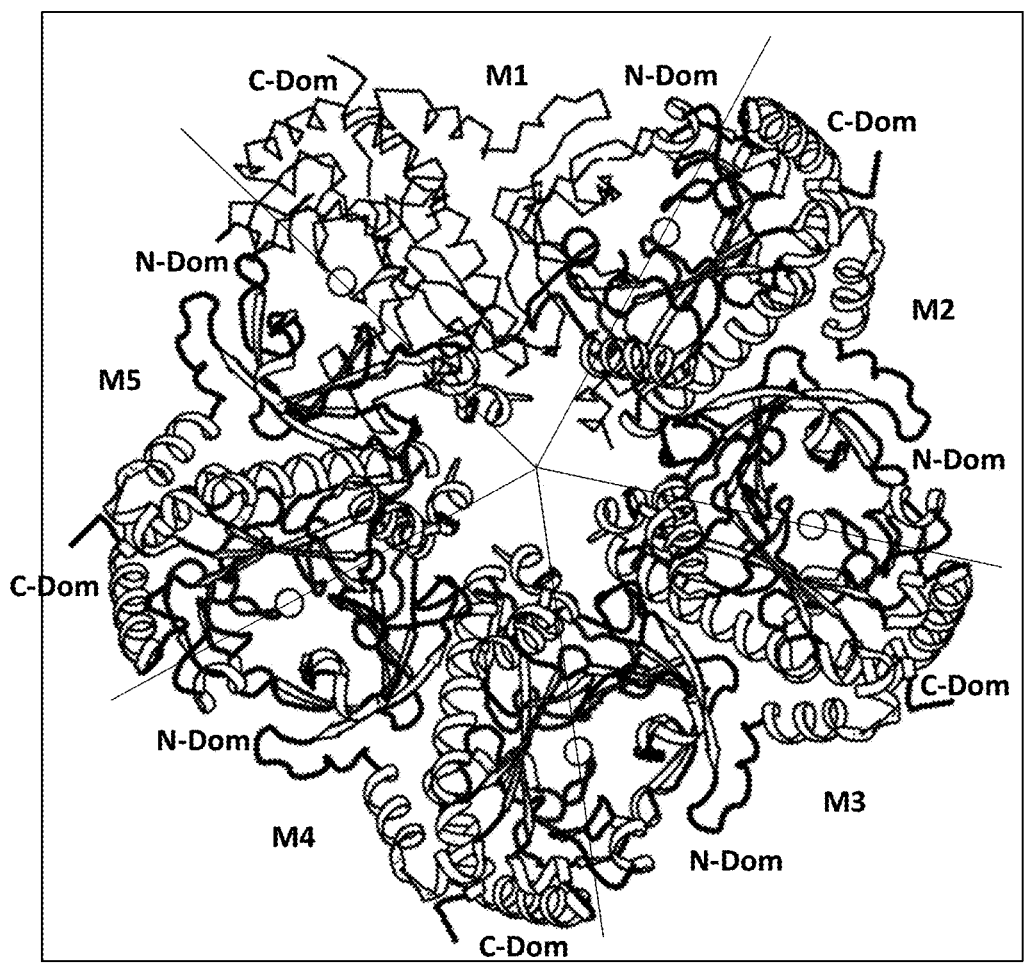

Specification includes a Sequence Listing.

Fig. 3A

| | | 1 | 70 |
|---|---|---|---|
| ZM-GS1-5 | (1) | ---------------------------------------------------------------------- | MASLTDLVNL |
| ZmGS1-5_B1 | (1) | ---------------------------------------------------------------------- | MALTDLVNL |
| Gm-GS1α1 | (1) | ---------------------------------------------------------------------- | MSLLSDLINL |
| Gm-GS1α2 | (1) | ---------------------------------------------------------------------- | MSLLSDLINL |
| Gm-GS1γ1 | (1) | ---------------------------------------------------------------------- | MSLLSDLINL |
| Gm-GS1γ2 | (1) | ---------------------------------------------------------------------- | MSLLSDLINL |
| Gm-GS1β1 | (1) | ---------------------------------------------------------------------- | MSLLSDLINL |
| Gm-GS1β2 | (1) | ---------------------------------------------------------------------- | MSLLSDLINL |
| Gm-GS2-1 | (1) | MAQILAPSTQWQMRISKSKSSPNATPITSNMWSSLLWKQNKKVSPTSSAKFRVLAIKSDNSTINRLEGLLNL | |
| Gm-GS2-2 | (1) | MAQILAPSTQWQMRISKSKSSPNASPITSNMWSSLLWKQNKKVSPTSSAKFRVMAIKSDNSIINRLEGLLNL | |

Fig. 3B

```
                 71                                                                              140
ZM-GS1-5    (11) DLSDCTDRIIAEYIWVGGSGIDLRSKARTVKGPITDPSQLPKWNYDGSSTGQAPGEDSEVILYPQAIFKD
ZmGS1-5_B1  (11) DLSDNTDRIIAEYIWVGGSGIDLRSKARTVSGPITDPSQLPKWNYDGSSTGQAPGEDSEVILYPQAIFKD
Gm-GS1α1    (11) NLSESTEKIIAEYIWVGGSGMDLRSKARTLPGPVSDPAKLPKWNYDGSSTDQAPGDDSEVILYPQAIFKD
Gm-GS1α2    (11) NLSESTEKIVAEYIWVGGSGMDLRSKARTLPGPVSDPAKLPKWNYDGSSTDQAPGDDSEVILYPQAIFKD
Gm-GS1γ1    (11) NLSDITDKVIAEYIWVGGSGMDMRSKARTLSGPVKDPSKLPKWNYDGSSTGQAPGQDSEVILYPQAIFKD
Gm-GS1γ2    (11) NLSDITDKVIAEYIWVGGSGMDMRSKARTLSGLVNDPSKLPKWNYDGSSTGQAPGQDSEVILYPQAIFKD
Gm-GS1β1    (11) NLSDTTEKVIAEYIWVGGSGMDLRSKARTLPGPVSDPSELPKWNYDGSSTGQAPGEDSEVILYPQAIFKD
Gm-GS1β2    (11) NLSDTTEKVIAEYIWIGGSGMDLRSKARTLPGPVSDPSKLPKWNYDGSSTGQAPGEDSEVIIYPQAIFRD
Gm-GS2-1    (71) DITPFTDKIIAEYIWIGGTGIDVRSKSRTISKPVEDPSELPKWNYDGSSTGQAPGDDSEVILYPQAIFRD
Gm-GS2-2    (71) DITPFTDKIIAEYIWIGGTGIDVRSKSRTISKPVEHPSELPKWNYDGSSTGQAPGDDSEVILYPQAIFRD
```

Fig. 3C

```
                    141                                                                              210
ZM-GS1-5     (81)   PFRKGNNILVMCDCYTPQGEPIPSNKRYKAATVFSHPDVAAEVPWYGIEQEYTLLQKDVSWPLGWPVGGY
ZmGS1-5_B1   (81)   PFRKGNNILVMCDCYTPQGEPIPSNKRYNAATVFSHPDVAAEEPWYGIEQEYTLLQKDVSWPLGWPVGGY
Gm-GS1α1     (81)   PFRRGNNILVICDVYTPAGEPLPTNKRYGAAKIFSHPDVAAEEPWYGIEQEYTLLQKDVNWPLGWPVGGF
Gm-GS1α2     (81)   PFRRGNNILVICDVYTPAGEPLPTNKRYDAAKIFSHPDVAAEEPWYGIEQEYTLLQKDVNWPLGWPVGGF
Gm-GS1γ1     (81)   PFRRGSNILVMCDAYTPAGEPIPTNKRNNAAKIFGHPDVAAEEPWYGLEQEYTLLQKDVQWPLGWPLGGF
Gm-GS1γ2     (81)   PFRRGNNILVMCDAYTPAGEPIPTNKRNKAAKIFSNPDVAAEEPWYGIEQEYTLLQKDVQWPLGWPLGGF
Gm-GS1β1     (81)   PFRRGNNILVICDAYTPAGEPIPTNKRHAAAKVFSHPDVVAEVPWYGIEQEYTLLQKDIQWPLGWPVGGF
Gm-GS1β2     (81)   PFRRGNNILVICDTYTPAGEPIPTNKRHDAAKVFSHPDVVAEETWYGIEQEYTLLQKDIQWPLGWPVGGF
Gm-GS2-1    (141)   PFRGGNNILVICDSYTPQGEPIPTNKRHRAAEIFSNPKVQAEVPWYGIEQEYTLLQTNVKWPLGWPVGGY
Gm-GS2-2    (141)   PFRGGNNILVICDSYTPQGEPIPTNKRHRAAEIFSNPKVQAEVPWYGIEQEYTLLQTNVKWPLGWPVGGY
```

Fig. 3D

| | | 211 | | 280 |
|---|---|---|---|---|
| ZM-GS1-5 | (151) | PGPQGPYYCAAGADKAFGRDVVDAHYKACLYAGINISGINGEVMPGQWEFQVGPSVGISAGDEIWVARYI | | |
| ZmGS1-5_B1 | (151) | PGPQGPYYCAVGADKAFGRDVADAHYKACLYAGINISGINGEVMPGQWEFQVGPSVGISAGDEIWVARYI | | |
| Gm-GS1α1 | (151) | PGPQGPYYCGIGADKAYGRDIVDAHYKACIYAGINISGINGEVMPGQWEFQVGPSVGISAGDEVWAARYI | | |
| Gm-GS1α2 | (151) | PGPQGPYYCGTGADKAYGRDIVDAHYKACIYAGINISGINGEVMPGQWEFQVGPSVGISAGDEVWAARYI | | |
| Gm-GS1γ1 | (151) | PGPQGPYYCGTGANKAFGRDIVDSHYKACIYAGINISGINGEVMPGQWEFQVGPSIGISAADELWVARYI | | |
| Gm-GS1γ2 | (151) | PGPQGPYYCGTGANKAFGRDIVDSHYKACIYAGINISGINGEVMPGQWEFQVGPSVGISAADELWVARYI | | |
| Gm-GS1β1 | (151) | PGPQGPYYCGVGADKAFGRDIVDAHYKACIYAGINISGINGEVMPGQWEFQVGPSVGISAGDEIWAARYI | | |
| Gm-GS1β2 | (151) | PGPQGPYYCGVGADKAFGRDIVDAHYKACIYAGINISGINGEVMPGQWEFQVGPSVGISAGDEVWAARYI | | |
| Gm-GS2-1 | (211) | PGPQGPYYCSAGADKSFGRDISDAHYKACLYAGINISGTNGEVMPGQWEYQVGPSVGIEAGDHIWASRYI | | |
| Gm-GS2-2 | (211) | PGPQGPYYCSAGADKSFGRDISDAHYKACLYAGINISGTNGEVMPGQWEYQVGPSVGIEAGDHIWASRYI | | |

Fig. 3E

```
              281                                                                                     350
ZM-GS1-5    (221) LERITEMAGIVLSLDPKPIKGDWNGAGAHTNYSTKSMREAGGYYEVIKEAIEKLGKRHREHIAAYGEGNER
ZmGS1-5_B1  (221) LERITEMAGIVLSLDPKPIKGDWNGAGAHTNYSTKSMREAGGYYEVIKAAIRKLGKRHREHIAAYGEGNER
Gm-GS1α1    (221) LERITEIAGAIVSFDPKPIPGDWNGAGAHSNYSTKSMREEGGYYEVIKKAIEKLGLRHKEHIAAYGEGNER
Gm-GS1α2    (221) LERITEMAGIVSFDPKPIPGDWNGAGAHSNYSTKSMREEGGYYEVIKKAIEKLGLRHKEHIAAYGEGNER
Gm-GS1γ1    (221) LERITEIAGVVLSFDPKPIQGDWNGAGAHTNYSTKSMRDEGGYYEVIKKAIAKLEKRHKEHIAAYGEGNER
Gm-GS1γ2    (221) LERITEIAGVVLSFDPKPIQGDWNGAGAHTNYSTKLMRNDGGYYEIIKKAIAKLEKRHKEHIAAYGEGNER
Gm-GS1β1    (221) LERITEIAGVVVSFDPKPIKGDWNGAGAHTNYSTKSMREDGGYYEVIKAAIDKLGKKHKEHIAAYGEGNER
Gm-GS1β2    (221) LERITEIAGVVVSFDPKPIQGDWNGAGAHTNYSTKSMRNDGGYYEVIKTAIEKLGKRHREHIAAYGEGNER
Gm-GS2-1    (281) LERITEQAGVVLSLDPKPIEGDWNGAGCHTNYSTKSMREDGGFEVIKKAILNLSLRHKDHISAYGEGNER
Gm-GS2-2    (281) LERITEQAGVVLSLDPKPIEGDWNGAGCHTNYSTKSMREDGGFEVIKKAILNLSLRHKDHISAYGEGNER
```

Fig. 3F

```
                351                                                          420
ZM-GS1-5   (291) RLTGRHETADINTFKWGVANRGASIRVGRDTEKEGKGYFEDRRPASNMDPYVVTGMIADTTILWKGN----
ZmGS1-5_B1 (291) RLTGRHETADINTFSWGVANRGASIRVGRDTEKEGKGYFEDRRPASNMDPYVVTGMIADTTILWKGN----
Gm-GS1α1   (291) RLTGRHETADINTFSWGVANRGSSIRVGRDTEKNGKGYFEDRRPASNMDPYVVTSMIAETTILWKP----
Gm-GS1α2   (291) RLTGRHETADINTFSWGVANRGSSIRVGRDTEKNGKGYFEDRRPASNMDPYVVTSMIAETTILWKP----
Gm-GS1γ1   (291) RLTGRHETADINTFVWGVANRGASIRVGRDTEKAGKGYFEDRRPASNMDPYVVTSMIADTTILWKP----
Gm-GS1γ2   (291) RLTGRHETADMNTFVWGVANRGASIRVGRDTEKAGKGYFEDRRPASNMDPYVVTSMIADTTILWKP----
Gm-GS1β1   (291) RLTGRHETADMNTFLWGVANRGASIRVGRDTEKAGKGYFEDRRPASNMDPYVVTSMIAETTILWKP----
Gm-GS1β2   (291) RLTGRHETADINTFLWGVANRGASVRVGRDTEKAGKGYFEDRRPASNMDPYVVTSMIADTTILWKP----
Gm-GS2-1   (351) RLTGKHETASINTFSWGVANRGCSIRVGRDTEKNGKGYLEDRRPASNMDPYVVTSLLAETTLLWEPTLEA
Gm-GS2-2   (351) RLTGKHETASINTFSWGVANRGCSIRVGRDTEKNGKGYLEDRRPASNMDPYVVTSLLAETTLLWEPTLEA
```

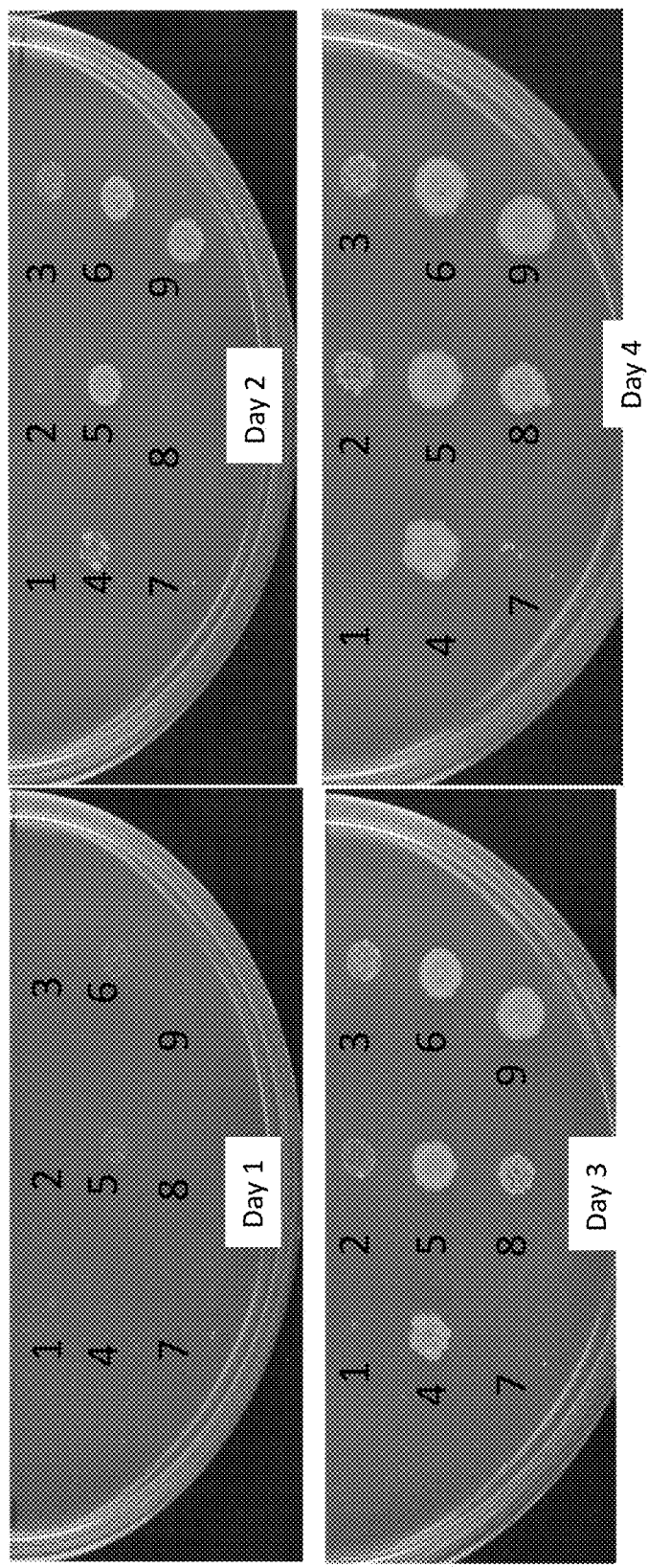

MODIFICATION OF GLUTAMINE SYNTHETASE TO IMPROVE YIELD IN PLANTS

CROSS-REFERENCE TO RELATED APPLICATIONS

This application is a 371 National Stage Entry of PCT Application No. PCT/US2019/033130 filed on May 20, 2019, which claims the benefit of U.S. Provisional Application No. 62/674,250 filed on May 21, 2018, each of which are incorporated herein by reference in their entirety.

REFERENCE TO SEQUENCE LISTING SUBMITTED ELECTRONICALLY

The official copy of the sequence listing is submitted electronically via Patent Center as an ASCII formatted sequence listing with a file named 7772_Sequence-Listing_ST25 created on Nov. 28, 2023, and having a size of 323,062 bytes and is filed concurrently with the specification. The sequence listing comprised in this ASCII formatted document is part of the specification and is herein incorporated by reference in its entirety.

FIELD

This disclosure relates generally to the field of molecular biology.

BACKGROUND

Nitrogen (N) is the most abundant inorganic nutrient taken up by plants for growth and development. In maize, roots absorb most of the N from the soil in the form of nitrate, the majority of which is transported to the leaf for reduction and assimilation. Nitrate is reduced to nitrite by nitrate reductase (NR) in the cytosol, which is then transported into chloroplasts where it is reduced by nitrite reductase (NiR) to ammonium. Ammonium is then assimilated into glutamine by the glutamine synthase-glutamate synthase system (Crawford and Glass, (1998) *Trends in Plant Science* 3:389-395). In soybean, plants can obtain nitrogen through the process of nitrogen fixation, which results from the symbiotic relationship between soybean and *rhizobia*.

In maize production, N is the most commonly applied nutrient and one of the costliest inputs. In soybean production, as yields continue to increase over time nitrogen fixation may become insufficient to meet nitrogen requirements for high yields. Accordingly, increased N use efficiency has been sought as a valuable agronomic trait for farmers to both increase productivity and decrease inputs. Therefore, there is a need to develop new compositions and methods to improve N use efficiency and increase productivity in plants. This invention provides such compositions and methods.

SUMMARY

Provided herein are polynucleotides encoding glutamine synthetase (GS) polypeptides comprising an amino acid sequence that is at least 80% identical to SEQ ID NO: 1, 2, or 3, wherein the amino acid sequence contains a mutation at one or more amino acid residues corresponding to position S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, or D320 of SEQ ID NO: 1. In some embodiments, the one or more mutations is selected from the group comprising S3L, S3C, T5S, V8I, D11N, D14G, C15N, C15T, C15R, R18K, V26I, S29T, L33V, K41S, K41P, Y55F, K79R, K84R, Y108H, K109S, K109N, K109G, V113I, D118E, V123E, Y126F, A161I, A161V, V171I, V172A, I230V, E268K, E268A, E271G, E271D, E271R, R278K, E286D, K305S, K305V, D320E, and D320Q of SEQ ID NO: 1, or a position corresponding thereto.

Also provided are polynucleotides encoding glutamine synthetase (GS) polypeptides comprising an amino acid sequence that is at least 80% identical to SEQ ID NO: 2, wherein the amino acid sequence contains a mutation at one or more amino acid residues corresponding to positions L3, S5, I8, N11, D14, T15, K18, I26, S29, L33, P41, Y55, R79, R84, H108, A109, V113, D118, V123, Y126, V161, I171, V172, V230, A268, D271, K278, E286, L305, and D320 of SEQ ID NO: 2. In some embodiments, the one or more mutations of the encoded GS polypeptide is selected from the group consisting of L3C, D14G, T15N, T15R, S29T, L33V, P41S, Y55F, A109S, A109N, A109G, V113I, D118E, V123E, Y126F, V161I, V172A, A268K, D271G, D271R, E286D, L305S, L305V, D320E, and D320Q.

Further provided are polynucleotides encoding glutamine synthetase (GS) polypeptides comprising an amino acid sequence that is at least 80% identical to SEQ ID NO: 3, wherein the amino acid sequence contains a mutation at one or more amino acid residues corresponding to positions L3, S5, I8, N11, D14, I15, K18, V26, S29, M33, S41, Y55, K79, R84, N108, N109, I113, D118, E123, Y126, T161, I171, V172, V230, K268, A271, K278, E286, V305, and D320 of SEQ ID NO: 3. In some embodiments, the one or more mutations of the encoded GS polypeptide is selected from the group comprising L3C, D14G, I15T, I15N, I15R, V26I, S29T, M33V, S41P, Y55F, K79R, N108H, N109S, N109G, D118E, Y126F, T161I, T161V, V172A, K268A, A271G, A271D, A271R, E286D, V305S, D320E, and D320Q.

Also provided are recombinant DNA constructs comprising a polynucleotide encoding any of the glutamine synthetase (GS) polypeptides described herein. In some embodiments, the polynucleotide is operably linked to a heterologous regulatory element.

Further provided are plants, plant cells, and seeds comprising a polynucleotide encoding any of the GS polypeptides described herein or a recombinant DNA construct comprising a polynucleotide encoding any of the GS polypeptides described herein.

Provided are methods for increasing glutamine synthetase (GS) activity, increasing yield, and/or increase seed protein content in a plant, the methods comprising expressing in the plant a polynucleotide encoding any of the GS polypeptides described herein. In some embodiments, the method comprises: (a) expressing in a regenerable plant cell a recombinant DNA construct comprising a polynucleotide encoding any of the GS polypeptides described herein; and (b) generating the plant, wherein the plant comprises in it genome the recombinant DNA construct. In some embodiments, the method comprises: (a) modifying an endogenous GS gene in a plant cell to encode any of the GS polypeptides described herein; and (b) growing a plant from the plant cell, wherein the plant has an increased GS activity compared to a plant that does not comprise the mutation.

In some embodiments, the method comprises: (a) providing a guide RNA, at least one polynucleotide modification template, and at least one Cas endonuclease to a plant cell, wherein the at least one Cas endonuclease introduces a double stranded break at an endogenous GS gene in the plant cell, and wherein the polynucleotide modification template generates a modified GS gene that encodes any of the GS polypeptides described herein; (b) obtaining a plant from the plant cell; and (c) generating a progeny plant that has increased GS activity compared to the unmodified plant.

Also provided is a polynucleotide modification template comprising a polynucleotide sequence encoding a region of SEQ ID NO: 1 comprising a mutation at one or more amino acid residues corresponding to positions S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1.

Also provided is a polynucleotide modification template comprising a polynucleotide sequence encoding a region of SEQ ID NO: 2 comprising a mutation at one or more amino acid residues corresponding to positions L3, S5, I8, N11, D14, T15, K18, I26, S29, L33, P41, Y55, R79, R84, H108, A109, V113, D118, V123, Y126, V161, I171, V172, V230, A268, D271, K278, E286, L305, and D320 of SEQ ID NO: 2.

Also provided is a polynucleotide modification template comprising a polynucleotide sequence encoding a region of SEQ ID NO: 3 comprising a mutation at one or more amino acid residues corresponding to positions L3, S5, I8, N11, D14, I15, K18, V26, S29, M33, S41, Y55, K79, R84, N108, N109, I113, D118, E123, Y126, T161, I171, V172, V230, K268, A271, K278, E286, V305, and D320 of SEQ ID NO: 3.

BRIEF DESCRIPTION OF THE DRAWINGS AND THE SEQUENCE LISTING

The disclosure can be more fully understood from the following detailed description and the accompanying drawings and Sequence Listing that form a part of this application, which are incorporated herein by reference.

FIG. 1A depicts the structure of the maize GS1-5 pentamer. M1 to M5 are the 5 monomers and M1 is shown in Cα line trace while M2, M3, M4, and M4 are drawn as a cartoon structure. The monomer-monomer interface boundaries are delineated by five-fold symmetric star-fish lines. The circles at interfaces indicate the active sites. For each monomer, the N-domain and C-domain structures are labeled.

Figure 1B:
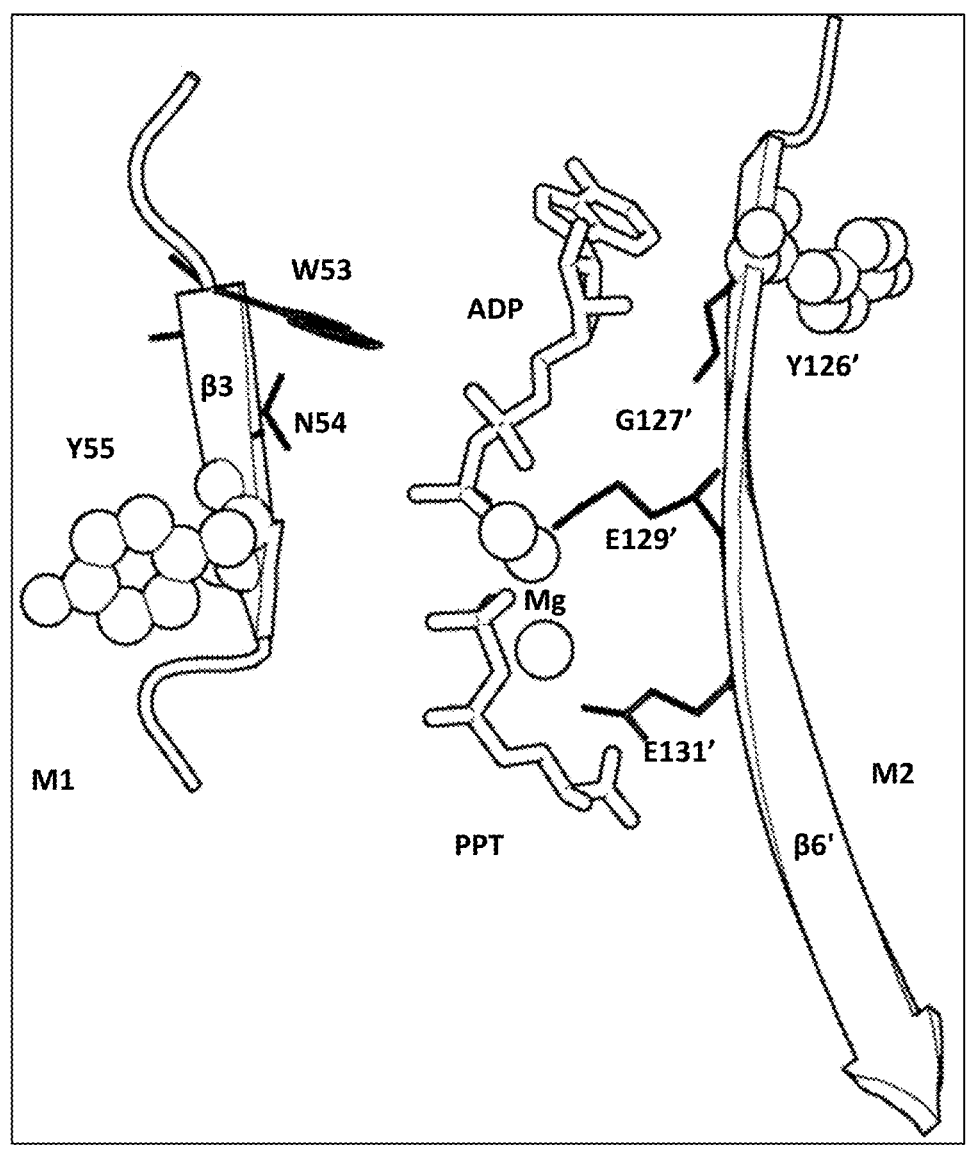

FIG. 1B illustrates the substituted amino acid residues of the GS1-5 variant G12, which has two key substituted residues, Y55 and Y126, near the active site. Ribbons represent two opposite β-strands of the active-site barrel. ADP and PPT and Mgs depict the ligand orientation in transition state. Y55 and Y126' in next monomer are drawn as circles.

Figure 1C:
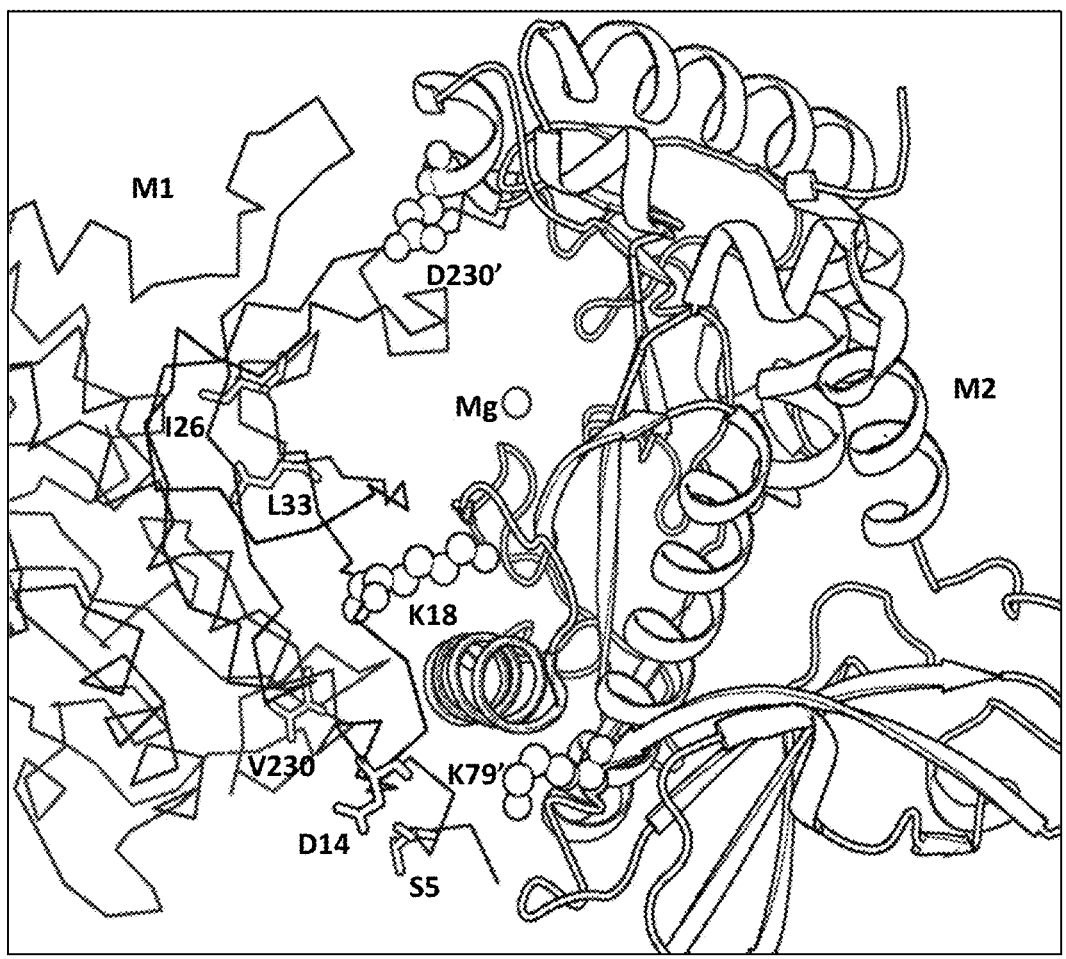

FIG. 1C illustrates the influential mutations in GS1-5 variants D8, E8, and B9. Monomer-monomer interface and the active-site (Mg) are shown. M1 is in Cα line trace while the cartoon structure represents M2.

Figure 1D:
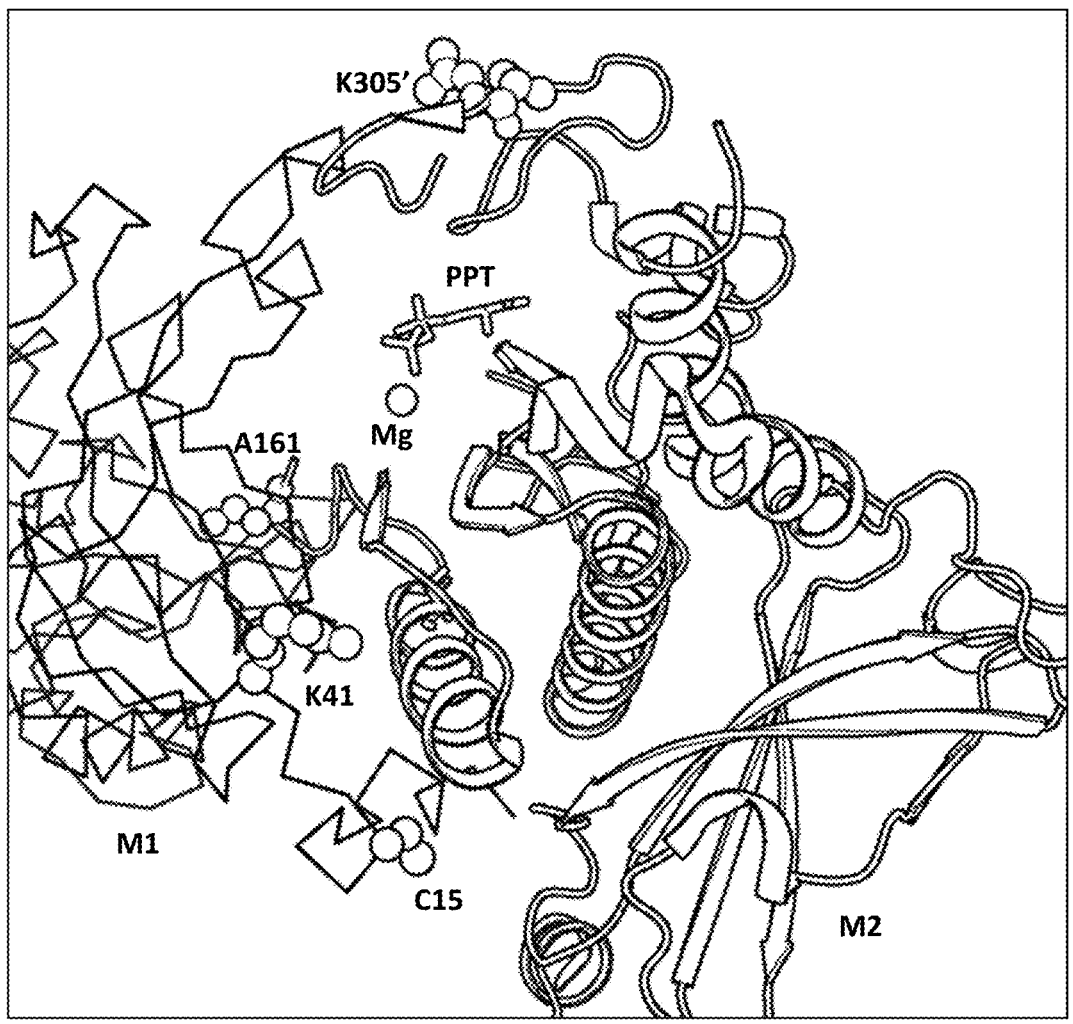

FIG. 1D illustrates the beneficial amino acid substitutions in the GS1-5 variant B1. PPT (phosphinothricin phosphate) depicts a key reaction intermedia, phosphoryl-glutamate. M1 is represented by Cα line trace while M2 is represented by a cartoon structure.

Figure 2:
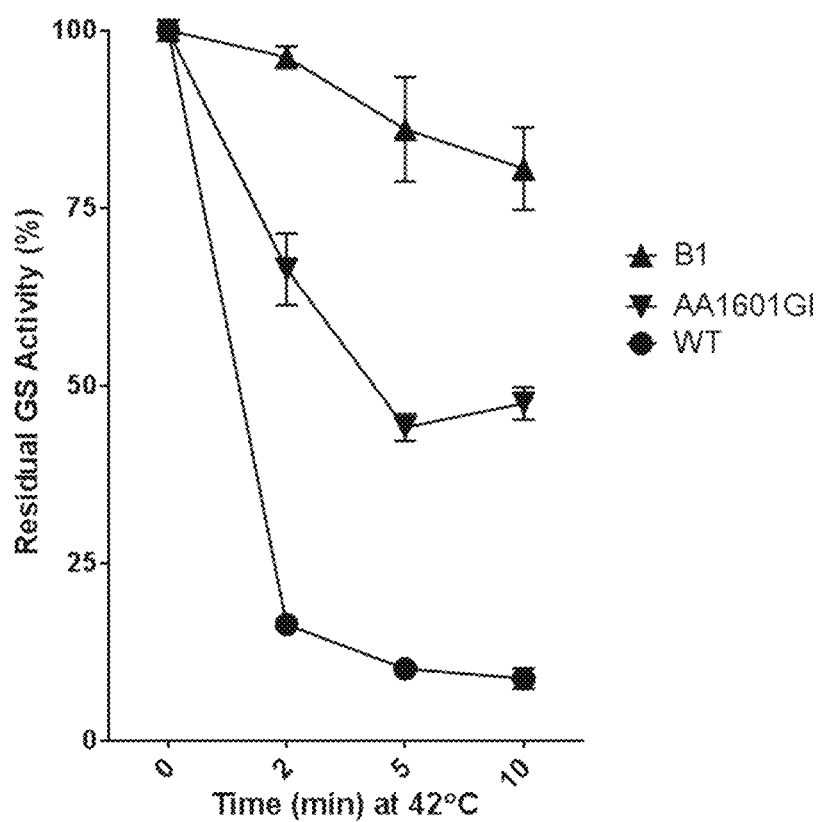

FIG. 2 is a graph of experimental results from studies comparing the thermostability of GS1-5 variants B1 and AA160/161GI to the wild-type GS1-5 polypeptide. Residual glutamine synthetase (GS) enzymatic was measured for each protein after incubation at 42° C. for 0, 2, 5, or 10 minutes.

FIG. 3A-3F provides a sequence alignment of Z. mays (Zm) GS1-5 (SEQ ID NO: 1), ZmGS1-5_B1 (SEQ ID NO: 4), Glycine max (Gm) GS1α1 (SEQ ID NO: 63), Gm-GS1α2 (SEQ ID NO: 64), Gm-GS1γ1 (SEQ ID NO: 3), Gm-GS1γ2 (SEQ ID NO: 68), Gm-GS1β1 (SEQ ID NO: 2), Gm-GS5β2 (SEQ ID NO: 67), Gm-GS2-1 (SEQ ID NO: 65), and Gm-GS2-2 (SEQ ID NO: 66). Beneficial amino acid modifications in the ZmGS1-5_B1 variant are underlined.

FIG. 4 provides the experimental results of the E. coli ΔglnA complementation assay. E. coli ΔglnA were transformed with vectors expressing: 1 control, 2 Zm-GS1-5 wild-type; 3. Zm-GS1-5 B1, 4. Gm-GS1β1 wild-type; 5. Gm-GS1β1-5AA; 6. Gm-GS1β1-7AA; 7. Gm-GS1γ1 wild-type; 8. Gm-GS1γ1-4AA; or 9. Gm-GS1γ1-6AA and grown on media. Colony growth indicates GS activity and the level of growth corresponds to the level of activity (i.e., increased colony growth indicates increased GS activity).

The sequence descriptions summarize the Sequence Listing attached hereto, which is hereby incorporated by reference. The Sequence Listing contains one letter codes for nucleotide sequence characters and the single and three letter codes for amino acids as defined in the IUPAC-IUB standards described in *Nucleic Acids Research* 13:3021-3030 (1985) and in the *Biochemical Journal* 219(2):345-373 (1984).

TABLE 1

Sequence Listing Description

| Polypeptide SEQ ID NO: | Polynucleotide SEQ ID NO: | Species | Name | Mutation |
|---|---|---|---|---|
| 1 | 73 | Zea mays | GS1-5 Wild-type | |
| 2 | 74 | Glycine max | GS1 β1 Wild-type | |
| 3 | 75 | Glycine max | GS1 γ1 Wild-type | |
| 4 | 76 | Zea mays | GS1-5 Variant B1 | S3L, C15N, K41S, K109N, V123E, A161V, V172A, E268A, E271R, K305S |
| 5 | 77 | Zea mays | GS1-5 Variant G12 | Y55F, K79R, Y108H, Y126F, E286D |
| 6 | 78 | Zea mays | GS1-5 Variant B9 | T5S, V8I, D11N, V26I, L33V, K84R, V113I, V171I, I230V, D320Q |
| 7 | 79 | Zea mays | GS1-5 Variant D8 | T5S, D11N, R18K, I230V, R278K, D320E |

TABLE 1-continued

Sequence Listing Description

| Polypeptide SEQ ID NO: | Polynucleotide SEQ ID NO: | Species | Name | Mutation |
|---|---|---|---|---|
| 8 | 80 | Zea mays | GS1-5 Variant E8 | T5S, D11N, R18K, V26I, S29T, V113I, I230V, R278K, D320E |
| 9 | 81 | Zea mays | GS1-5 Variant B2 | K41S, V123E, A161V, K305S |
| 10 | 82 | Zea mays | GS1-5 Variant G13 | Y55F, Y126F |
| 11 | 83 | Zea mays | GS1-5 Variant F1 | R18K, K79R, I230V, D320E |
| 12 | | Glycine max | GS1 β1-5AA Variant | T15N, P41S, V123E, V172A, L305S |
| 13 | | Glycine max | GS1 β1-7AA Variant | T15N, P41S, A109N, V123E, V172A, D271R, L305S |
| 14 | | Glycine max | GS1 γ1-4AA Variant | I15N, T161V, V172A, V305S |
| 15 | | Glycine max | GS1 γ1-6AA Variant | I15N, T161V, V172A, K268A, A271R, V305S |
| 16 | 84 | Zea mays | GS1-5 Variant | S3L |
| 17 | 85 | Zea mays | GS1-5 Variant | S3C |
| 18 | 86 | Zea mays | GS1-5 Variant | T5S |
| 19 | 87 | Zea mays | GS1-5 Variant | V8I |
| 20 | 88 | Zea mays | GS1-5 Variant | D11N |
| 21 | 89 | Zea mays | GS1-5 Variant | D14G |
| 22 | 90 | Zea mays | GS1-5 Variant | C15N |
| 23 | 91 | Zea mays | GS1-5 Variant | C15T |
| 24 | 92 | Zea mays | GS1-5 Variant | C15R |
| 25 | 93 | Zea mays | GS1-5 Variant | R18K |
| 26 | 94 | Zea mays | GS1-5 Variant | V26I |
| 27 | 95 | Zea mays | GS1-5 Variant | S29T |
| 28 | 96 | Zea mays | GS1-5 Variant | L33V |
| 29 | 97 | Zea mays | GS1-5 Variant | K41S |
| 30 | 98 | Zea mays | GS1-5 Variant | K41P |
| 31 | 99 | Zea mays | GS1-5 Variant | Y55F |
| 32 | 100 | Zea mays | GS1-5 Variant | K79R |
| 33 | 101 | Zea mays | GS1-5 Variant | K84R |
| 34 | 102 | Zea mays | GS1-5 Variant | Y108H |
| 35 | 103 | Zea mays | GS1-5 Variant | K019N |
| 36 | 104 | Zea mays | GS1-5 Variant | K019S |
| 37 | 105 | Zea mays | GS1-5 Variant | K019G |
| 38 | 106 | Zea mays | GS1-5 Variant | V113I |
| 39 | 107 | Zea mays | GS1-5 Variant | V123E |
| 40 | 108 | Zea mays | GS1-5 Variant | Y126F |
| 41 | 109 | Zea mays | GS1-5 Variant | A161V |
| 42 | 110 | Zea mays | GS1-5 Variant | A161I |
| 43 | 111 | Zea mays | GS1-5 Variant | V171I |
| 44 | 112 | Zea mays | GS1-5 Variant | V172A |
| 45 | 113 | Zea mays | GS1-5 Variant | I230V |
| 46 | 114 | Zea mays | GS1-5 Variant | D118E |
| 47 | 115 | Zea mays | GS1-5 Variant | E268K |
| 48 | 116 | Zea mays | GS1-5 Variant | E268A |
| 49 | 117 | Zea mays | GS1-5 Variant | R278K |
| 50 | 118 | Zea mays | GS1-5 Variant | E271R |
| 51 | 119 | Zea mays | GS1-5 Variant | E271G |
| 52 | 120 | Zea mays | GS1-5 Variant | E271D |
| 53 | 121 | Zea mays | GS1-5 Variant | E286D |
| 54 | 122 | Zea mays | GS1-5 Variant | K305S |
| 55 | 123 | Zea mays | GS1-5 Variant | K305V |
| 56 | 124 | Zea mays | GS1-5 Variant | D320Q |
| 57 | 125 | Zea mays | GS1-5 Variant | D320E |
| 58 | 126 | Zea mays | GS1-5 Variant | A160G, A161I |
| 59 | 127 | Zea mays | GS1-1 | |
| 60 | 128 | Zea mays | GS1-2 | |
| 61 | 129 | Zea mays | GS1-3 | |
| 62 | 130 | Zea mays | GS1-4 | |
| 63 | | Glycine max | GS1α1 | |
| 64 | | Glycine max | GS1α2 | |
| 65 | | Glycine max | GS2-1 | |
| 66 | | Glycine max | GS2-2 | |
| 67 | | Glycine max | GS1 β2 Wild-type | |
| 68 | | Glycine max | GS1 γ2 Wild-type | |

TABLE 1-continued

Sequence Listing Description

| Polypeptide SEQ ID NO: | Polynucleotide SEQ ID NO: | Species | Name | Mutation |
|---|---|---|---|---|
| 69 | 131 | D. nubigenum | GS1 | |
| 70 | 132 | C. comosum | GS1 | |
| 71 | 133 | P. caperata | GS1 | |
| 72 | 134 | A. hypochondriacus | GS1 | |

DETAILED DESCRIPTION

I. Compositions

A. Glutamine Synthetase (GS) Polynucleotides and Polypeptides

The present disclosure provides polynucleotides encoding polypeptides having glutamine synthetase (GS) activity. GS catalyzes the incorporation of ammonium into a glutamate molecule to synthesize glutamine. Accordingly, as used herein, a GS "polypeptide," "protein," or the like, refers to an enzyme that catalyzes the incorporation of ammonium into a glutamate molecule.

One aspect of the disclosure, provides a polynucleotide encoding a glutamine synthetase (GS) polypeptide comprising an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO: 1, 2, or 3, wherein the amino acid sequence contains a mutation at one or more (e.g., 2, 3, 4, 5, 6, 7, 8, 9, 10, 11, 12, 13, 14, 15, 16, 17, 18, 19, 20, 21, 22, 23, 24, 25, 26, 27, 28, 29, or 30 or more) and less than 30 (e.g., 29, 28, 27, 26, 25, 24, 23, 22, 21, 20, 19, 18, 17, 16, 15, 14, 13, 12, 11, 10, 9, 8, 7, 6, 5, 4, 3, 2) amino acid residues. The mutation may be found at a residue corresponding to position S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, or D320 of SEQ ID NO: 1, or any combination thereof.

In certain embodiments, the mutation at one or more amino acid residues corresponding to SEQ ID NO: 1 is selected from the group consisting of S3L, S3C, T5S, V8I, D11N, D14G, C15T, C15N, C15R, R18K, V26I, S29T, L33V, K41S, K41P, Y55F, K79R, K84R, Y108H, K109S, K109N, K109G, V113I, D118E, V123E, Y126F, A161I, A161V, V171I, V172A, I230V, E268K, E268A, E271G, E271D, E271R, R278K, E286D, K305S, K305V, D320E, D320Q, and any combination thereof.

As should be understood by those of ordinary skill in the art, a mutation of, for example, L33V of SEQ ID NO: 1 indicates a substitution mutation in which the leucine (L) at position 33 of SEQ ID NO: 1, or the amino acid in SEQ ID NO: 2 or 3 which corresponds to position 41 of SEQ ID NO. 1, is mutated to a valine (V).

Table 2 provides the amino acid residues in SEQ ID NOs: 2 and 3 that correspond to amino acid residues S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, or D320 of SEQ ID NO: 1.

TABLE 2

Amino Acid Residues of SEQ ID NOs: 2 and 3 Corresponding to the Site of Mutation of SEQ ID NO: 1

| SEQ ID NO: 1 | SEQ ID NO: 2 | SEQ ID NO: 3 |
|---|---|---|
| S3 | L3 | L3 |
| T5 | S5 | L5 |
| V8 | I8 | I8 |
| D11 | N11 | N11 |
| D14 | D14 | D14 |
| C15 | T15 | I15 |
| R18 | K18 | K18 |
| V26 | I26 | V26 |
| S29 | S29 | S29 |
| L33 | L33 | M33 |
| K41 | P41 | S41 |
| Y55 | Y55 | Y55 |
| K79 | R79 | K79 |
| K84 | R84 | R84 |
| Y108 | H108 | N108 |
| K109 | A109 | N109 |
| V113 | V113 | I113 |
| D118 | D118 | D118 |
| V123 | V123 | E123 |
| Y126 | Y126 | Y126 |
| A161 | V161 | T161 |
| V171 | I171 | I171 |
| E172 | V172 | V172 |
| I230 | V230 | V230 |
| E268 | A268 | K268 |
| E271 | D271 | A271 |
| R278 | K278 | K278 |
| E286 | E286 | E286 |
| K305 | L305 | V305 |
| D320 | D320 | D320 |

The "mutation" at the indicated residue of the GS polypeptides provided herein may be independently selected from an amino acid substitution, an amino acid deletion, or an amino acid addition. When the GS polypeptide comprises two or more mutations, each mutation may be the same type of mutation (i.e., substitution mutation, deletion mutation, or addition mutation) or they may be a combination of two or more types of mutations (e.g., a deletion mutation at one residue and a substation mutation at another residue).

As used herein an "amino acid deletion," "deletion mutation," or the like, refers to a mutation in which the indicated amino acid residue is removed from the polypeptide sequence, so that, when aligned to the reference sequence (e.g., SEQ ID NO: 1) the mutated sequence does not have an amino acid corresponding to the indicated position of the reference sequence. An "amino acid addition," "addition mutation," or the like, refers to a mutation in which at least one amino acid residue is added to the polypeptide sequence, so that, when aligned to the reference sequence (e.g., SEQ ID NO: 1) the mutated sequence contains an additional amino acid corresponding to the indicated position of the reference sequence.

An "amino acid substitution," "substitution mutation," or the like, refers to a mutation in which the indicated amino acid residue is replaced with a different amino acid residue, so that, when aligned to the reference sequence (e.g., SEQ ID NO: 1) the mutated sequence does not have the same amino acid at the indicated position. When the amino acid residue is substituted for a residue that has similar properties (e.g., size, charge, and/or hydrophobicity) the substitution is referred to as a conservative amino substitution. Conservative amino acid substitutions are well known in the art. For example, the following six groups contain amino acids that are considered to be conservative substitutions for one another: 1) Alanine (A), Serine (S), Threonine (T); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); and 6) Phenylalanine (F), Tyrosine (Y), Tryptophan O). Alternatively, when the amino acid residue is substituted for an amino acid that has dissimilar properties the mutation is referred to as a radical amino acid substitution.

The type of amino acid substitution (i.e., conservative or radical) in the GS polypeptides provided herein is not particularly limited, such that the GS polypeptides provided herein may contain all conservative amino acid substitutions, all radical amino acid substitutions, or a combination of radical and conservative amino acid substitutions.

In certain embodiments, the glutamine synthetase (GS) polypeptide is modified from the native sequence such that it comprises an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO: 1, 2, or 3 and does not comprise an S at position 3, an L or T at position 5, a V at position 8, a D at position 11, a D at position 14, a C or I at position 15, an R at position 18, a V at position 26, an S at position 29, an L or M at position 33, a K at position 41, a Y at position 55, a K at position 79, a K at position 84, a Y or N at position 108, a K or A at position 109, a V at position 113, a D at position 118, a V at position 123, a Y at position 126, an A at position 161, a V at position 171, a V or E at position 172, an I at position 230, an E at position 268, an E or A at position 271, an R at position 278, an E at position 286, a K or L at position 305, or a D at position 320, or any combination thereof.

In certain embodiments, the glutamine synthetase (GS) polypeptide is modified from the native sequence such that it comprises an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO: 1 and does not comprise an S at position 3, an L or T at position 5, a V at position 8, a D at position 11, a D at position 14, a C or I at position 15, an R at position 18, a V at position 26, an S at position 29, an L or M at position 33, a K at position 41, a Y at position 55, a K at position 79, a K at position 84, a Y or N at position 108, a K or A at position 109, a V at position 113, a D at position 118, a V at position 123, a Y at position 126, an A at position 161, a V at position 171, a V or E at position 172, an I at position 230, an E at position 268, an E or A at position 271, an R at position 278, an E at position 286, a K or L at position 305, or a D at position 320, or any combination thereof.

In certain embodiments, the glutamine synthetase (GS) polypeptide is modified from the native sequence such that it comprises an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO: 2 and does not comprise an S or L at position 3, an S or T at position 5, an I or V at position 8, an N or D at position 11, a D at position 14, a C, T, or I at position 15, an R or K at position 18, a V or I at position 26, an S at position 29, an L or M at position 33, a P or K at position 41, a Y at position 55, a R or K at position 79, a R or K at position 84, a Y, H or N at position 108, a K or A at position 109, a V at position 113, a D at position 118, a V at position 123, a Y at position 126, an A or V at position 161, a V or I at position 171, a V or E at position 172, an I or V at position 230, an E or A at position 268, an E, D, or A at position 271, an R or K at position 278, an E at position 286, a K or L at position 305, or a D at position 320, or any combination thereof.

In certain embodiments, the glutamine synthetase (GS) polypeptide is modified from the native sequence such that it comprises an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO 3 and does not comprise an S or L at position 3, an S, L or T at position 5, an I or V at position 8, an N or D at position 11, a D at position 14, a C or I at position 15, an R or K at position 18, a V at position 26, an S at position 29, an L or M at position 33, a S or K at position 41, a Y at position 55, a K at position 79, a R or K at position 84, a Y or N at position 108, a K, N or A at position 109, a V or I at position 113, a D at position 118, a V or E at position 123, a Y at position 126, an A or T at position 161, a V or I at position 171, a V or E at position 172, an I or V at position 230, an E or K at position 268, an E or A at position 271, an R or K at position 278, an E at position 286, a K, V or L at position 305, or a D at position 320, or any combination thereof.

In certain embodiments, the polynucleotide encodes a GS polypeptide comprising an amino acid sequence that is at least 80% identical to SEQ ID NO: 1, wherein the amino acid sequence contains a mutation at one or more amino acid residues corresponding to position S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, or D320 of SEQ ID NO: 1.

In certain embodiments the mutation at one or more amino acid residues corresponding to position S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1 is a substitution mutation.

In certain embodiments, the GS polypeptide comprising an amino acid sequence that is at least 80% identical to SEQ ID NO: 1 comprises at least one mutation selected from the group comprising S3L, S3C, T5S, V8I, D11N, D14G, C15N, C15T, C15R, R18K, V26I, S29T, L33V, K41S, K41P, Y55F, K79R, K84R, Y108H, K109S, K109N, K109G, V113I, D118E, V123E, Y126F, A161I, A161V, V171I, V172A, I230V, E268K, E268A, E271G, E271D, E271R, R278K, E286D, K305S, K305V, D320E, and D320Q.

In certain embodiments, the GS polypeptide comprises an amino acid sequence that is at least 80% identical to SEQ ID NO: 1 and comprises, consists essentially of, or consists of an amino acid mutation at the amino acid residue corresponding to position K41, V123, A161, and K305 of SEQ ID NO: 1. In certain embodiments, the amino acid mutations are K41S, V123E, A161V, and K305S.

In certain embodiments, the GS polypeptide comprises an amino acid sequence that is at least 80% identical to SEQ ID NO: 1 and comprises, consists essentially of, or consists of an amino acid mutation at the amino acid residue corresponding to position Y55 and Y126 of SEQ ID NO: 1. In certain embodiments, the amino acid mutations are Y55F and Y126F.

In certain embodiments, the GS polypeptide comprises an amino acid sequence that is at least 80% identical to SEQ ID NO: 1 and comprises, consists essentially of, or consists of an amino acid mutation at the amino acid residue corresponding to position R18, K79, I230, and D320 of SEQ ID NO: 1. In certain embodiments, the amino acid mutations are R18K, K79R, I230V, and D320E.

In certain embodiments, the GS polypeptide comprises an amino acid sequence that is at least 80% identical to SEQ ID NO: 1 and comprises, consists essentially of, or consists of an amino acid mutation at the amino acid residue corresponding to position S3, C15, K41, K109, V123, A161, V172, E268, E271, and K305 of SEQ ID NO: 1. In certain embodiments, the amino acid mutations are S3L, C15N, K41S, K109N, V123E, A161V, V172A, E268A, E271R, and K305S.

In certain embodiments, the GS polypeptide comprises an amino acid sequence that is at least 80% identical to SEQ ID NO: 1 and comprises, consists essentially of, or consists of an amino acid mutation at the amino acid residue corresponding to position T5, V8, D11, V26, L33, K84, V113, V171, I230, and D320 of SEQ ID NO: 1. In certain embodiments, the amino acid mutations are T5S, V8I, D11N, V26I, L33V, K84R, V113I, V171I, I230V, and D320Q.

In certain embodiments, the GS polypeptide comprises an amino acid sequence that is at least 80% identical to SEQ ID NO: 1 and comprises, consists essentially of, or consists of an amino acid mutation at the amino acid residue corresponding to position T5, D11, R18, I230, R278, and D320 of SEQ ID NO: 1. In certain embodiments, the amino acid mutations are T5S, D11N, R18K, I230V, R278K, and D320E.

In certain embodiments, the GS polypeptide comprises an amino acid sequence that is at least 80% identical to SEQ ID NO: 1 and comprises, consists essentially of, or consists of an amino acid mutation at the amino acid residue corresponding to T5, D11, R18, V26, S29, V113, I230, R278, and D320 of SEQ ID NO: 1. In certain embodiments, amino acid mutations are T5S, D11N, R18K, V26I, S29T, V113I, I230V, R278K, and D320E.

In certain embodiments, the GS polypeptide comprises an amino acid sequence that is at least 80% identical to SEQ ID NO: 1 and comprises, consists essentially of, or consists of an amino acid mutation at the amino acid residue corresponding to position Y55, K79, Y108, Y126, and E286 of SEQ ID NO: 1. In certain embodiments, the amino acid mutations are Y55F, K79R, Y108H, Y126F, and E286D.

In certain embodiments, the GS polypeptide comprises an amino acid sequence that is at least 80% identical to SEQ ID NO: 1 and comprises, consists essentially of, or consists of an amino acid mutation at the amino acid residue corresponding to position C15, K41, K109, V123, V172, E271, and K305 of SEQ ID NO: 1. In certain embodiments, the amino acid mutations are C15N, K41S, K109N, V123E, V172A, E271R, and K305S.

In certain embodiments, the GS polypeptide comprises an amino acid sequence that is at least 80% identical to SEQ ID NO: 1 and comprises, consists essentially of, or consists of an amino acid mutation at the amino acid residue corresponding to position C15, K41, V123, V172, and K305 of SEQ ID NO: 1. In certain embodiments, the amino acid mutations are C15N, K41S, V123E, V172A, and K305S.

In certain embodiments, the GS polypeptide comprises an amino acid sequence that is at least 80% identical to SEQ ID NO: 1 and comprises, consists essentially of, or consists of an amino acid mutation at the amino acid residue corresponding to position C15, A161, V172, E268, E271, and K305 of SEQ ID NO: 1. In certain embodiments, the amino acid mutations are C15N, A161V, V172A, E268A, E271R, and K305S.

In certain embodiments, the GS polypeptide comprises an amino acid sequence that is at least 80% identical to SEQ ID NO: 1 and comprises, consists essentially of, or consists of an amino acid mutation at the amino acid residue corresponding to position C15, A161, V172, and K305 of SEQ ID NO: 1. In certain embodiments, the amino acid mutations are C15N, A161V, V172A, and K305S.

In certain embodiments, the polynucleotide encodes a GS polypeptide comprising an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO: 2, wherein the amino acid sequence contains a mutation at one or more amino(e.g., 2, 3, 4, 5, 6, 7, 8, 9, 10, 11, 12, 13, 14, 15, 16, 17, 18, 19, 20, 21, 22, 23, 24, 25, 26, 27, 28, 29, or 30 or more) and less than 30 (e.g., 29, 28, 27, 26, 25, 24, 23, 22, 21, 20, 19, 18, 17, 16, 15, 14, 13, 12, 11, 10, 9, 8, 7, 6, 5, 4, 3, 2) acid residues corresponding to position L3, S5, I8, N11, D14, T15, K18, I26, S29, L33, P41, Y55, R79, R84, H108, A109, V113, D118, V123, Y126, V161, I171, V172, V230, A268, D271, K278, E286, L305, or D320 of SEQ ID NO: 2.

In certain embodiments the mutation at one or more amino acid residues corresponding to position L3, S5, I8, N11, D14, T15, K18, I26, S29, L33, P41, Y55, R79, R84, H108, A109, V113, D118, V123, Y126, V161, I171, V172, V230, A268, D271, K278, E286, L305, or D320 of SEQ ID NO: 2 is a substitution mutation.

In certain embodiments, the mutation at one or more amino acid residues corresponding to SEQ ID NO: 2 is selected from the group consisting of L3C, D14G, T15N, T15R, S29T, L33V, P41S, Y55F, A109S, A109N, A109G, V113I, D118E, V123E, Y126F, V161I, V172A, A268K, D271G, D271R, E286D, L305S, L305V, D320E, and D320Q.

In certain embodiments, the GS polypeptide comprises an amino acid sequence that is at least 80% identical to SEQ ID NO: 2 and comprises, consists essentially of, or consists of an amino acid mutation at the amino acid residue corresponding to position P41, V123, and L305 of SEQ ID NO: 2. In certain embodiments, the amino acid mutations are P41S, V123E, and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position Y55 and Y126 of SEQ ID NO: 2. In certain embodiments, the amino acid mutations are Y55F and Y126F.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15, P41, A109, V123, V172, D271, and L305 of SEQ ID NO: 2. In certain embodiments, the amino acid mutations are T15N, P41S, A109N, V123E, V172A, D271R, and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position L33, V113, and D320 of SEQ ID NO: 2. In certain embodiments, the amino acid mutations are L33V, V113I, and D320Q.

In certain embodiments, the GS polypeptide comprises an amino acid sequence that is at least 80% identical to SEQ ID NO: 2 and comprises, consists essentially of, or consists of an amino acid mutation at the amino acid residue corresponding to position S29, V113, and D320 of SEQ ID NO: 2. In certain embodiments, the amino acid mutations are S29T, V113I, and D320E.

In certain embodiments, the GS polypeptide comprises an amino acid sequence that is at least 80% identical to SEQ ID NO: 2 and comprises, consists essentially of, or consists of an amino acid mutation at the amino acid residue corresponding to position Y55, Y126, and E286 of SEQ ID NO: 2. In certain embodiments, the amino acid mutations are Y55F, Y126F, and E286D.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T115, P41, V123, V172, and L305 of SEQ ID NO: 2. In certain embodiments, the amino acid mutations are T15N, P41S, V123E, V172A, L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15, P41, A109, V123, V172, D271, and L305 of SEQ ID NO: 2. In certain embodiments, the amino acid mutations are T15N, P41S, A109N, V123E, V172A, D271R, L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15N, V172, and L305 of SEQ ID NO: 2. In certain embodiments, the amino acid mutations are T15N, V172A, L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15, V172, D271, and L305 of SEQ ID NO: 2. In certain embodiments, the amino acid mutations are T15N, V172A, D271R, L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15 and P41 of SEQ ID NO: 2. In certain embodiments, the amino acid mutations are T15N and P41S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15 and A109 of SEQ ID NO: 2. In certain embodiments, the amino acid mutations are T15N and A109N.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15 and V123 of SEQ ID NO: 2. In certain embodiments, the amino acid mutations are T15N and V123E.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15 and V172 of SEQ ID NO: 2. In certain embodiments, the amino acid mutations are T15N and V172A.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15 and D271 of SEQ ID NO: 2. In certain embodiments, the amino acid mutations are T15N and D271R.

In certain embodiments, the GS polypeptide comprises an amino acid sequence that is at least 80% identical to SEQ ID NO: 2 and comprises, consists essentially of, or consists of an amino acid mutation at the amino acid residue corresponding to position T15 and L305 of SEQ ID NO: 2. In certain embodiments, the amino acid mutations are T15N and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position P41 and A109 of SEQ ID NO: 2. In certain embodiments, the amino acid mutations are P41S and A109N.

In certain embodiments, the GS polypeptide comprises an amino acid sequence that is at least 80% identical to SEQ ID NO: 2 and comprises, consists essentially of, or consists of an amino acid mutation at the amino acid residue corresponding to position P41 and V123 of SEQ ID NO: 2. In certain embodiments, the amino acid mutations are P41S and V123E.

In certain embodiments, the GS polypeptide comprises an amino acid sequence that is at least 80% identical to SEQ ID NO: 2 and comprises, consists essentially of, or consists of an amino acid mutation at the amino acid residue corresponding to position P41 and V172 of SEQ ID NO: 2. In certain embodiments, the amino acid mutations are P41S and V172A.

In certain embodiments, the GS polypeptide comprises an amino acid sequence that is at least 80% identical to SEQ ID NO: 2 and comprises, consists essentially of, or consists of an amino acid mutation at the amino acid residue corresponding to position P41 and D271 of SEQ ID NO: 2. In certain embodiments, the amino acid mutations are P41S and D271R.

In certain embodiments, the GS polypeptide comprises an amino acid sequence that is at least 80% identical to SEQ ID NO: 2 and comprises, consists essentially of, or consists of an amino acid mutation at the amino acid residue corresponding to position P41 and L305 of SEQ ID NO: 2. In certain embodiments, the amino acid mutations are P41S and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position A109 and V123 of SEQ ID NO: 2. In certain embodiments, the amino acid mutations are A109N and V123E.

In certain embodiments, the GS polypeptide comprises an amino acid sequence that is at least 80% identical to SEQ ID NO: 2 and comprises, consists essentially of, or consists of an amino acid mutation at the amino acid residue corresponding to position A109 and V172 of SEQ ID NO: 2. In certain embodiments, the amino acid mutations are A109N and V172A.

In certain embodiments, the GS polypeptide comprises an amino acid sequence that is at least 80% identical to SEQ ID NO: 2 and comprises, consists essentially of, or consists of an amino acid mutation at the amino acid residue corresponding to position A109 and D271 of SEQ ID NO: 2. In certain embodiments, the amino acid mutations are A109N and D271R.

In certain embodiments, the GS polypeptide comprises an amino acid sequence that is at least 80% identical to SEQ ID NO: 2 and comprises, consists essentially of, or consists of an amino acid mutation at the amino acid residue corresponding to position A109 and L305 of SEQ ID NO: 2. In certain embodiments, the amino acid mutations are A109N and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position V123 and V172 of SEQ ID NO: 2. In certain embodiments, the amino acid mutations are V123E and V172A.

In certain embodiments, the GS polypeptide comprises an amino acid sequence that is at least 80% identical to SEQ ID NO: 2 and comprises, consists essentially of, or consists of an amino acid mutation at the amino acid residue corresponding to position V123 and D271 of SEQ ID NO: 2. In certain embodiments, the amino acid mutations are V123E and D271R.

In certain embodiments, the GS polypeptide comprises an amino acid sequence that is at least 80% identical to SEQ ID NO: 2 and comprises, consists essentially of, or consists of an amino acid mutation at the amino acid residue corresponding to position V123 and L305 of SEQ ID NO: 2. In certain embodiments, the amino acid mutations are V123E and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position V172 and D271 of SEQ ID NO: 2. In certain embodiments, the amino acid mutations are V172A and D271R.

In certain embodiments, the GS polypeptide comprises an amino acid sequence that is at least 80% identical to SEQ ID NO: 2 and comprises, consists essentially of, or consists of an amino acid mutation at the amino acid residue corresponding to position V172 and L305 of SEQ ID NO: 2. In certain embodiments, the amino acid mutations are V172A and L305S.

In certain embodiments, the GS polypeptide comprises an amino acid sequence that is at least 80% identical to SEQ ID NO: 2 and comprises, consists essentially of, or consists of an amino acid mutation at the amino acid residue corresponding to position D271 and L305 of SEQ ID NO: 2. In certain embodiments, the amino acid mutations are D271R and L305S.

In certain embodiments, the polynucleotide encodes a GS polypeptide comprising an amino acid sequence that is at least 50% (e.g., 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, or 99%) identical to SEQ ID NO: 3, wherein the amino acid sequence contains a mutation at one or more (e.g., 2, 3, 4, 5, 6, 7, 8, 9, 10, 11, 12, 13, 14, 15, 16, 17, 18, 19, 20, 21, 22, 23, 24, 25, 26, 27, 28, 29, or 30 or more) and less than 30 (e.g., 29, 28, 27, 26, 25, 24, 23, 22, 21, 20, 19, 18, 17, 16, 15, 14, 13, 12, 11, 10, 9, 8, 7, 6, 5, 4, 3, 2) amino acid residues corresponding to position L3, S5, I8, N11, D14, I15, K18, V26, S29, M33, S41, Y55, K79, R84, N108, N109, I113, D118, E123, Y126, T161, I171, V172, V230, K268, A271, K278, E286, V305, and D320 of SEQ ID NO: 3.

In certain embodiments the mutation at one or more amino acid residues corresponding to position L3, S5, I8, N11, D14, I15, K18, V26, S29, M33, S41, Y55, K79, R84, N108, N109, I113, D118, E123, Y126, T161, I171, V172, V230, K268, A271, K278, E286, V305, and D320 of SEQ ID NO: 3 is a substitution mutation.

In certain embodiments, the mutation at one or more amino acid residues corresponding to SEQ ID NO: 3 is selected from the group consisting of L3C, D14G, I15T, I15N, I15R, V26I, S29T, M33V, S41P, Y55F, K79R, N108H, N109S, N109G, D118E, Y126F, T161I, T161V, V172A, K268A, A271G, A271D, A271R, E286D, V305S, D320E, and D320Q.

In certain embodiments, the GS polypeptide comprises an amino acid sequence that is at least 80% identical to SEQ ID NO: 3 and comprises, consists essentially of, or consists of an amino acid mutation at the amino acid residue corresponding to position T161 and V305 of SEQ ID NO: 3. In certain embodiments, the amino acid mutations are T161V, and V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position Y55 and Y126 of SEQ ID NO: 3. In certain embodiments, the amino acid mutations are Y55F and Y126F.

In certain embodiments, the GS polypeptide comprises an amino acid sequence that is at least 80% identical to SEQ ID NO: 3 and comprises, consists essentially of, or consists of an amino acid mutation at the amino acid residue corresponding to position K79 and D320 of SEQ ID NO: 3. In certain embodiments, the amino acid mutations are K79R and D320E.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15, T16I, V172, K268, and V305 of SEQ ID NO: 3. In certain embodiments, the amino acid mutations are I15N, T161V, V172A, K268A, and V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position V26, M33, and D320 of SEQ ID NO: 3. In certain embodiments, the amino acid mutations are V26I, M33V, and D320Q.

In certain embodiments, the GS polypeptide comprises an amino acid sequence that is at least 80% identical to SEQ ID NO: 3 and comprises, consists essentially of, or consists of an amino acid mutation at the amino acid residue corresponding to position V26, S29, and D320 of SEQ ID NO: 3. In certain embodiments, the amino acid mutations are V26I, S29T, and D320E.

In certain embodiments, the GS polypeptide comprises an amino acid sequence that is at least 80% identical to SEQ ID NO: 3 and comprises, consists essentially of, or consists of an amino acid mutation at the amino acid residue corresponding to position Y55, K79, N108, Y126, and E286 of SEQ ID NO: 3. In certain embodiments, the amino acid mutations are Y55F, K79R, N108H, Y126F, and E286D.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15, V172, and V305 of SEQ ID NO: 3. In certain embodiments, the amino acid mutations are I15N, V172A, V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15, V172, A271, and V305 of SEQ ID NO: 3. In certain embodiments, the amino acid mutations are I15N, V172A, A271R, V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15, T161, V172, and V305 of SEQ ID NO: 3. In certain embodiments, the amino acid mutations are I15N, T161V, V172A, V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15, T161, V172, K268, A271, and V305 of SEQ ID NO: 3. In certain embodiments, the amino acid mutations are I15N, T161V, V172A, K268A, A271R, V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15 and T161 of SEQ ID NO: 3. In certain embodiments, the amino acid mutations are I15N and T161V.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15 and V172 of SEQ ID NO: 3. In certain embodiments, the amino acid mutations are I15N and V172A.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15 and K268 of SEQ ID NO: 3. In certain embodiments, the amino acid mutations are I15N and K268A.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15 and A271 of SEQ ID NO: 3. In certain embodiments, the amino acid mutations are I15N and A271R.

In certain embodiments, the GS polypeptide comprises an amino acid sequence that is at least 80% identical to SEQ ID NO: 3 and comprises, consists essentially of, or consists of an amino acid mutation at the amino acid residue corresponding to position I15 and V305 of SEQ ID NO: 3. In certain embodiments, the amino acid mutations are I15N and V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position T161 and V172 of SEQ ID NO: 3. In certain embodiments, the amino acid mutations are T161V and V172A.

In certain embodiments, the GS polypeptide comprises an amino acid sequence that is at least 80% identical to SEQ ID NO: 3 and comprises, consists essentially of, or consists of an amino acid mutation at the amino acid residue corresponding to position T161 and K268 of SEQ ID NO: 3. In certain embodiments, the amino acid mutations are T161V and K268A.

In certain embodiments, the GS polypeptide comprises an amino acid sequence that is at least 80% identical to SEQ ID NO: 3 and comprises, consists essentially of, or consists of an amino acid mutation at the amino acid residue corresponding to position T161 and A271 of SEQ ID NO: 3. In certain embodiments, the amino acid mutations are T161V and A271R.

In certain embodiments, the GS polypeptide comprises an amino acid sequence that is at least 80% identical to SEQ ID NO: 3 and comprises, consists essentially of, or consists of an amino acid mutation at the amino acid residue corresponding to position T161 and V305 of SEQ ID NO: 3. In certain embodiments, the amino acid mutations are T161V and V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position V172 and K268 of SEQ ID NO: 3. In certain embodiments, the amino acid mutations are V172A and K268A.

In certain embodiments, the GS polypeptide comprises an amino acid sequence that is at least 80% identical to SEQ ID NO: 3 and comprises, consists essentially of, or consists of an amino acid mutation at the amino acid residue corresponding to position V172 and A271 of SEQ ID NO: 3. In certain embodiments, the amino acid mutations are V172A and A271R.

In certain embodiments, the GS polypeptide comprises an amino acid sequence that is at least 80% identical to SEQ ID NO: 3 and comprises, consists essentially of, or consists of an amino acid mutation at the amino acid residue corresponding to position V172 and V305 of SEQ ID NO: 3. In certain embodiments, the amino acid mutations are V172A and V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position K268 and A271 of SEQ ID NO: 3. In certain embodiments, the amino acid mutations are K268A and A271R.

In certain embodiments, the GS polypeptide comprises an amino acid sequence that is at least 80% identical to SEQ ID NO: 3 and comprises, consists essentially of, or consists of an amino acid mutation at the amino acid residue corresponding to position K268 and V305 of SEQ ID NO: 3. In certain embodiments, the amino acid mutations are K268A and V305S.

In certain embodiments, the GS polypeptide comprises an amino acid sequence that is at least 80% identical to SEQ ID NO: 3 and comprises, consists essentially of, or consists of an amino acid mutation at the amino acid residue corresponding to position A271 and V305 of SEQ ID NO: 3. In certain embodiments, the amino acid mutations are A271R and V305S.

As used herein, when the polynucleotide encodes a GS polypeptide comprising the indicated mutation, the polypeptide may contain additional amino acid mutations so long as the resulting GS polypeptide has at least 80% sequence identity to SEQ ID NO: 1, 2, or 3, respectively. When the polynucleotide encodes a GS polypeptide consisting essentially of the indicated mutation, the polypeptide may contain additional amino acid mutations so long as the resulting GS polypeptide has at least 80% sequence identity to SEQ ID NO: 1, 2, or 3, respectively, and maintains a statistically similar level of GS activity. When the polynucleotide encodes a GS polypeptide consisting of the indicated mutation, the polypeptide may not contain any additional amino acid mutations.

In certain embodiments, the polynucleotide encodes a GS polypeptide comprising the amino acid sequence having at least 95% sequence identity to any one of SEQ ID NOs: 4-58. In certain embodiments the GS polypeptide comprising the amino acid sequence having at least 95% sequence identity to any one of SEQ ID NOs: 4-58 comprises at least one mutation described herein. In certain embodiments the GS polypeptide comprising the amino acid sequence having at least 95% sequence identity to any one of SEQ ID NOs: 4-58 comprises at least two mutations described herein. In certain embodiments, the polynucleotide encodes a GS polypeptide comprising the amino acid sequence of any one of SEQ ID NOs: 4-58.

As used herein "encoding," "encoded," or the like, with respect to a specified nucleic acid, is meant comprising the information for translation into the specified protein. A nucleic acid encoding a protein may comprise non-translated sequences (e.g., introns) within translated regions of the nucleic acid, or may lack such intervening non-translated sequences (e.g., as in cDNA). The information by which a protein is encoded is specified by the use of codons. Typically, the amino acid sequence is encoded by the nucleic acid using the "universal" genetic code. However, variants of the universal code, such as is present in some plant, animal and fungal mitochondria, the bacterium *Mycoplasma capricolum* (Yamao, et al., (1985) *Proc. Natl. Acad. Sci. USA* 82:2306-9) or the ciliate *Macronucleus*, may be used when the nucleic acid is expressed using these organisms.

When the nucleic acid is prepared or altered synthetically, advantage can be taken of known codon preferences of the intended host where the nucleic acid is to be expressed. For example, although nucleic acid sequences of the present invention may be expressed in both monocotyledonous and dicotyledonous plant species, sequences can be modified to account for the specific codon preferences and GC content preferences of monocotyledonous plants or dicotyledonous plants as these preferences have been shown to differ (Murray, et al., (1989) *Nucleic Acids Res.* 17:477-98 and herein incorporated by reference). Thus, the maize preferred codon for a particular amino acid might be derived from known gene sequences from maize. Maize codon usage for 28 genes from maize plants is listed in Table 4 of Murray, et al., supra.

As used herein, "polynucleotide" includes reference to a deoxyribopolynucleotide, ribopolynucleotide or analogs thereof that have the essential nature of a natural ribonucleotide in that they hybridize, under stringent hybridization conditions, to substantially the same nucleotide sequence as naturally occurring nucleotides and/or allow translation into the same amino acid(s) as the naturally occurring nucleotide(s). A polynucleotide can be full-length or a subsequence of a structural or regulatory gene. Unless otherwise indicated, the term includes reference to the specified sequence as well as the complementary sequence thereof. Thus, DNAs or RNAs with backbones modified for stability or for other reasons are "polynucleotides" as that term is intended herein. Moreover, DNAs or RNAs comprising unusual bases, such as inosine, or modified bases, such as tritylated bases, to name just two examples, are polynucleotides as the term is used herein. It will be appreciated that a great variety of modifications have been made to DNA and RNA that serve many useful purposes known to those of skill in the art. The term polynucleotide as it is employed herein embraces such chemically, enzymatically or metabolically modified forms of polynucleotides, as well as the chemical forms of DNA and RNA characteristic of viruses and cells, including inter alia, simple and complex cells.

The terms "polypeptide," "peptide" and "protein" are used interchangeably herein to refer to a polymer of amino acid residues. The terms apply to amino acid polymers in which one or more amino acid residue is an artificial chemical analogue of a corresponding naturally occurring amino acid, as well as to naturally occurring amino acid polymers.

As used herein, "sequence identity" or "identity" in the context of two nucleic acid or polypeptide sequences includes reference to the residues in the two sequences, which are the same when aligned for maximum correspondence over a specified comparison window. When percentage of sequence identity is used in reference to proteins it is recognized that residue positions which are not identical often differ by conservative amino acid substitutions, where amino acid residues are substituted for other amino acid residues with similar chemical properties (e.g., charge or hydrophobicity) and therefore do not change the functional properties of the molecule. Where sequences differ in conservative substitutions, the percent sequence identity may be adjusted upwards to correct for the conservative nature of the substitution. Sequences, which differ by such conservative substitutions, are said to have "sequence similarity" or "similarity." Means for making this adjustment are well known to those of skill in the art. Typically, this involves scoring a conservative substitution as a partial rather than a full mismatch, thereby increasing the percentage sequence identity. Thus, for example, where an identical amino acid is given a score of 1 and a non-conservative substitution is given a score of zero, a conservative substitution is given a score between zero and 1. The scoring of conservative substitutions is calculated, e.g., according to the algorithm of Meyers and Miller, (1988) *Computer Applic. Biol. Sci.* 4:11-17, e.g., as implemented in the program PC/GENE (Intelligenetics, Mountain View, California, USA).

As used herein, "percentage of sequence identity" means the value determined by comparing two optimally aligned sequences over a comparison window, wherein the portion of the polynucleotide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

As used herein, "reference sequence" is a defined sequence used as a basis for sequence comparison. A reference sequence may be a subset or the entirety of a specified sequence; for example, as a segment of a full-length cDNA or gene sequence or the complete cDNA or gene sequence.

As used herein, "comparison window" means reference to a contiguous and specified segment of a polynucleotide sequence, wherein the polynucleotide sequence may be compared to a reference sequence and wherein the portion of the polynucleotide sequence in the comparison window may comprise additions or deletions (i.e., gaps) compared to the reference sequence (which does not comprise additions or deletions) for optimal alignment of the two sequences. Generally, the comparison window is at least 20 contiguous nucleotides in length, and optionally can be 30, 40, 50, 100 or longer. Those of skill in the art understand that to avoid a high similarity to a reference sequence due to inclusion of gaps in the polynucleotide sequence a gap penalty is typically introduced and is subtracted from the number of matches.

Methods of alignment of nucleotide and amino acid sequences for comparison are well known in the art. The local homology algorithm (BESTFIT) of Smith and Waterman, (1981) Adv. Appl. Math 2:482, may conduct optimal alignment of sequences for comparison; by the homology alignment algorithm (GAP) of Needleman and Wunsch, (1970) J. Mol. Biol. 48:443-53; by the search for similarity method (Tfasta and Fasta) of Pearson and Lipman, (1988) Proc. Natl. Acad. Sci. USA 85:2444; by computerized implementations of these algorithms, including, but not limited to: CLUSTAL in the PC/Gene program by Intelligenetics, Mountain View, California, GAP, BESTFIT, BLAST, FASTA and TFASTA in the Wisconsin Genetics Software Package®, Version 8 (available from Genetics Computer Group (GCG® programs (Accelrys, Inc., San Diego, CA)). The CLUSTAL program is well described by Higgins and Sharp, (1988) Gene 73:237-44; Higgins and Sharp, (1989) CABIOS 5:151-3; Corpet, et al., (1988) Nucleic Acids Res. 16:10881-90; Huang, et al., (1992) Computer Applications in the Biosciences 8:155-65, and Pearson, et al., (1994) Meth. Mol. Biol. 24:307-31. The preferred program to use for optimal global alignment of multiple sequences is PileUp (Feng and Doolittle, (1987) J. Mol. Evol., 25:351-60 which is similar to the method described by Higgins and Sharp, (1989) CABIOS 5:151-53 and hereby incorporated by reference). The BLAST family of programs which can be used for database similarity searches includes: BLASTN for nucleotide query sequences against nucleotide database sequences; BLASTX for nucleotide query sequences against protein database sequences; BLASTP for protein query sequences against protein database sequences; TBLASTN for protein query sequences against nucleotide database sequences; and TBLASTX for nucleotide query sequences against nucleotide database sequences. See, CURRENT PROTOCOLS IN MOLECULAR BIOLOGY, Chapter 19, Ausubel, et al., eds., Greene Publishing and Wiley-Interscience, New York (1995).

GAP uses the algorithm of Needleman and Wunsch, supra, to find the alignment of two complete sequences that maximizes the number of matches and minimizes the number of gaps. GAP considers all possible alignments and gap positions and creates the alignment with the largest number of matched bases and the fewest gaps. It allows for the provision of a gap creation penalty and a gap extension penalty in units of matched bases. GAP must make a profit of gap creation penalty number of matches for each gap it inserts. If a gap extension penalty greater than zero is chosen, GAP must, in addition, make a profit for each gap inserted of the length of the gap times the gap extension penalty. Default gap creation penalty values and gap extension penalty values in Version 10 of the Wisconsin Genetics Software Package® are 8 and 2, respectively. The gap creation and gap extension penalties can be expressed as an integer selected from the group of integers consisting of from 0 to 100. Thus, for example, the gap creation and gap extension penalties can be 0, 1, 2, 3, 4, 5, 6, 7, 8, 9, 10, 15, 20, 30, 40, 50 or greater.

GAP presents one member of the family of best alignments. There may be many members of this family, but no other member has a better quality. GAP displays four figures of merit for alignments: Quality, Ratio, Identity and Similarity. The Quality is the metric maximized in order to align the sequences. Ratio is the quality divided by the number of bases in the shorter segment. Percent Identity is the percent of the symbols that actually match. Percent Similarity is the percent of the symbols that are similar. Symbols that are across from gaps are ignored. A similarity is scored when the scoring matrix value for a pair of symbols is greater than or equal to 0.50, the similarity threshold. The scoring matrix used in Version 10 of the Wisconsin Genetics Software Package® is BLOSUM62 (see, Henikoff and Henikoff, (1989) Proc. Natl. Acad. Sci. USA 89:10915).

Unless otherwise stated, sequence identity/similarity values provided herein refer to the value obtained using the BLAST 2.0 suite of programs using default parameters (Altschul, et al., (1997) Nucleic Acids Res. 25:3389-402).

As those of ordinary skill in the art will understand, BLAST searches assume that proteins can be modeled as random sequences. However, many real proteins comprise regions of nonrandom sequences, which may be homopolymeric tracts, short-period repeats, or regions enriched in one or more amino acids. Such low-complexity regions may be aligned between unrelated proteins even though other regions of the protein are entirely dissimilar. A number of low-complexity filter programs can be employed to reduce such low-complexity alignments. For example, the SEG (Wooten and Federhen, (1993) Comput. Chem. 17:149-63) and XNU (Claverie and States, (1993) Comput. Chem. 17:191-201) low-complexity filters can be employed alone or in combination.

Accordingly, in any of the embodiments described herein, the inventive polynucleotide may encode a polypeptide that is at least 80% identical to SEQ ID NO: 1, 2, or 3. For example, the inventive polynucleotide may encode a polypeptide that is at least 81% identical, at least 82% identical, at least 83% identical, at least 84% identical, at least 85% identical, at least 86% identical, at least 87% identical, at least 88% identical, at least 89% identical, at least 90%, at least 91% identical, at least 92% identical, at least 93% identical, at least 94% identical, at least 95% identical, at least 96% identical, at least 97% identical, at least 98% identical, at least 99% identical, or 100% identical to the amino acid sequence of SEQ ID NO: 1, 2, or 3.

B. Recombinant DNA Construct

Also provided is a recombinant DNA construct comprising any of the GS polynucleotides described herein. In certain embodiments, the recombinant DNA construct further comprises at least one regulatory element. In certain embodiments, the at least one regulatory element of the recombinant DNA construct comprises a promoter, preferably a heterologous promoter.

As used herein, a "recombinant DNA construct" comprises two or more operably linked DNA segments which are not found operably linked in nature. Non-limiting examples of recombinant DNA constructs include a polynucleotide of interest operably linked to heterologous sequences, also referred to as "regulatory elements," which aid in the expression, autologous replication, and/or genomic insertion of the sequence of interest. Such regulatory elements include, for example, promoters, termination sequences, enhancers, etc., or any component of an expression cassette; a plasmid, cosmid, virus, autonomously replicating sequence, phage, or linear or circular single-stranded or double-stranded DNA or RNA nucleotide sequence; and/or sequences that encode heterologous polypeptides.

The GS polynucleotides described herein can be provided for expression in a plant of interest or an organism of interest. The cassette can include 5' and 3' regulatory sequences operably linked to a GS polynucleotide. "Operably linked" is intended to mean a functional linkage between two or more elements. For, example, an operable linkage between a polynucleotide of interest and a regulatory sequence (e.g., a promoter) is a functional link that allows for expression of the polynucleotide of interest. Operably linked elements may be contiguous or non-contiguous. When used to refer to the joining of two protein coding regions, operably linked is intended that the coding regions are in the same reading frame. The cassette may additionally contain at least one additional gene to be cotransformed into the organism. Alternatively, the additional gene(s) can be provided on multiple expression cassettes. Such an expression cassette is provided with a plurality of restriction sites and/or recombination sites for insertion of the GS polynucleotide to be under the transcriptional regulation of the regulatory regions. The expression cassette may additionally contain selectable marker genes.

The expression cassette can include in the 5'-3' direction of transcription, a transcriptional and translational initiation region (e.g., a promoter), a GS polynucleotide described herein, and a transcriptional and translational termination region (e.g., termination region) functional in plants. The regulatory regions (e.g., promoters, transcriptional regulatory regions, and translational termination regions) and/or the GS polynucleotide may be native/analogous to the host cell or to each other. Alternatively, the regulatory regions and/or the GS polynucleotide may be heterologous to the host cell or to each other.

As used herein, "heterologous" in reference to a sequence is a sequence that originates from a foreign species, or, if from the same species, is substantially modified from its native form in composition and/or genomic locus by deliberate human intervention. For example, a promoter operably linked to a heterologous polynucleotide that is from a species different from the species from which the polynucleotide was derived, or, if from the same/analogous species, one or both are substantially modified from their original form and/or genomic locus, or the promoter is not the native promoter for the operably linked polynucleotide.

The termination region may be native with the transcriptional initiation region, with the plant host, or may be derived from another source (i.e., foreign or heterologous) than the promoter, the GS polynucleotide, the plant host, or any combination thereof.

The expression cassette may additionally contain a 5' leader sequences. Such leader sequences can act to enhance translation. Translation leaders are known in the art and include viral translational leader sequences.

In preparing the expression cassette, the various DNA fragments may be manipulated, so as to provide for the DNA sequences in the proper orientation and, as appropriate, in the proper reading frame. Toward this end, adapters or linkers may be employed to join the DNA fragments or other manipulations may be involved to provide for convenient restriction sites, removal of superfluous DNA, removal of restriction sites, or the like. For this purpose, in vitro mutagenesis, primer repair, restriction, annealing, resubstitutions, e.g., transitions and transversions, may be involved.

As used herein "promoter" refers to a region of DNA upstream from the start of transcription and involved in recognition and binding of RNA polymerase and other proteins to initiate transcription. A "plant promoter" is a promoter capable of initiating transcription in plant cells. Exemplary plant promoters include, but are not limited to, those that are obtained from plants, plant viruses and bacteria which comprise genes expressed in plant cells such *Agrobacterium* or *Rhizobium*. Certain types of promoters preferentially initiate transcription in certain tissues, such as leaves, roots, seeds, fibres, xylem vessels, tracheids or sclerenchyma. Such promoters are referred to as "tissue preferred." A "cell type" specific promoter primarily drives expression in certain cell types in one or more organs, for example, vascular cells in roots or leaves. An "inducible" or "regulatable" promoter is a promoter, which is under environmental control. Examples of environmental conditions that may affect transcription by inducible promoters include anaerobic conditions or the presence of light. Another type of promoter is a developmentally regulated promoter, for example, a promoter that drives expression during pollen development. Tissue preferred, cell type specific, developmentally regulated and inducible promoters constitute the class of "non-constitutive" promoters. A "constitutive" promoter is a promoter, which is active under most environmental conditions. Constitutive promoters include, for example, the core promoter of the Rsyn7 promoter and other constitutive promoters disclosed in WO 99/43838 and U.S. Pat. No. 6,072,050; the core CaMV 35S promoter (Odell et al. (1985) *Nature* 313:810-812); rice actin (McElroy et al. (1990) *Plant Cell* 2:163-171); ubiquitin (Christensen et al. (1989) *Plant Mol. Biol.* 12:619-632 and Christensen et al. (1992) *Plant Mol. Biol.* 18:675-689); pEMU (Last et al. (1991) *Theor. Appl. Genet.* 81:581-588); MAS (Velten et al. (1984) *EMBO J.* 3:2723-2730); ALS promoter (U.S. Pat. No. 5,659,026), and the like. Other constitutive promoters include, for example, U.S. Pat. Nos. 5,608,149; 5,608,144; 5,604,121; 5,569,597; 5,466,785; 5,399,680; 5,268,463; 5,608,142; and 6,177,611.

Also contemplated are synthetic promoters which include a combination of one or more heterologous regulatory elements.

The promoter of the recombinant DNA constructs of the invention can be any type or class of promoter known in the art, such that any one of a number of promoters can be used to express the various GS sequences disclosed herein, including the native promoter of the polynucleotide sequence of interest. The promoters for use in the recombinant DNA constructs of the invention can be selected based on the desired outcome.

C. Host Cells

Provided are host cells that are engineered (e.g., transduced, transformed, or transfected) with one or more of any of the polynucleotides or recombinant DNA constructs described herein in order to express the GS polypeptide. The inventive polynucleotides or recombinant DNA constructs can be expressed in any organism, including in non-animal cells such as yeast, fungi, bacteria and the like. Details regarding non-animal cell culture can be found in Payne et al. (1992) *Plant Cell and Tissue Culture in Liquid Systems*, John Wiley & Sons, Inc. New York, NY; Gamborg and Phillips (eds.) (1995) *Plant Cell, Tissue and Organ Culture*; Fundamental Methods Springer Lab Manual, Springer-Verlag (Berlin, Heidelberg, New York); and Atlas and Parks (eds.) *The Handbook of Microbiological Media* (1993) CRC Press, Boca Raton, FL.

Host cells of interest can include, for example, a eukaryotic cell, an animal cell, a protoplast, a tissue culture cell, prokaryotic cell, a bacterial cell, such as *E. coli, B. subtilis, Streptomyces, Salmonella typhimurium*, a gram positive bacteria, a purple bacteria, a green sulfur bacteria, a green non-sulfur bacteria, a cyanobacteria, a spirochetes, a thermatogale, a flavobacteria, bacteroides; a fungal cell, such as *Saccharomyces cerevisiae, Pichia pastoris*, and *Neurospora crassa*; an insect cell such as *Drosophila* and *Spodoptera frugiperda*; a mammalian cell such as CHO, COS, BHK, HEK 293 or Bowes melanoma, archaebacteria (i.e., *Korarchaeota, Thermoproteus, Pyrodictium, Thermococcales, Methanogens, Archaeoglobus*, and extreme *Halophiles*)

D. Plants and Plant Cells

Provided are plants, plant cells, plant parts, seeds, and grain comprising at least one of the GS polynucleotide sequences or recombinant DNA constructs, described herein, so that the plants, plant cells, plant parts, seeds, and/or grain express any of the GS polypeptides described herein. In certain embodiments, the plants, plant cells, plant parts, seeds, and/or grain have stably incorporated at least one GS polynucleotide into its genome. In certain embodiments, the plants, plant cells, plant parts, seeds, and/or grain can comprise multiple GS polynucleotides (i.e., at least 1, 2, 3, 4, 5, 6 or more).

In specific embodiments, the GS polynucleotides in the plants, plant cells, plant parts, seeds, and/or grain are operably linked to a heterologous regulatory element, such as but not limited to a constitutive, tissue-preferred, or other promoter for expression in plants or a constitutive enhancer.

Also provided are plants, plant cells, plant parts, seeds, and grain comprising an introduced genetic modification at a genomic locus that encodes an endogenous GS polypeptide wherein the introduced genetic modification results in the genomic locus encoding any of the GS polypeptides described herein. For example, a GS polypeptide comprising an amino acid sequence that is at least 80% identical to SEQ ID NO: 1, 2, or 3, and comprising a mutation at one or more amino acid residues corresponding to position S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, or D320 of SEQ ID NO: 1.

As used herein, the term "plant" includes plant protoplasts, plant cell tissue cultures from which plants can be regenerated, plant calli, plant clumps, and plant cells that are intact in plants or parts of plants such as embryos, pollen, ovules, seeds, leaves, flowers, branches, fruit, kernels, ears, cobs, husks, stalks, roots, root tips, anthers, and the like. Grain is intended to mean the mature seed produced by commercial growers for purposes other than growing or reproducing the species. Progeny, variants, and mutants of the regenerated plants are also included within the scope of the disclosure, provided that these parts comprise the introduced polynucleotides.

The polynucleotides or recombinant DNA constructs disclosed herein may be used for transformation of any plant species, including, but not limited to, monocots and dicots.

Examples of plant species of interest include, but are not limited to, maize (*Zea mays*), *Brassica* sp. (e.g., *B. napus, B. rapa, B. juncea*), particularly those *Brassica* species useful as sources of seed oil, alfalfa (*Medicago sativa*), rice (*Oryza sativa*), rye (*Secale cereale*), sorghum (*Sorghum bicolor, Sorghum vulgare*), millet (e.g., pearl millet (*Pennisetum glaucum*), proso millet (*Panicum miliaceum*), foxtail millet (*Setaria italica*), finger millet (*Eleusine coracana*)), sunflower (*Helianthus annuus*), safflower (*Carthamus tinctorius*), wheat (*Triticum aestivum*), soybean (*Glycine max*), tobacco (*Nicotiana tabacum*), potato (*Solanum tuberosum*), peanuts (*Arachis hypogaea*), cotton (*Gossypium barbadense, Gossypium hirsutum*), sweet potato (*Ipomoea batatus*), cassava (*Manihot esculenta*), coffee (*Coffea* spp.), coconut (*Cocos nucifera*), pineapple (*Ananas comosus*), citrus trees (*Citrus* spp.), cocoa (*Theobroma cacao*), tea (*Camellia sinensis*), banana (*Musa* spp.), avocado (*Persea americana*), fig (*Ficus casica*), guava (*Psidium guajava*), mango (*Mangifera indica*), olive (*Olea europaea*), papaya (*Carica papaya*), cashew (*Anacardium occidentale*), macadamia (*Macadamia integrifolia*), almond (*Prunus amygdalus*), sugar beets (*Beta vulgaris*), sugarcane (*Saccharum* spp.), oats, barley, vegetables, ornamentals, conifers, turf grasses (including cool seasonal grasses and warm seasonal grasses).

Vegetables include, for example, tomatoes (*Lycopersicon esculentum*), lettuce (e.g., *Lactuca sativa*), green beans (*Phaseolus vulgaris*), lima beans (*Phaseolus limensis*), peas (*Lathyrus* spp.), and members of the genus *Cucumis* such as cucumber (*C. sativus*), cantaloupe (*C. cantalupensis*), and musk melon (*C. melo*). Ornamentals include azalea (*Rhododendron* spp.), hydrangea (*Macrophylla hydrangea*), hibiscus (*Hibiscus rosasanensis*), roses (*Rosa* spp.), tulips (*Tulipa* spp.), daffodils (*Narcissus* spp.), petunias (*Petunia hybrida*), carnation (*Dianthus caryophyllus*), poinsettia (*Euphorbia pulcherrima*), and chrysanthemum.

Conifers that may be employed in practicing that which is disclosed include, for example, pines such as loblolly pine (*Pinus taeda*), slash pine (*Pinus elliotii*), ponderosa pine (*Pinus ponderosa*), lodgepole pine (*Pinus contorta*), and Monterey pine (*Pinus radiata*); Douglas-fir (*Pseudotsuga menziesii*); Western hemlock (*Tsuga canadensis*); Sitka spruce (*Picea glauca*); redwood (*Sequoia sempervirens*); true firs such as silver fir (*Abies amabilis*) and balsam fir (*Abies balsamea*); and cedars such as Western red cedar (*Thuja plicata*) and Alaska yellow-cedar (*Chamaecyparis nootkatensis*), and Poplar and Eucalyptus. In specific embodiments, plants of the present disclosure are crop plants (for example, corn, alfalfa, sunflower, Brassica, soybean, cotton, safflower, peanut, sorghum, wheat, millet, tobacco, etc.). In other embodiments, corn and soybean plants are optimal, and in yet other embodiments corn plants are optimal.

Other plants of interest include, for example, grain plants that provide seeds of interest, oil-seed plants, and leguminous plants. Seeds of interest include, for example, grain seeds, such as corn, wheat, barley, rice, sorghum, rye, etc. Oil-seed plants include, for example, cotton, soybean, safflower, sunflower, *Brassica*, maize, alfalfa, palm, coconut, etc. Leguminous plants include beans and peas. Beans include guar, locust bean, fenugreek, soybean, garden beans, cowpea, mungbean, lima bean, fava bean, lentils, chickpea.

For example, in certain embodiments, maize and/or soybean plants are provided that comprise, in their genome, a polynucleotide that encodes a GS polypeptide comprising an amino acid sequence that is at least 80% identical to SEQ ID NO: 1 wherein the amino acid sequence contains a mutation at one or more amino acid residues corresponding to positions S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1.

In certain embodiments, maize and/or soybean plants are provided that comprise, in their genome, a polynucleotide that encodes a GS polypeptide comprising an amino acid sequence that is at least 80% identical to SEQ ID NO: 2 wherein the amino acid sequence contains a mutation at one or more amino acid residues corresponding to position L3, S5, I8, N11, D14, T15, K18, I26, S29, L33, P41, Y55, R79, R84, H108, A109, V113, D118, V123, Y126, V161, I171, V172, V230, A268, D271, K278, E286, L305, or D320 of SEQ ID NO: 2.

In certain embodiments, maize and/or soybean plants are provided that comprise, in their genome, a polynucleotide that encodes a GS polypeptide comprising an amino acid sequence that is at least 80% identical to SEQ ID NO: 3 wherein the amino acid sequence contains a mutation at one or more amino acid residues corresponding to position L3, S5, I8, N11, D14, I15, K18, V26, S29, M33, S41, Y55, K79, R84, N108, N109, I113, D118, E123, Y126, T161, I171, V172, V230, K268, A271, K278, E286, V305, and D320 of SEQ ID NO: 3.

E. Stacking Other Traits of Interest

In some embodiments, the GS polynucleotides disclosed herein are engineered into a molecular stack. Thus, the various host cells, plants, plant cells, plant parts, seeds, and/or grain disclosed herein can further comprise one or more traits of interest. In certain embodiments, the host cell, plant, plant part, plant cell, seed, and/or grain is stacked with any combination of polynucleotide sequences of interest in order to create plants with a desired combination of traits. As used herein, the term "stacked" refers to having multiple traits present in the same plant or organism of interest. For example, "stacked traits" may comprise a molecular stack where the sequences are physically adjacent to each other. A trait, as used herein, refers to the phenotype derived from a particular sequence or groups of sequences. In one embodiment, the molecular stack comprises at least one polynucleotide that confers tolerance to glyphosate. Polynucleotides that confer glyphosate tolerance are known in the art.

In certain embodiments, the molecular stack comprises at least one polynucleotide that confers tolerance to glyphosate and at least one additional polynucleotide that confers tolerance to a second herbicide.

In certain embodiments, the plant, plant cell, seed, and/or grain having an inventive polynucleotide sequence may be stacked with, for example, one or more sequences that confer tolerance to: an ALS inhibitor; an HPPD inhibitor; 2,4-D; other phenoxy auxin herbicides; aryloxyphenoxypropionate herbicides; dicamba; glufosinate herbicides; herbicides which target the protox enzyme (also referred to as "protox inhibitors").

The plant, plant cell, plant part, seed, and/or grain comprising a polynucleotide sequence disclosed herein can also be combined with at least one other trait to produce plants that further comprise a variety of desired trait combinations. For instance, the plant, plant cell, plant part, seed, and/or grain having the polynucleotide sequence may be stacked with polynucleotides encoding polypeptides having pesticidal and/or insecticidal activity, or a plant, plant cell, plant part, seed, and/or grain comprising a polynucleotide sequence provided herein may be combined with a plant disease resistance gene.

These stacked combinations can be created by any method including, but not limited to, breeding plants by any conventional methodology, or genetic transformation. If the sequences are stacked by genetically transforming the plants, the polynucleotide sequences of interest can be combined at any time and in any order. The traits can be introduced simultaneously in a co-transformation protocol with the polynucleotides of interest provided by any combination of transformation cassettes. For example, if two sequences will be introduced, the two sequences can be contained in separate transformation cassettes (trans) or contained on the same transformation cassette (cis). Expression of the sequences can be driven by the same promoter or by different promoters. In certain cases, it may be desirable to introduce a transformation cassette that will suppress the expression of the polynucleotide of interest. This may be combined with any combination of other suppression cassettes or overexpression cassettes to generate the desired combination of traits in the plant. It is further recognized that polynucleotide sequences can be stacked at a desired genomic location using a site-specific recombination system. See, for example, WO99/25821, WO99/25854, WO99/25840, WO99/25855, and WO99/25853, all of which are herein incorporated by reference.

Any plant having an inventive polynucleotide sequence disclosed herein can be used to make a food or a feed product. Such methods comprise obtaining a plant, explant, seed, plant cell, or cell comprising the polynucleotide sequence and processing the plant, explant, seed, plant cell, or cell to produce a food or feed product.

II. Methods of Using the Compositions in Plants

The plant for use in the inventive methods can be any plant species described herein. In certain embodiments, the plant is a grain plant, an oil-seed plant, or leguminous plant. In certain embodiments, the plant is maize or soybean.

A. Methods for Increasing Glutamine Synthetase Activity in a Plant

Provided are methods for increasing glutamine synthetase (GS) activity in a plant comprising expressing in a plant a GS polynucleotide encoding any of the GS polypeptides described herein.

In certain embodiments, the method comprises: expressing in a regenerable plant cell a recombinant DNA construct comprising a polynucleotide described herein; and generating the plant. In certain embodiments, the polynucleotide is operably linked to at least one regulatory sequence. In certain embodiments the at least one regulatory sequence is a heterologous promoter. The recombinant DNA construct for use in the method may be any recombinant DNA construct provided herein. In certain embodiments the recombinant DNA is expressed by introducing into a plant, plant cell, plant part, seed, and/or grain the recombinant DNA construct, whereby the polypeptide is expressed in the plant, plant cell, plant part, seed, and/or grain. In certain embodiments the recombinant DNA construct is incorporated into the genome of the plant.

In certain embodiments, the method comprises: modifying an endogenous GS gene in a plant to encode a GS protein comprising any of the GS amino acid sequences described herein (e.g., an amino acid sequence that is at least 80% identical to SEQ ID NO: 1, 2, or 3, wherein the amino acid sequence contains a mutation at one or more amino acid residues corresponding to positions S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1); and growing a plant from the plant cell.

In certain embodiments, the method comprises: (a) providing a guide RNA, at least one polynucleotide modification template, and at least one Cas endonuclease to a plant cell, wherein the at least one Cas endonuclease introduces a double stranded break at an endogenous GS gene in the plant cell, and wherein the polynucleotide modification template generates a modified GS gene that encodes any of the GS polypeptides described herein; (b) obtaining a plant from the plant cell; and (c) generating a progeny plant.

As used herein, an increase in GS activity refers to a measured increase in any parameter associated with GS enzymatic activity when compared to an appropriate control, such as the polypeptide set forth in SEQ ID NO. 1, 2, or 3. For example, GS activity can be measured by determining the Km and/or Kcat for each individual substrate (e.g., glutamate, ammonium, and/or ATP) of the reaction, or by determining the catalytic efficiency (Kcat/Km) of the GS enzyme to glutamate, ammonium, and/or ATP.

Accordingly, in certain embodiments, an increase in GS activity refers to a detectable increase in the Km, Kcat, and/or catalytic efficiency of GS to an individual substrate (e.g., glutamate, ammonium, and/or ATP), as compared to an appropriate control. A person of ordinary skill in the art can determine the Km, Kcat, and/or catalytic efficiency of an enzyme to a substrate using routine methods in the art.

B. Methods for Increasing Yield in a Plant

Provided are methods for increasing yield in a plant comprising expressing in a plant a GS polynucleotide encoding any of the GS polypeptides described herein.

In certain embodiments, the method comprises: expressing in a regenerable plant cell a recombinant DNA construct comprising a polynucleotide described herein; and generating the plant. In certain embodiments, the polynucleotide is operably linked to at least one regulatory sequence. In certain embodiments the at least one regulatory sequence is a heterologous promoter. The recombinant DNA construct for use in the method may be any recombinant DNA construct provided herein. In certain embodiments the recombinant DNA is expressed by introducing into a plant, plant cell, plant part, seed, and/or grain the recombinant DNA construct, whereby the polypeptide is expressed in the plant, plant cell, plant part, seed, and/or grain. In certain embodiments the recombinant DNA construct is incorporated into the genome of the plant.

In certain embodiments, the method comprises: modifying an endogenous GS gene in a plant to encode a GS protein comprising any of the GS amino acid sequences described herein (e.g., an amino acid sequence that is at least 80% identical to SEQ ID NO: 1, 2, or 3, wherein the amino acid sequence contains a mutation at one or more amino acid residues corresponding to positions S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1); and growing a plant from the plant cell.

In certain embodiments, the method comprises: (a) providing a guide RNA, at least one polynucleotide modification template, and at least one Cas endonuclease to a plant cell, wherein the at least one Cas endonuclease introduces a double stranded break at an endogenous GS gene in the plant cell, and wherein the polynucleotide modification template generates a modified GS gene that encodes any of the GS polypeptides described herein; (b) obtaining a plant from the plant cell; and (c) generating a progeny plant.

As used herein, "yield" refers to the amount of agricultural production harvested per unit of land and may include reference to bushels per acre of a crop at harvest, as adjusted for grain moisture (e.g., typically 15% for maize). Grain moisture is measured in the grain at harvest. The adjusted test weight of grain is determined to be the weight in pounds per bushel, adjusted for grain moisture level at harvest.

As used herein "increasing yield," "increased yield," or the like refers to any detectable increase in yield when compared to an appropriate control. In certain embodiments, an appropriate control is plant expressing a known GS polypeptide, such as the polypeptide set forth in SEQ ID NO. 1, 2, or 3.

C. Methods for Increasing Glutamine Synthetase Thermostability and/or Nitrogen Use Efficiency in a Plant Provided are methods for increasing glutamine synthetase thermostability and/or nitrogen use efficiency in a plant comprising expressing in a plant a GS polynucleotide encoding any of the GS polypeptides described herein.

In certain embodiments, the method comprises: expressing in a regenerable plant cell a recombinant DNA construct comprising a polynucleotide described herein; and generating the plant. In certain embodiments, the polynucleotide is operably linked to at least one regulatory sequence. In certain embodiments the at least one regulatory sequence is a heterologous promoter. The recombinant DNA construct for use in the method may be any recombinant DNA construct provided herein. In certain embodiments the recombinant DNA is expressed by introducing into a plant, plant cell, plant part, seed, and/or grain the recombinant DNA construct, whereby the polypeptide is expressed in the plant, plant cell, plant part, seed, and/or grain. In certain embodiments the recombinant DNA construct is incorporated into the genome of the plant.

In certain embodiments, the method comprises: modifying an endogenous GS gene in a plant to encode a GS protein comprising any of the GS amino acid sequences described herein (e.g., an amino acid sequence that is at least 80% identical to SEQ ID NO: 1, 2, or 3, wherein the amino acid sequence contains a mutation at one or more amino acid residues corresponding to positions S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1); and growing a plant from the plant cell.

In certain embodiments, the method comprises: (a) providing a guide RNA, at least one polynucleotide modification template, and at least one Cas endonuclease to a plant cell, wherein the at least one Cas endonuclease introduces a double stranded break at an endogenous GS gene in the plant cell, and wherein the polynucleotide modification template generates a modified GS gene that encodes any of the GS polypeptides described herein; (b) obtaining a plant from the plant cell; and (c) generating a progeny plant.

As used herein "N use efficiency" refers to the ratio between the amount of fertilizer N removed by a plant and the amount of fertilizer N applied. Accordingly, in certain embodiments an increase in N use efficiency refers to any detectable increase in the amount of fertilizer N removed by a plant and the amount of fertilizer N applied. A person of ordinary skill in the art can calculate N use efficiency using routine methods in the art.

As used herein "thermostability of GS," refers to the ability of GS to resist the irreversible change in enzymatic activity at high temperatures. For example, a GS polypeptide is considered to have increased thermostability when the polypeptide shows a statistically significant increase in enzymatic activity compared to a control sample (e.g., wild-type GS) at increased temperatures (e.g., 42° C., such as at least or at least about 25° C., 26° C., 27° C., 28° C., 29°

C., 30° C., 31° C., 32° C., 33° C., 34° C. or 35° C. and less than or less than about 50° C., 49° C., 48° C., 47° C., 46° C., 45° C., 44° C., 43° C., 42° C., 41° C., 40° C., 39° C., 38° C., 37° C., 36° C., 35° C., 34° C., 33° C., 32° C., 31° C. or 30° C.). A person of ordinary skill in the art can identify enzymes with increased thermostability using routine methods in the art.

D. Methods for Increasing Seed Protein Content

Provided are methods for increasing seed protein content in a seed of a plant comprising expressing in a plant a GS polynucleotide encoding any of the GS polypeptides described herein.

In certain embodiments, the method comprises: expressing in a regenerable plant cell a recombinant DNA construct comprising a polynucleotide described herein; and generating the plant. In certain embodiments, the polynucleotide is operably linked to at least one regulatory sequence. In certain embodiments the at least one regulatory sequence is a heterologous promoter. The recombinant DNA construct for use in the method may be any recombinant DNA construct provided herein. In certain embodiments the recombinant DNA is expressed by introducing into a plant, plant cell, plant part, seed, and/or grain the recombinant DNA construct, whereby the polypeptide is expressed in the plant, plant cell, plant part, seed, and/or grain. In certain embodiments the recombinant DNA construct is incorporated into the genome of the plant.

In certain embodiments, the method comprises: modifying an endogenous GS gene in a plant to encode a GS protein comprising any of the GS amino acid sequences described herein (e.g., an amino acid sequence that is at least 80% identical to SEQ ID NO: 1, 2, or 3, wherein the amino acid sequence contains a mutation at one or more amino acid residues corresponding to positions S3, T5, V8, D11, D14, C15, R18, V26, S29, L33, K41, Y55, K79, K84, Y108, K109, V113, D118, V123, Y126, A161, V171, V172, I230, E268, E271, R278, E286, K305, and D320 of SEQ ID NO: 1); and growing a plant from the plant cell.

In certain embodiments, the method comprises: (a) providing a guide RNA, at least one polynucleotide modification template, and at least one Cas endonuclease to a plant cell, wherein the at least one Cas endonuclease introduces a double stranded break at an endogenous GS gene in the plant cell, and wherein the polynucleotide modification template generates a modified GS gene that encodes any of the GS polypeptides described herein; (b) obtaining a plant from the plant cell; and (c) generating a progeny plant.

As used herein, increased seed protein content, or the like, refers to any detectable increase in total protein content in the seed of a plant compared to a seed from a control plant. Unless specified otherwise, seed protein content is measured by weight at or adjusted to a 13% moisture basis in the seed.

In certain embodiments, the seed comprising any of the GS polynucleotides described herein and/or the seed of any of the plants described herein comprising any of the GS polynucleotides described herein have a protein content increase in the seed of at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 and less than 3.0, 2.9, 2.8, 2.7, 2.6, 2.5, 2.4, 2.3, 2.2, 2.1, 2.0, 1.9, 1.8, 1.7, 1.6, or 1.5 percentage points by weight compared with an unmodified, control, null or wild-type seed (and plant producing the seed) not comprising the modification. In certain embodiments, the seeds have a protein content of at least 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0%, 40.5%, 41.0%, 41.5% or 42.0% (percentage points by weight) and less than 55%, 54%, 53%, 52%, 51%, 50%, 49%, 48%, 47%, 46%, 45% or 44% (percentage points by weight).

Various methods can be used to introduce a recombinant DNA construct of interest into a plant, plant cell, plant part, seed, and/or grain. "Introducing" is intended to mean presenting to the plant, plant cell, plant part, seed, and/or grain the polynucleotide or resulting polypeptide in such a manner that the sequence gains access to the interior of a cell of the plant. The methods of the disclosure do not depend on a particular method for introducing a recombinant DNA sequence into a plant, plant cell, seed, and/or grain, only that the polynucleotide or polypeptide gains access to the interior of at least one cell of the plant.

"Stable transformation" is intended to mean that the polynucleotide introduced into a plant integrates into the genome of the plant of interest and is capable of being inherited by the progeny thereof. "Transient transformation" is intended to mean that a polynucleotide is introduced into the plant of interest and does not integrate into the genome of the plant or organism or a polypeptide is introduced into a plant or organism. In preferred embodiments, the polynucleotide is stably transformed into the plant.

Transformation protocols as well as protocols for introducing polypeptides or polynucleotide sequences into plants may vary depending on the type of plant or plant cell, i.e., monocot or dicot, targeted for transformation. Suitable methods of introducing polypeptides and polynucleotides into plant cells include microinjection (Crossway et al. (1986) *Biotechniques* 4:320-334), electroporation (Riggs et al. (1986) *Proc. Natl. Acad. Sci. USA* 83:5602-5606, *Agrobacterium*-mediated transformation (U.S. Pat. Nos. 5,563,055 and 5,981,840), direct gene transfer (Paszkowski et al. (1984) *EMBO J.* 3:2717-2722), and ballistic particle acceleration (see, for example, U.S. Pat. Nos. 4,945,050; 5,879,918; 5,886,244; and, 5,932,782; Tomes et al. (1995) in *Plant Cell, Tissue, and Organ Culture: Fundamental Methods*, ed. Gamborg and Phillips (Springer-Verlag, Berlin); McCabe et al. (1988) *Biotechnology* 6:923-926); and Lec1 transformation (WO 00/28058). Also see Weissinger et al. (1988) *Ann. Rev. Genet.* 22:421-477; Sanford et al. (1987) *Particulate Science and Technology* 5:27-37 (onion); Christou et al. (1988) *Plant Physiol.* 87:671-674 (soybean); McCabe et al. (1988) *Bio/Technology* 6:923-926 (soybean); Finer and McMullen (1991) *In Vitro Cell Dev. Biol.* 27P:175-182 (soybean); Singh et al. (1998) *Theor. Appl. Genet.* 96:319-324 (soybean); Datta et al. (1990) *Biotechnology* 8:736-740 (rice); Klein et al. (1988) *Proc. Natl. Acad. Sci. USA* 85:4305-4309 (maize); Klein et al. (1988) *Biotechnology* 6:559-563 (maize); U.S. Pat. Nos. 5,240,855; 5,322,783; and, 5,324,646; Klein et al. (1988) *Plant Physiol.* 91:440-444 (maize); Fromm et al. (1990) *Biotechnology* 8:833-839 (maize); Hooykaas-Van Slogteren et al. (1984) *Nature* (London) 311:763-764; U.S. Pat. No. 5,736,369 (cereals); Bytebier et al. (1987) *Proc. Natl. Acad. Sci. USA* 84:5345-5349 (Liliaceae); De Wet et al. (1985) in *The Experimental Manipulation of Ovule Tissues*, ed. Chapman et al. (Longman, New York), pp. 197-209 (pollen); Kaeppler et al. (1990) *Plant Cell Reports* 9:415-418 and Kaeppler et al. (1992) *Theor. Appl. Genet.* 84:560-566 (whisker-mediated transformation); D'Halluin et al. (1992) *Plant Cell* 4:1495-1505 (electroporation); Li et al. (1993) *Plant Cell Reports* 12:250-255 and Christou and Ford (1995) *Annals of Botany* 75:407-413 (rice); Osjoda et al. (1996) *Nature Biotechnology* 14:745-750 (maize via *Agrobacterium tumefaciens*); all of which are herein incorporated by reference.

In specific embodiments, the GS sequences can be provided to a plant using a variety of transient transformation methods. Such transient transformation methods include, but are not limited to, the introduction of the GS protein directly into the plant. Such methods include, for example, microinjection or particle bombardment. See, for example, Crossway et al. (1986) *Mol Gen. Genet.* 202:179-185; Nomura et al. (1986) *Plant Sci.* 44:53-58; Hepler et al. (1994) *Proc. Natl. Acad. Sci.* 91: 2176-2180 and Hush et al. (1994) *The Journal of Cell Science* 107:775-784, all of which are herein incorporated by reference.

In other embodiments, the polynucleotides disclosed herein may be introduced into plants by contacting plants with a virus or viral nucleic acids. Generally, such methods involve incorporating a nucleotide construct of the disclosure within a DNA or RNA molecule. It is recognized that the polynucleotide sequence may be initially synthesized as part of a viral polyprotein, which later may be processed by proteolysis in vivo or in vitro to produce the desired recombinant protein. Further, it is recognized that promoters disclosed herein also encompass promoters utilized for transcription by viral RNA polymerases. Methods for introducing polynucleotides into plants and expressing a protein encoded therein, involving viral DNA or RNA molecules, are known in the art. See, for example, U.S. Pat. Nos. 5,889,191, 5,889,190, 5,866,785, 5,589,367, 5,316,931, and Porta et al. (1996) *Molecular Biotechnology* 5:209-221; herein incorporated by reference.

Methods are known in the art for the targeted insertion of a polynucleotide at a specific location in the plant genome. In one embodiment, the insertion of the polynucleotide at a desired genomic location is achieved using a site-specific recombination system. See, for example, WO99/25821, WO99/25854, WO99/25840, WO99/25855, and WO99/25853, all of which are herein incorporated by reference. Briefly, the polynucleotide disclosed herein can be contained in transfer cassette flanked by two non-recombinogenic recombination sites. The transfer cassette is introduced into a plant having stably incorporated into its genome a target site which is flanked by two non-recombinogenic recombination sites that correspond to the sites of the transfer cassette. An appropriate recombinase is provided, and the transfer cassette is integrated at the target site. The polynucleotide of interest is thereby integrated at a specific chromosomal position in the plant genome. Other methods to target polynucleotides are set forth in WO 2009/114321 (herein incorporated by reference), which describes "custom" meganucleases produced to modify plant genomes, in particular the genome of maize. See, also, Gao et al. (2010) *Plant Journal* 1:176-187.

The cells that have been transformed may be grown into plants in accordance with conventional ways. See, for example, McCormick et al. (1986) Plant Cell Reports 5:81-84. These plants may then be grown, and either pollinated with the same transformed strain or different strains, and the resulting progeny having constitutive expression of the desired phenotypic characteristic identified. Two or more generations may be grown to ensure that expression of the desired phenotypic characteristic is stably maintained and inherited and then seeds harvested to ensure expression of the desired phenotypic characteristic has been achieved. In this manner, the present disclosure provides transformed seed (also referred to as "transgenic seed") having a polynucleotide disclosed herein, for example, as part of an expression cassette, stably incorporated into their genome.

Transformed plant cells which are derived by plant transformation techniques, including those discussed above, can be cultured to regenerate a whole plant which possesses the transformed genotype (i.e., an inventive polynucleotide), and thus the desired phenotype, such as increased yield. For transformation and regeneration of maize see, Gordon-Kamm et al., *The Plant Cell,* 2:603-618 (1990). Plant regeneration from cultured protoplasts is described in Evans et al. (1983) *Protoplasts Isolation and Culture, Handbook of Plant Cell Culture*, pp 124-176, Macmillan Publishing Company, New York; and Binding (1985) *Regeneration of Plants, Plant Protoplasts* pp 21-73, CRC Press, Boca Raton. Regeneration can also be obtained from plant callus, explants, organs, or parts thereof. Such regeneration techniques are described generally in Klee et al. (1987) *Ann Rev of Plant Phys* 38:467.

One of skill will recognize that after the expression cassette containing a polynucleotide described herein is stably incorporated in transgenic plants and confirmed to be operable, it can be introduced into other plants by sexual crossing. Any of a number of standard breeding techniques can be used, depending upon the species to be crossed.

In vegetatively propagated crops, mature transgenic plants can be propagated by the taking of cuttings or by tissue culture techniques to produce multiple identical plants. Selection of desirable transgenics is made and new varieties are obtained and propagated vegetatively for commercial use. In seed propagated crops, mature transgenic plants can be self-crossed to produce a homozygous inbred plant. The inbred plant produces seed containing the newly introduced heterologous nucleic acid. These seeds can be grown to produce plants that would produce the selected phenotype.

Parts obtained from the regenerated plant, such as flowers, seeds, leaves, branches, fruit, and the like are included, provided that these parts comprise cells comprising the inventive polynucleotide. Progeny and variants, and mutants of the regenerated plants are also included, provided that these parts comprise the introduced nucleic acid sequences.

In one embodiment, a homozygous transgenic plant can be obtained by sexually mating (selfing) a heterozygous transgenic plant that contains a single added heterologous nucleic acid, germinating some of the seed produced and analyzing the resulting plants produced for altered cell division relative to a control plant (i.e., native, non-transgenic). Back-crossing to a parental plant and out-crossing with a non-transgenic plant are also contemplated.

E. Modifying an Endogenous Glutamine Synthetase (GS) Gene

As used herein, "endogenous gene" refers to a gene that is original to a host plant and can be used synonymously with "host genomic DNA," "pre-existing DNA," and the like. Moreover, for the purposes herein, an endogenous GS gene includes coding DNA and genomic DNA within and surrounding the coding DNA, such as for example, the promoter, intron, and terminator sequences.

Methods to modify or alter endogenous genomic DNA are known in the art. For example, a pre-existing or endogenous GS sequence in a host plant can be modified or altered in a site-specific fashion using one or more site-specific engineering systems.

Methods and compositions are provided herein for modifying naturally-occurring polynucleotides or integrated transgenic sequences, including regulatory elements, coding sequences, and non-coding sequences. These methods and compositions are also useful in targeting nucleic acids to pre-engineered target recognition sequences in the genome.

Modification of polynucleotides may be accomplished, for example, by introducing single- or double-strand breaks into the DNA molecule.

Double-strand breaks induced by double-strand-break-inducing agents, such as endonucleases that cleave the phosphodiester bond within a polynucleotide chain, can result in the induction of DNA repair mechanisms, including the non-homologous end-joining pathway, and homologous recombination. Endonucleases include a range of different enzymes, including restriction endonucleases (see e.g. Roberts et al., (2003) Nucleic Acids Res 1:418-20), Roberts et al., (2003) Nucleic Acids Res 31:1805-12, and Belfort et al., (2002) in Mobile DNA II, pp. 761-783, Eds. Craigie et al., (ASM Press, Washington, DC)), meganucleases (see e.g., WO 2009/114321; Gao et al. (2010) Plant Journal 1:176-187), TAL effector nucleases or TALENs (see e.g., US20110145940, Christian, M., T. Cermak, et al. 2010. Targeting DNA double-strand breaks with TAL effector nucleases. Genetics 186(2): 757-61 and Boch et al., (2009), Science 326(5959): 1509-12), zinc finger nucleases (see e.g. Kim, Y. G., J. Cha, et al. (1996). "Hybrid restriction enzymes: zinc finger fusions to FokI cleavage"), and CRISPR-Cas endonucleases (see e.g. WO2007/025097 application published Mar. 1, 2007).

Once a double-strand break is induced in the genome, cellular DNA repair mechanisms are activated to repair the break. There are two DNA repair pathways. One is termed nonhomologous end-joining (NHEJ) pathway (Bleuyard et al., (2006) DNA Repair 5:1-12) and the other is homology-directed repair (HDR). The structural integrity of chromosomes is typically preserved by NHEJ, but deletions, insertions, or other rearrangements (such as chromosomal translocations) are possible (Siebert and Puchta, 2002, Plant Cell 14:1121-31; Pacher et al., 2007, Genetics 175:21-9. The HDR pathway is another cellular mechanism to repair double-stranded DNA breaks and includes homologous recombination (HR) and single-strand annealing (SSA) (Lieber. 2010 Annu. Rev. Biochem. 79:181-211).

In addition to the double-strand break inducing agents, site-specific base conversions can also be achieved to engineer one or more nucleotide changes to create one or more modifications described herein into the genome. These include for example, a site-specific base edit mediated by an C•G to T•A or an A•T to G•C base editing deaminase enzymes (Gaudelli et al., Programmable base editing of A•T to G•C in genomic DNA without DNA cleavage." Nature (2017); Nishida et al. "Targeted nucleotide editing using hybrid prokaryotic and vertebrate adaptive immune systems." Science 353 (6305) (2016); Komor et al. "Programmable editing of a target base in genomic DNA without double-stranded DNA cleavage." Nature 533 (7603) (2016): 420-4.

In the methods described herein, the endogenous GS gene may be modified by a CRISPR associated (Cas) endonuclease, a Zn-finger nuclease-mediated system, a meganuclease-mediated system, an oligonucleobase-mediated system, or any gene modification system known to one of ordinary skill in the art.

In certain embodiments the endogenous GS gene is modified by a CRISPR associated (Cas) endonuclease.

Class I Cas endonucleases comprise multisubunit effector complexes (Types I, Ill, and IV), while Class 2 systems comprise single protein effectors (Types II, V, and VI) (Makarova et al. 2015, Nature Reviews Microbiology Vol. 13:1-15; Zetsche et al., 2015, Cell 163, 1-13; Shmakov et al., 2015, Molecular Cell 60, 1-13; Haft et al., 2005, Computational Biology, PLoS Comput Biol 1(6): e60; and Koonin et al. 2017, Curr Opinion Microbiology 37:67-78). In Class 2 Type II systems, the Cas endonuclease acts in complex with a guide polynucleotide.

Accordingly, in certain embodiments of the methods described herein the Cas endonuclease forms a complex with a guide polynucleotide (e.g., guide polynucleotide/Cas endonuclease complex).

As used herein, the term "guide polynucleotide", relates to a polynucleotide sequence that can form a complex with a Cas endonuclease, including the Cas endonucleases described herein, and enables the Cas endonuclease to recognize, optionally bind to, and optionally cleave a DNA target site. The guide polynucleotide sequence can be a RNA sequence, a DNA sequence, or a combination thereof (a RNA-DNA combination sequence). The guide polynucleotide may further comprise a chemically-modified base, such as, but not limited to Locked Nucleic Acid (LNA), 5-methyl dC, 2,6-Diaminopurine, 2'-Fluoro A, 2'-Fluoro U, 2'-O-Methyl RNA, Phosphorothioate bond, linkage to a cholesterol molecule, linkage to a polyethylene glycol molecule, linkage to a spacer 18 (hexaethylene glycol chain) molecule, or 5' to 3' covalent linkage resulting in circularization.

In certain embodiments, the Cas endonuclease forms a complex with a guide polynucleotide (e.g., gRNA) that directs the Cas endonuclease to cleave the DNA target to enable target recognition, binding, and cleavage by the Cas endonuclease. The guide polynucleotide (e.g., gRNA) may comprise a Cas endonuclease recognition (CER) domain that interacts with the Cas endonuclease, and a Variable Targeting (VT) domain that hybridizes to a nucleotide sequence in a target DNA. In certain embodiments, the guide polynucleotide (e.g., gRNA) comprises a CRISPR nucleotide (crNucleotide; e.g., crRNA) and a trans-activating CRISPR nucleotide (tracrNucleotide; e.g., tracrRNA) to guide the Cas endonuclease to its DNA target. The guide polynucleotide (e.g., gRNA) comprises a spacer region complementary to one strand of the double strand DNA target and a region that base pairs with the tracrNucleotide (e.g., tracrRNA), forming a nucleotide duplex (e.g. RNA duplex).

In certain embodiments, the gRNA is a "single guide RNA" (sgRNA) that comprises a synthetic fusion of crRNA and tracrRNA. In many systems, the Cas endonuclease-guide polynucleotide complex recognizes a short nucleotide sequence adjacent to the target sequence (protospacer), called a "protospacer adjacent motif" (PAM).

The terms "single guide RNA" and "sgRNA" are used interchangeably herein and relate to a synthetic fusion of two RNA molecules, a crRNA (CRISPR RNA) comprising a variable targeting domain (linked to a tracr mate sequence that hybridizes to a tracrRNA), fused to a tracrRNA (trans-activating CRISPR RNA). The single guide RNA can comprise a crRNA or crRNA fragment and a tracrRNA or tracrRNA fragment of the type II CRISPR/Cas system that can form a complex with a type II Cas endonuclease, wherein said guide RNA/Cas endonuclease complex can direct the Cas endonuclease to a DNA target site, enabling the Cas endonuclease to recognize, optionally bind to, and optionally nick or cleave (introduce a single or double-strand break) the DNA target site.

The nucleotide sequence linking the crNucleotide and the tracrNucleotide of a single guide polynucleotide can comprise a RNA sequence, a DNA sequence, or a RNA-DNA combination sequence. In one embodiment, the nucleotide sequence linking the crNucleotide and the tracrNucleotide of a single guide polynucleotide can be at least 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 78, 79, 80, 81, 82, 83, 84, 85, 86, 87, 88, 89, 90, 91, 92, 93, 94, 95, 96, 97, 98, 99 or 100 nucleotides in length. In one embodiment, the nucleotide sequence linking the crNucleotide and the tracrNucleotide of a single guide polynucleotide can comprise a tetraloop sequence, such as, but not limiting to a GAAA tetraloop sequence.

The term "variable targeting domain" or "VT domain" is used interchangeably herein and includes a nucleotide sequence that can hybridize (is complementary) to one strand (nucleotide sequence) of a double strand DNA target site. The percent complementation between the first nucleotide sequence domain (VT domain) and the target sequence can be at least 50%, 51%, 52%, 53%, 54%, 55%, 56%, 57%, 58%, 59%, 60%, 61%, 62%, 63%, 63%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100%. The variable targeting domain can be at least 12, 13, 14, 15, 16, 17, 18, 19, 20, 21, 22, 23, 24, 25, 26, 27, 28, 29 or 30 nucleotides in length. In some embodiments, the variable targeting domain comprises a contiguous stretch of 12 to 30 nucleotides. The variable targeting domain can be composed of a DNA sequence, a RNA sequence, a modified DNA sequence, a modified RNA sequence, or any combination thereof.

The term "Cas endonuclease recognition domain" or "CER domain" (of a guide polynucleotide) is used interchangeably herein and includes a nucleotide sequence that interacts with a Cas endonuclease polypeptide. A CER domain comprises a (trans-acting) tracrNucleotide mate sequence followed by a tracrNucleotide sequence. The CER domain can be composed of a DNA sequence, a RNA sequence, a modified DNA sequence, a modified RNA sequence (see for example US20150059010A1, published 26 Feb. 2015), or any combination thereof.

A "protospacer adjacent motif" (PAM) as used herein refers to a short nucleotide sequence adjacent to a target sequence (protospacer) that is recognized (targeted) by a guide polynucleotide/Cas endonuclease system described herein. In certain embodiments, the Cas endonuclease may not successfully recognize a target DNA sequence if the target DNA sequence is not adjacent to, or near, a PAM sequence. In certain embodiments, the PAM precedes the target sequence (e.g. Cas12a). In certain embodiments, the PAM follows the target sequence (e.g. *S. pyogenes* Cas9). The sequence and length of a PAM herein can differ depending on the Cas protein or Cas protein complex used. The PAM sequence can be of any length but is typically 1, 2, 3, 4, 5, 6, 7, 8, 9, 10, 11, 12, 13, 14, 15, 16, 17, 18, 19 or 20 nucleotides long.

As used herein, the terms "guide polynucleotide/Cas endonuclease complex", "guide polynucleotide/Cas endonuclease system", "guide polynucleotide/Cas complex", "guide polynucleotide/Cas system" and "guided Cas system" "polynucleotide-guided endonuclease", and "PGEN" are used interchangeably herein and refer to at least one guide polynucleotide and at least one Cas endonuclease, that are capable of forming a complex, wherein said guide polynucleotide/Cas endonuclease complex can direct the Cas endonuclease to a DNA target site, enabling the Cas endonuclease to recognize, bind to, and optionally nick or cleave (introduce a single or double-strand break) the DNA target site. A guide polynucleotide/Cas endonuclease complex herein can comprise Cas protein(s) and suitable polynucleotide component(s) of any of the known CRISPR systems (Horvath and Barrangou, 2010, Science 327:167-170; Makarova et al. 2015, Nature Reviews Microbiology Vol. 13:1-15; Zetsche et al., 2015, Cell 163, 1-13; Shmakov et al., 2015, Molecular Cell 60, 1-13). In certain embodiments, the guide polynucleotide/Cas endonuclease complex is provided as a ribonucleoprotein (RNP), wherein the Cas endonuclease component is provided as a protein and the guide polynucleotide component is provided as a ribonucleotide.

Examples of Cas endonucleases for use in the methods described herein include, but are not limited to, Cas9 and Cpf1. Cas9 (formerly referred to as Cas5, Csn1, or Csx12) is a Class 2 Type II Cas endonuclease (Makarova et al. 2015, Nature Reviews Microbiology Vol. 13:1-15). A Cas9-gRNA complex recognizes a 3' PAM sequence (NGG for the *S. pyogenes* Cas9) at the target site, permitting the spacer of the guide RNA to invade the double-stranded DNA target, and, if sufficient homology between the spacer and protospacer exists, generate a double-strand break cleavage. Cas9 endonucleases comprise RuvC and HNH domains that together produce double strand breaks, and separately can produce single strand breaks. For the *S. pyogenes* Cas9 endonuclease, the double-strand break leaves a blunt end. Cpf1 is a Clas 2 Type V Cas endonuclease, and comprises nuclease RuvC domain but lacks an HNH domain (Yamane et al., 2016, Cell 165:949-962). Cpf1 endonucleases create "sticky" overhang ends.

Some uses for Cas9-gRNA systems at a genomic target site include, but are not limited to, insertions, deletions, substitutions, or modifications of one or more nucleotides at the target site; modifying or replacing nucleotide sequences of interest (such as a regulatory elements); insertion of polynucleotides of interest; gene knock-out; gene-knock in; modification of splicing sites and/or introducing alternate splicing sites; modifications of nucleotide sequences encoding a protein of interest; amino acid and/or protein fusions; and gene silencing by expressing an inverted repeat into a gene of interest.

The terms "target site", "target sequence", "target site sequence", "target DNA", "target locus", "genomic target site", "genomic target sequence", "genomic target locus" and "protospacer", are used interchangeably herein and refer to a polynucleotide sequence such as, but not limited to, a nucleotide sequence on a chromosome, episome, a locus, or any other DNA molecule in the genome (including chromosomal, chloroplastic, mitochondrial DNA, plasmid DNA) of a cell, at which a guide polynucleotide/Cas endonuclease complex can recognize, bind to, and optionally nick or cleave. The target site can be an endogenous site in the genome of a cell, or alternatively, the target site can be heterologous to the cell and thereby not be naturally occurring in the genome of the cell, or the target site can be found in a heterologous genomic location compared to where it occurs in nature. As used herein, terms "endogenous target sequence" and "native target sequence" are used interchangeable herein to refer to a target sequence that is endogenous or native to the genome of a cell and is at the endogenous or native position of that target sequence in the genome of the cell. An "artificial target site" or "artificial target sequence" are used interchangeably herein and refer to a target sequence that has been introduced into the genome of a cell. Such an artificial target sequence can be identical in sequence to an endogenous or native target sequence in the genome of a cell but be located in a different position (i.e., a non-endogenous or non-native position) in the genome of a cell. An "altered target site", "altered target sequence", "modified target site", "modified target sequence" are used interchangeably herein and refer to a target sequence as disclosed herein that comprises at least one alteration when compared to non-altered target sequence. Such "alterations" include, for example: (i) replacement of at least one nucleotide, (ii) a deletion of at least one nucleotide, (iii) an insertion of at least one nucleotide, or (iv) any combination of (i)-(iii).

A "polynucleotide modification template" is also provided that comprises at least one nucleotide modification when compared to the nucleotide sequence to be edited. For example, a modification in the endogenous gene corresponding to SEQ ID NO: 1 to induce an amino substitution in the encoded polypeptide. A nucleotide modification can be at least one nucleotide substitution, addition, deletion, or chemical alteration. Optionally, the polynucleotide modification template can further comprise homologous nucleotide sequences flanking the at least one nucleotide modification, wherein the flanking homologous nucleotide sequences provide sufficient homology to the desired nucleotide sequence to be edited.

In certain embodiments of the methods disclosed herein, a polynucleotide of interest is inserted at a target site and provided as part of a "donor DNA" molecule. As used herein, "donor DNA" is a DNA construct that comprises a polynucleotide of interest to be inserted into the target site of a Cas endonuclease. The donor DNA construct further comprises a first and a second region of homology that flank the polynucleotide of interest. The first and second regions of homology of the donor DNA share homology to a first and a second genomic region, respectively, present in or flanking the target site of the cell or organism genome. The donor DNA can be tethered to the guide polynucleotide. Tethered donor DNAs can allow for co-localizing target and donor DNA, useful in genome editing, gene insertion, and targeted genome regulation, and can also be useful in targeting post-mitotic cells where function of endogenous HR machinery is expected to be highly diminished (Mali et al., 2013, Nature Methods Vol. 10: 957-963). The amount of homology or sequence identity shared by a target and a donor polynucleotide can vary and includes total lengths and/or regions.

The process for editing a genomic sequence at a Cas9-gRNA double-strand-break site with a modification template generally comprises: providing a host cell with a Cas9-gRNA complex that recognizes a target sequence in the genome of the host cell and is able to induce a double-strand-break in the genomic sequence, and at least one polynucleotide modification template comprising at least one nucleotide alteration when compared to the nucleotide sequence to be edited. The polynucleotide modification template can further comprise nucleotide sequences flanking the at least one nucleotide alteration, in which the flanking sequences are substantially homologous to the chromosomal region flanking the double-strand break. Genome editing using double-strand-break-inducing agents, such as Cas9-gRNA complexes, has been described, for example in US20150082478 published on 19 Mar. 2015, WO2015026886 published on 26 Feb. 2015, WO2016007347 published 14 Jan. 2016, and WO2016025131 published on 18 Feb. 2016.

To facilitate optimal expression and nuclear localization for eukaryotic cells, the gene comprising the Cas endonuclease may be optimized as described in WO2016186953 published 24 Nov. 2016, and then delivered into cells as DNA expression cassettes by methods known in the art. In certain embodiments, the Cas endonuclease is provided as a polypeptide. In certain embodiments, the Cas endonuclease is provided as a polynucleotide encoding a polypeptide. In certain embodiments, the guide RNA is provided as a DNA molecule encoding one or more RNA molecules. In certain embodiments, the guide RNA is provided as RNA or chemically-modified RNA. In certain embodiments, the Cas endonuclease protein and guide RNA are provided as a ribonucleoprotein complex (RNP).

In certain embodiments of the inventive methods described herein the endogenous GS gene is modified by a zinc-finger-mediated genome editing process. The zinc-finger-mediated genome editing process for editing a chromosomal sequence includes for example: (a) introducing into a cell at least one nucleic acid encoding a zinc finger nuclease that recognizes a target sequence in the chromosomal sequence and is able to cleave a site in the chromosomal sequence, and, optionally, (i) at least one donor polynucleotide that includes a sequence for integration flanked by an upstream sequence and a downstream sequence that exhibit substantial sequence identity with either side of the cleavage site, or (ii) at least one exchange polynucleotide comprising a sequence that is substantially identical to a portion of the chromosomal sequence at the cleavage site and which further comprises at least one nucleotide change; and (b) culturing the cell to allow expression of the zinc finger nuclease such that the zinc finger nuclease introduces a double-stranded break into the chromosomal sequence, and wherein the double-stranded break is repaired by (i) a non-homologous end-joining repair process such that an inactivating mutation is introduced into the chromosomal sequence, or (ii) a homology-directed repair process such that the sequence in the donor polynucleotide is integrated into the chromosomal sequence or the sequence in the exchange polynucleotide is exchanged with the portion of the chromosomal sequence.

A zinc finger nuclease includes a DNA binding domain (i.e., zinc finger) and a cleavage domain (i.e., nuclease). The nucleic acid encoding a zinc finger nuclease may include DNA or RNA. Zinc finger binding domains may be engineered to recognize and bind to any nucleic acid sequence of choice. See, for example, Beerli et al. (2002) Nat. Biotechnol. 20:135-141; Pabo et al. (2001) Ann. Rev. Biochem. 70:313-340; Choo et al. (2000) Curr. Opin. Struct. Biol. 10:411-416; and Doyon et al. (2008) Nat. Biotechnol. 26:702-708; Santiago et al. (2008) Proc. Natl. Acad. Sci. USA 105:5809-5814; Urnov, et al., (2010) Nat Rev Genet. 11(9):636-46; and Shukla, et al., (2009) Nature 459 (7245): 437-41. An engineered zinc finger binding domain may have a novel binding specificity compared to a naturally-occurring zinc finger protein. As an example, the algorithm of described in U.S. Pat. No. 6,453,242 may be used to design a zinc finger binding domain to target a preselected sequence. Nondegenerate recognition code tables may also be used to design a zinc finger binding domain to target a specific sequence (Sera et al. (2002) Biochemistry 41:7074-7081). Tools for identifying potential target sites in DNA sequences and designing zinc finger binding domains may be used (Mandell et al. (2006) Nuc. Acid Res. 34:W516-W523; Sander et al. (2007) Nuc. Acid Res. 35:W599-W605).

An exemplary zinc finger DNA binding domain recognizes and binds a sequence having at least about 80% sequence identity with the desired target sequence. In other embodiments, the sequence identity may be about 81%, 82%, 83%, 84%, 85%, 86%, 87%, 88%, 89%, 90%, 91%, 92%, 93%, 94%, 95%, 96%, 97%, 98%, 99%, or 100%.

A zinc finger nuclease also includes a cleavage domain. The cleavage domain portion of the zinc finger nucleases may be obtained from any endonuclease or exonuclease. Non-limiting examples of endonucleases from which a cleavage domain may be derived include, but are not limited to, restriction endonucleases and homing endonucleases. See, for example, 2010-2011 Catalog, New England Biolabs, Beverly, Mass.; and Belfort et al. (1997) Nucleic Acids Res. 25:3379-3388. Additional enzymes that cleave DNA are known (e.g., 51 Nuclease; mung bean nuclease; pancreatic DNase I; micrococcal nuclease; yeast HO endonuclease). One or more of these enzymes (or functional fragments thereof) may be used as a source of cleavage domains.

In certain embodiments of the methods described herein the endogenous GS gene is modified by using "custom" meganucleases produced to modify plant genomes (see e.g., WO 2009/114321; Gao et al. (2010) Plant Journal 1:176-187). The term "meganuclease" generally refers to a naturally-occurring homing endonuclease that binds double-stranded DNA at a recognition sequence that is greater than 12 base pairs and encompasses the corresponding intron insertion site. Naturally-occurring meganucleases can be monomeric (e.g., I-ScelI) or dimeric (e.g., I-CreI). The term meganuclease, as used herein, can be used to refer to monomeric meganucleases, dimeric meganucleases, or to the monomers which associate to form a dimeric meganuclease.

Naturally-occurring meganucleases, for example, from the LAGLIDADG family, have been used to effectively promote site-specific genome modification in plants, yeast, Drosophila, mammalian cells and mice. Engineered meganucleases such as, for example, LIG-34 meganucleases, which recognize and cut a 22 basepair DNA sequence found in the genome of Zea mays (maize) are known (see e.g., US 20110113509).

In certain embodiments of the methods described herein the endogenous GS gene is modified by using TAL endonucleases (TALEN). TAL (transcription activator-like) effectors from plant pathogenic Xanthomonas are important virulence factors that act as transcriptional activators in the plant cell nucleus, where they directly bind to DNA via a central domain of tandem repeats. A transcription activator-like (TAL) effector-DNA modifying enzymes (TALE or TALEN) are also used to engineer genetic changes. See e.g., US20110145940, Boch et al., (2009), Science 326(5959): 1509-12. Fusions of TAL effectors to the FokI nuclease provide TALENs that bind and cleave DNA at specific locations. Target specificity is determined by developing customized amino acid repeats in the TAL effectors.

In certain embodiments of the methods described herein the endogenous GS gene is modified by using base editing, such as an oligonucleobase-mediated system. In addition to the double-strand break inducing agents, site-specific base conversions can also be achieved to engineer one or more nucleotide changes to create one or more EMEs described herein into the genome. These include for example, a site-specific base edit mediated by a C•G to T•A or an A•T to G•C base editing deaminase enzymes (Gaudelli et al., Programmable base editing of A•T to G•C in genomic DNA without DNA cleavage." Nature (2017); Nishida et al. "Targeted nucleotide editing using hybrid prokaryotic and vertebrate adaptive immune systems." Science 353 (6305) (2016); Komor et al. "Programmable editing of a target base in genomic DNA without double-stranded DNA cleavage." Nature 533 (7603) (2016):420-4. Catalytically dead dCas9 fused to a cytidine deaminase or an adenine deaminase protein becomes a specific base editor that can alter DNA bases without inducing a DNA break. Base editors convert C→T (or G→A on the opposite strand) or an adenine base editor that would convert adenine to inosine, resulting in an A→G change within an editing window specified by the gRNA.

The following are examples of specific embodiments of some aspects of the invention. The examples are offered for illustrative purposes only and are not intended to limit the scope of the invention in any way.

Example 1

This example demonstrates the generation of glutamine synthetase (GS) mutations.

GS is a central enzyme in nitrogen assimilation by catalyzing ammonium, glutamate, and ATP to glutamine. Among the maize GS1 family members, maize GS1-5 is highly conserved. Additionally, because of its loose pentamer-pentamer interaction structure, GS1-5 shows low thermostability. Therefore, a directed evolution approach was employed to increase GS1-5 diversity to improve thermostability. Thus, DNA shuffling was performed to generate GS diversity towards stabilizing the enzyme and improving its catalytic efficiency.

Briefly, based on the diversity in the coding sequence of five maize GS family members, four shuffled libraries were created (Table 3) that contain roughly $2.3 \times 10^9$ variants. The shuffled variants were transformed into an E. coli GS knockout strain (GE Dharmacon). The transformed E. coli were grown under stringent M9 medium without glutamine. A total of 3072 shuffled variants with normal function were recovered from the first round of screening. The variants recovered from the first round of screening were additionally screened for GS activity, and from the second round of screening 176 hits were identified. The top 22 of these hits were selected for protein purification and detailed enzyme kinetic analysis.

The results from this example show the production of the inventive polynucleotides encoding GS polypeptides.

Example 2

This example demonstrates that GS enzymes encoded by the inventive polynucleotides have improved enzymatic activity.

The maize GS variants selected in Example 1 were purified by FPLC and the $K_m$ and $K_{cat}$ of each GS variant was determined. Briefly, the E. coli glutamine synthetase knockout strain was transformed individually with each of the shuffled GS constructs. Single colonies were selected and gown in LB liquid medium overnight at 37° C. The cell cultures were diluted to 200 ml of LB at a 1:20 ratio and were grown to an OD of 0.5 at 37° C. Protein expression was induced by the addition of 0.1 mM IPTG and the cultures were incubated at 37° C. overnight. Cell pellets were collected, and the total soluble protein was extracted using the B-PER Bacterial Protein Extraction buffer with the Halt Protease Inhibitor Cocktail (Thermo Scientific). The His-tagged recombinant GS proteins were loaded onto a Nickel column by FPLC and were eluted with 500 mM imidazole in 50 mM Tris at pH 7.4 and 500 mM NaCl. The purified GS recombinant proteins were desalted by PD-10 columns (GE Healthcare), and protein concentration was measured in a Bradford assay or by reading the densitometry of purified protein band on SDS-page gel.

The GS enzymatic activity of the crude *E. coli* lysate was measured by the GS transferase activity assay. Briefly, 100 µl of reaction mixture containing 100 mM MOPS (pH7), 30 mM glutamine, 1 mM $MnCl_2$, 0.4 mM ADP, 10 mM sodium arsenate and 80 mM hydroxylamine, was incubated with 20 µl of the GS protein extract at room temperature. After 30 min, the reaction was stopped by adding 150 µl of 0.37M $FeCl_3$, 0.67M HCl and 0.2M trichloroacetic acid. The product γ-glutamyl hydroxamate were determined by reading OD at 540 nM.

The GS biosynthetic activity assay was used to determine the enzyme kinetics of the purified GS variants. The GS activity was measured by the formation of Pi in the biosynthetic reaction with glutamate, $NH_4$ and ATP as substrates using the methods described in Gawronski et al. (*Analytical Biochemistry*, 327: 114-118 (2004)). The enzyme kinetic parameters were calculated using GraphPad Prism7 (GraphPad Software).

Five GS1-5 variants, listed as B1 (SEQ ID NO: 4), G12 (SEQ ID NO: 5), E8 (SEQ ID NO: 8), D8 (SEQ ID NO: 7), and B9 (SEQ ID NO: 6) were determined to have the most significant improvement in $K_m$ and/or $K_{cat}$. Specifically, as shown in Table 4, the catalytic efficiency ($K_m/K_{cat}$) of B1 to glutamate, ammonium, and ATP is 8.1×, 92.4×, and 3.5× higher than that of WT GS1-5, respectively. Additionally, variant G12 was determined to have the highest $K_{cat}$ towards each substrate compared to WT GS1-5. Specifically, G12 has a 4.7×, 11.4×, and 5.6× increase in Kcat for glutamate, ammonium, and ATP, respectively.

Compared to wild-type maize GS1-5 (SEQ ID NO: 1), B1 has 10 substitutions, S3L, C15N, K41S, K109N, V123E, A161V, V172A, E268A, E271R, and K305S; G12 has 5 substitutions, Y55F, K79R, Y108H, Y126F, and E286D; E8 has 9 substitutions, T5S, D11N, R18K, V26I, S29T, V113I, I230V, R278K, and D320E; D8 has 6 substitutions, T5S, D11N, R18K, I230V, R278K, and D320E; and B9 has 10 substitutions, T5S, V8I, D11N, V26I, L33V, K84R, V113I, V171I, I230V, and D320Q.

Taken together, the results of this example show that GS enzymes encoded by the evaluated polynucleotides have improved enzymatic activity and efficiency.

Example 3

This example identifies the location and predicted functional relevance of certain amino acid substitutions.

A ZmGS1-5 3D structure was built with high confidence on the basis of the ZmGS1-3 crystal structure (pdb:2d3a, Unno et al., 2006, J. Bio. Chem. 281:29287-29296) because of the high sequence similarity between those two proteins.

The overall structure complex exhibits a decameric sandwich topology composed of two face-to-face homo-pentameric rings. Each monomer within the pentamer consists of two crescent-shaped half β-barrels back-to-back, a smaller N-terminal domain (1-103) and a larger C-terminal domain (104-356). Five monomers assemble around a 5-fold axis with the N-terminal half barrel of one monomer coupled to the C-terminal half barrel from the neighboring monomer forming the active-site channel at the interface (FIG. 1A).

In contrast to a loose contact between two pentamers, the monomer-monomer interaction is intensive and critical to pentamer stability and proper substrate alignment facilitating the reaction. Among the maize paralogs, GS1-5 has the lowest thermostability. Consistent with these observations, a rationally designed GS1-5 mutant of A160I/A161I at monomer-monomer interface enhances both protein stability and catalytic activity. The active-site channel is at the center of interface β-barrel, and a vast majority of ligand binding residues come from β strands of the barrel (FIG. 1A). The catalytic residues are invariant among the close homologues and all the active variants from our gene shuffling, reflecting a fact that GS is an essential and evolutionally well-refined enzyme. Conceivably, most observed functional enhancement in gene shuffling likely results from the fine-tuning of the active-site conformation and enzyme stability.

Catalytic efficiency improvement of variant G12 (SEQ ID NO: 5) is mainly from the active site modulation at Y55F and Y126F. Compared to wild-type maize GS1-5 (SEQ ID NO: 1), G12 has 5 substitutions, Y55F, K79R, Y108H, Y126F, and E286D. Y108H, K79R and E286D are on surface, and only K78R is near the monomer interface. However, Y55F and Y126F occur at the active-site β-barrel strands and the enzyme interior (FIG. 1B). The down-size mutations could modulate the catalytic residue positions, which, in turn, alters the catalytic efficiency.

Variants D8, E8, and B9 change the interface and improve pentamer stability from substitution at R18K, K79R, I230V and D320E. These three variants share several substitution sites, and most of the mutations are on and nearby the monomeric-monomeric interface and N-domain—C-domain interface (FIG. 1C).

Variant B1 showed the higher enzymatic activity because of interface stabilization and active site modification at C15N, K41S, V123E, A161V and K305S. B1 has the most substitutions of all the variants. FIG. 1D shows the influential ones, and C15, K41, and A161 are at interface. The A161I mutation has been shown to be particularly effective to increase the enzyme stability. K305S is in a loop which plays a critical role in regulating substrate (glutamate) intake and product egress (Seabra and Carvalho, 2015, Front Plant Sci. 6:578).

Taken together, these results identified the location and predicted functional relevance of certain amino acid substitutions.

Example 4

The example demonstrates that the inventive polynucleotides encode GS proteins with improved thermostability.

The wild-type maize GS1-5 protein shows low thermostability due to the unique pentamer-pentamer interaction structure. Therefore, the GS1-5 variants AA160/161GI (SEQ ID NO: 58) and B1 (SEQ ID NO: 4) were tested for changes in thermostability. Briefly, maize GS1-5 wild-type protein (SEQ ID NO: 1) and variants AA160/161GI and B1 were incubated at 42° C. for 0, 2, 5, and 10 min. The residual GS activity for each protein for each incubation period was examined using the GS biosynthetic activity assay described above.

As shown in FIG. 2, two minutes of heat treatment at 42° C. significantly reduced the activity of the maize wild-type GS1-5 protein. Additionally, residual activity of maize wild-type GS1-5 protein was reduced to only 8.7% after 10 minutes of heat treatment at 42° C. By contrast, GS variants AA160/1GI and B1 showed significant improvement in thermostability compared to wild-type GS1-5 protein. For example, after 10 minutes of heat treatment at 42° C., GS variant B1 maintained 80.5% of its GS activity.

These results demonstrate that GS1-5 variant enzymes have improved thermostability compared to maize wild-type GS1-5.

Example 5

This example demonstrates that expression of GS1 enzymes in maize leads to increased yield Maize transformed with polynucleotide sequences encoding maize GS1-5 wild-type (SEQ ID NO: 1), maize GS1-1 (SEQ ID NO: 53) and homologs of GS1-5 from the plant species *Chlorophytum comosum* (CV-GS1), *Peperomia caperata* (PC-GS1-P7 and PC-GS1-E20), *Delosperma nubigenum* (DN-GS1), *Sesbania bispinosa* (SBI-GS1), *Eschscholzia californica* (EC-GS1), *Amaranthus hypochondriacus* (AH-GS1) under the control of the maize UB11 promoter were field tested for yield increase. Predicted null segregant yield was calculated by subtracting the multiyear average yield penalty of bulk null yield versus wild-type controls, from the measured wild-type control yield value, thereby allowing predicted yield advantages to be calculated with significance drawn above a five bushel/acre threshold.

As shown in Table 5, maize transformed with maize GS1-1 (SEQ ID NO: 53) and homologs of GS1-5 from the plant species *Chlorophytum comosum* (CV-GS1), *Peperomia caperata* (PC-GS1-P7), *Delosperma nubigenum* (DN-GS1), *Sesbania bispinosa* (SBI-GS1), *Eschscholzia californica* (EC-GS1), *Amaranthus hypochondriacus* (AH-GS1) have an increased yield compared to maize transformed with GS1-5 wild-type.

Additionally, as shown in Table 6, the GS enzymes shown to have improved yield have amino acid sequences that are as low as 82% identical to SEQ ID NO: 1.

These results demonstrate that expression of GS enzymes in maize comprising an amino acid sequence that is at least 82% identical to SEQ ID NO: 1 improves yield.

Example 6

This example identifies a set of amino acid substitutions in SEQ ID NO: 1 that are predicted to be beneficial to GS enzyme activity and/or yield.

Amino acid variations of SEQ ID NO: 1 that may be beneficial to GS enzyme activity and/or yield were predicted based on the sequence diversity of both yield increasing GS1 proteins and GS1 proteins with increased enzymatic activity and/or thermostability.

As shown in Table 7, the following mutations of SEQ ID NO: 1: V26I, S29T, K109N, D118E, A161E, E268A, and R278K occurred in both yield increasing genes and shuffled variants with improved biochemical activity but were rarely found in yield neutral or decreasing genes.

There results demonstrate the identification of amino acid substitutions that are predicted to be beneficial to GS enzyme activity and/or yield.

Example 7

This example demonstrates that increased expression of GS1-5 in maize results in increased seed protein content Maize transgenic events with increased expression of wild type GS1-5 driven by the maize UBI1 promoter were generated as described in U.S. patent application publication 20100115662. Seed total nitrogen analysis was performed by combustion analysis on a Flash 1112EA analyzer (Thermo) configured for N/Protein determination as described by the instrument manufacturer. Seed oil content was determined by NMR as described previously.

As shown in Table 8, two out of 3 transgenic events with increased GS1-5 expression had a significant increase in seed protein content, while seed oil and starch content were not affected by increased GS1-5 expression.

These results demonstrate that increased expression of GS results in increased seed protein content and indicate that increased nitrogen assimilation due to increased GS activity enhances amino acid supply for seed protein biosynthesis.

Example 8

This example demonstrates the generation of glutamine synthetase (GS) mutations in the soybean GS genes.

In soybean, there are three major GS1 isoforms (Gm-GS1α, Gm-GS1β, and Gm-GS1γ), that are distinguished based on their expression patterns and enzyme properties. Each isoform has two paralogues in the genome which are listed in Table 9. GmGS1α is expressed weakly in early leaves, and GmGS1β is expressed more widely and strongly in roots and nodules. The third GmGS1γ is expressed in nodules. Gm-GS1β1 and Gm-GS1γ1 show 86% and 84% identity to maize GS1-5 protein, respectively.

Compared to the wild type maize GS1-5 (SEQ ID NO: 1), the maize Zm-GS1-5 B1 variant (SEQ ID NO: 4) contains 10 amino acid changes. Based on an amino acid sequence alignment between maize GS1-5 (SEQ ID NO: 1), GS1-5 B1 high activity variant (SEQ ID NO: 4), soybean GmGS1β1 (SEQ ID NO: 2), and GmGS1γ1 (SEQ ID NO: 3) (FIG. 3A-3F), four soybean GS1 variants, Gm-GS1β1-5AA (SEQ ID NO: 12), Gm-GS1β1-7AA (SEQ ID NO: 13), Gm-GS1γ1-4AA (SEQ ID NO: 14), and Gm-GS1γ1-6AA (SEQ ID NO: 15) were cloned into an *E. coli* expression vector under the control of the trc promoter and tested for activity.

Compared to wild-type GmGS1β1 (SEQ ID NO: 2), Gm-GS1β1-5AA has 5 substitutions, T15N, P41S, V123E, V172A, and L305S; and Gm-GS1β1-7AA has 7 substitutions, T15N, P41S, A109N, V123E, V172A, D271R, and L305S.

Compared to wild-type GmGS1β1 (SEQ ID NO: 3), Gm-GS1γ1-4AA has 4 substitutions, I15N, T161V, V172A, and V305S; Gm-GS1γ1-6AA has 6 substitutions, I15N, T161V, V172A, K268A, A271R, and V305S.

Example 9

This example demonstrates that soybean GS1 variants designed based on the maize GS1-5 variants increase GS1 activity.

Vectors expressing Zm-GS1-5 WT, Zm-GS1-5 B1 variant, Gm-GS1β1 WT, Gm-GS1β1-5AA variant, Gm-GS1β1-7AA variant, Gm-GS1γ1 WT, Gm-GS1γ1-4AA, Gm-GS1γ1-6AA, or a control vector were individually transformed into an *E. coli* GS knockout strain (ΔglnA). The transformed *E. coli* were grown under stringent M9 medium without glutamine at 37° C., as described previously.

As shown in FIG. 4, the ZmGS1-5 B1 variant showed increased growth compared to wild type ZmGS1-5 at Day 2 and Day 3. Soybean GS1β1-5AA and GS1β1-7AA showed a significant improvement in growth compared to wild type GmGS1β1 at Day 1 and Day 2. Similarly, in the soybean GS1γ1 backbone, GmGS1γ1-4AA and GmGS1γ1-6AA showed significant improvements in growth compared to wild type GmGS1γ1 at Day2, Day 3, and Day4. Interestingly, compared to wild type GmGS1β1, wild type GmGS1γ1 showed poor growth, suggesting that GmGS1γ1 enzymatic activity is lower than the enzymatic activity of GmGS1β1.

These results demonstrate that amino acid changes shown to improve maize GS1-5 activity also increase soybean GS1 activity when introduced into the soybean GS1β or GS1γ sequence. Accordingly, these results indicate that expression of the modified soybean GS1 sequences should also improve GS activity, yield, nitrogen assimilation, and seed protein content when expressed in plants.

Example 10

This example demonstrates the expression of modified soybean GS1 in plants to increase seed protein content and/or grain yield Soybean transformed with polynucleotide sequences encoding Gm-GS1β1 WT, Gm-GS1β1-5AA variant, Gm-GS1β1-7AA variant, Gm-GS1γ1 WT, Gm-GS1γ1-4AA, Gm-GS1γ1-6AA, a control vector, or other Gm-GS1β1 variants or Gm-GS1γ1 described herein, under the control of a heterologous promoter can be field tested for yield increase. Similar to maize GS1-5, expression of the soybean GS1 variants should increase yield in plants.

Additionally, the transformed soybean can be analyzed for seed protein content. For example, seed total nitrogen analysis may be performed by combustion analysis on a Flash 1112EA analyzer (Thermo) configured for N/Protein determination as described by the instrument manufacturer. Seed oil content may be determined by NMR as described previously.

Based on the results shown in maize and the increased activity of the soybean GS variants compared to wild-type soybean GS, expression of the soybean GS variants in soybean should increase seed protein content.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Unless defined otherwise, all technical and scientific terms used herein have the same meaning as commonly understood by one of ordinary skill in the art to which this invention belongs. Unless mentioned otherwise, the techniques employed or contemplated herein are standard methodologies well known to one of ordinary skill in the art. The materials, methods and examples are illustrative only and not limiting.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

Units, prefixes and symbols may be denoted in their SI accepted form. Unless otherwise indicated, nucleic acids are written left to right in 5' to 3' orientation; amino acid sequences are written left to right in amino to carboxy orientation, respectively. Numeric ranges are inclusive of the numbers defining the range. Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes.

TABLES

TABLE 3

List of Targeted GS1-5 Amino Acids and Size of the 4 Shuffled Libraries

| Library No. | 1 | 2 | 3 | 4 |
|---|---|---|---|---|
| Library Size | 1.40E+05 | 1.72E+09 | 6.04E+08 | 2.62E+05 |
| Targetted AA | 11 | 26 | 28 | 18 |
| Toggled | K109S | S140K | Q49K | N357S |
|  | K109N | S140N | I214L | D14G |
|  | K109G | V139T | I214V | D118E |
|  | V123E | E259K | L33V | D164E |
|  | K275L | E259S | S205A | P340L |
|  | K305S | G356P | S29T | M346L |
|  | K305V | T112K | I352M | K79R |
|  | A260E | G274K | K255E | E66D |
|  | A260D | D17E | R316A | E286D |
|  | Q98A | D17G | T96E | N86Q |
|  | Q98N | V40L | T45D | Y73C |
|  | E268K | A160G | R18K | N185D |
|  | E268A | A166S | V26I | N87H |
|  | S3L | L232V | I44V | Y150F |
|  | S3C | L234F | V113I | F167Y |
|  | C15N | K240P | V171I | Y108H |
|  | C15T | E271G | E213Q | Y55F |
|  | C15R | E271D | I230V | Y126F |
|  | K41P | G345S | I315V |  |
|  | K41S | A120K | D320E |  |
|  | A161I | A210S | D320Q |  |
|  | A161V | K323Q | H116S |  |
|  |  | K323R | K84R |  |
|  |  | I31M | R278K |  |
|  |  | S104T | V8I |  |
|  |  | M227I | I208V |  |
|  |  | K355N | D11N |  |
|  |  | K355E | D349E |  |
|  |  | S233T | T5S |  |
|  |  | L353V | Q75R |  |
|  |  | L353I |  |  |
|  |  | E324N |  |  |
|  |  | V147L |  |  |
|  |  | V147I |  |  |

TABLE 4

Maize GS Variant Enzymatic Activity

| | Substrate: Glu | | | | |
|---|---|---|---|---|---|
| Protein | Vmax uM Pi/min | Glu Km uM | Kcat min(−1) | Kcat/Km min(−1) uM(−1) | Kcat/Km fold Variant/WT |
| E8 | 0.25 | 643 | 1.01 | 0.0016 | 1.2 |
| D8 | 0.45 | 784 | 1.81 | 0.0023 | 1.8 |
| B1 | 2.3 | 868 | 9.27 | 0.0107 | 8.1 |
| B9 | 1.1 | 1036 | 4.43 | 0.0043 | 3.3 |

TABLE 4-continued

Maize GS Variant Enzymatic Activity

| | | | | | |
|---|---|---|---|---|---|
| AA160/161GI | 3.45 | 1647 | 13.9 | 0.0084 | 6.4 |
| Wild-type | 1.05 | 3219 | 4.23 | 0.0013 | 1 |
| G12 | 4.9 | 4633 | 19.75 | 0.0043 | 3.2 |

Substrate: NH4

| Protein | Vmax uM Pi/min | NH4 Km uM | Kcat min(−1) | Kcat/Km min(−1) uM(−1) | Kcat/Km fold Variant/WT |
|---|---|---|---|---|---|
| B1 | 1.64 | 0.12 | 6.61 | 56.98 | 92.4 |
| D8 | 0.27 | 0.16 | 1.08 | 6.74 | 10.9 |
| E8 | 0.24 | 0.44 | 0.96 | 2.18 | 3.5 |
| AA160/161GI | 1.36 | 1.09 | 5.48 | 5.04 | 8.2 |
| B9 | 0.91 | 1.66 | 3.68 | 2.22 | 3.6 |
| Wild-type | 0.36 | 2.33 | 1.44 | 0.62 | 1.0 |
| G12 | 4.07 | 4.29 | 16.40 | 3.82 | 6.2 |

Substrate: ATP

| Protein | Vmax uM Pi/min | ATP Km uM | Kcat min(−1) | Kcat/Km min(−1) uM(−1) | Kcat/Km fold Variant/WT |
|---|---|---|---|---|---|
| B1 | 1.16 | 315.3 | 4.65 | 0.015 | 3.5 |
| B9 | 1 | 380.9 | 4.03 | 0.011 | 2.5 |
| AA160/161GI | 1.7 | 501.1 | 6.83 | 0.014 | 3.3 |
| Wild-type | 0.64 | 615 | 2.58 | 0.004 | 1 |
| G12 | 3.61 | 976.3 | 14.55 | 0.015 | 3.6 |
| D8 | 0.54 | 2365 | 2.16 | 0.001 | 0.2 |
| E8 | 0.66 | 3539 | 2.66 | 0.001 | 0.2 |

TABLE 5

Yield Test Results

| Year | Gene | Predicted Yield Advantage (bu/ac) | Yield (bu/ac) |
|---|---|---|---|
| 2017 | DN-GS1 | 7.3 | 210.6 |
| 2017 | CV-GS1 | 6.6 | 237.8 |
| 2017 | PC-GS1-P7 | 6.2 | 237.4 |
| 2015 | ZM-GS1-1 | 5.2 | 202.8 |
| 2016 | AH-GS1 | 3.0 | 211.4 |
| 2017 | SBI-GS1 | 2.3 | 233.5 |
| 2017 | EC-GS1 | 2.1 | 205.4 |
| 2016 | ZM-GS1-5 | 0.2 | 208.6 |
| 2016 | PC-GS1-E20 | −2.2 | 209.3 |

TABLE 6

Amino Acid Sequence Identity and Similarity of GS1 Genes and Variants

| | | Identity | | | | | | |
|---|---|---|---|---|---|---|---|---|
| | | ZM-GS1-5 | ZM-GS1-1 | DN-GS1 | CN-GS1 | PC-GS1 | Variant B1 | Variant G12 |
| Similarity | ZM-GS1-5 | | 96.6 | 82.9 | 88.5 | 86.0 | 97.2 | 98.6 |
| | ZM-GS1-1 | 98.9 | | 83.5 | 87.4 | 85.4 | 95.0 | 95.2 |
| | DN-GS1 | 91.3 | 92.2 | | 84.6 | 85.7 | 83.5 | 81.5 |
| | CN-GS1 | 95.0 | 94.4 | 91.3 | | 86.8 | 86.6 | 87.4 |
| | PC-GS1 | 94.1 | 94.1 | 92.4 | 95.5 | | 86.0 | 84.6 |
| | Variant B1 | 97.2 | 97.2 | 92.4 | 93.3 | 93.8 | | 95.8 |
| | Variant G12 | 100.0 | 98.9 | 91.3 | 95.0 | 94.1 | 97.2 | |

TABLE 7

Correlation of Enzyme Activity Improvement and Yield Increase from the Beneficial Amino Acids Identified from Shuffling

| Amino Acid change from SEQ ID NO: 1 | Found Yield Increasing Genes | Found in Shuffled Variants |
|---|---|---|
| V26I | ZM-GS1-1 | E8 |
| | CV-GS1 | B9 |
| | DN-GS1 | |
| | PC-GS1 | |
| S29T | ZM-GS1-1 | E8 |
| K109N | DN-GS1 | B1 |
| | PC-GS1 | |
| D118E | CV-GS1 | B10 |
| | | C12 |
| A161V | DN-GS1 | B1 |
| | PC-GS1 | |
| E268A | ZM-GS1-1 | B1 |
| | DN-GS1 | |
| R278K | ZM-GS1-1 | D8 |
| | CV-GS1 | |
| | DN-GS1 | |
| | PC-GS1 | |

TABLE 8

Overexpression of GS1-5 Increases Seed Protein Content in Maize

| Component (mg g$^{-1}$) | Statistical Parameter | Control | Event 1.20 | Event 1.21 | Event 1.7 |
|---|---|---|---|---|---|
| Moisture | Mean Estimate ± S.D. | 10.06 ± 0.05 | 10.29 ± 0.05 | 10.19 ± 0.07 | 10.23 ± 0.06 |
| | P-Value | | 0.006 | 0.048 | 0.030 |
| Starch | Mean Estimate ± S.D. | 69.56 ± 0.35 | 64.05 ± 0.28 | 62.30 ± 0.17 | 69.11 ± 0.37 |
| | P-Value | | 0.039 | 0.002 | 0.030 |
| Oil | Mean Estimate ± S.D. | 3.41 ± 0.06 | 3.44 ± 0.07 | 3.44 ± 0.04 | 3.50 ± 0.04 |
| | P-Value | | 0.058 | 0.133 | 0.080 |
| Protein | Mean Estimate ± S.D. | 9.83 ± 0.03 | 9.83 ± 0.10 | 11.11 ± 0.07 | 10.03 ± 0.06 |
| | P-Value | | 0.488 | 0.000 | 0.001 | n = 4;
**P value is less than 0.001
Standard deviation (S.D.)

TABLE 9

Soybean Glutamine Synthetase Genes and Variants

| Soybean GS | Gene locus | Expression | % identity to Zm-GS1-5 | Seq ID |
|---|---|---|---|---|
| Gm-GS2-1 | glyma13g28180 | strong expression in leaf, weak expression in pod, root and nodule | 73 | 2 |
| Gm-GS2-2 | glyma15g10890 | strong expression in leaf, weak expression in pod, root and nodule | 73 | 3 |
| Gm-GS1α1 | glyma07g11810 | weak expression in root and flower | 84 | 4 |
| Gm-GS1α2 | glyma09g30370 | weak expression in root and flower | 84 | 5 |
| Gm-GS1β1 | glyma11g33560 | strong expression in root and nodule, weak expression in other tissues | 86 | 6 |
| Gm-GS1β2 | glyma18g04660 | strong expression in root and nodule, weak expression in other tissues | 85 | 7 |
| Gm-GS1γ1 | glyma14g39420 | strong expression in nodule | 84 | 8 |
| Gm-GS1γ2 | glyma02g41120 | strong expression in nodule | 84 | 9 |
| Gm-GS1β1-5AA | variant | strong expression in root and nodule, weak expression in other tissues | 86 | 10 |
| Gm-GS1β1-7AA | variant | strong expression in root and nodule, weak expression in other tissues | 86 | 11 |
| Gm-GS1γ1-4AA | variant | strong expression in nodule | 84 | 12 |
| Gm-GS1γ1-6AA | variant | strong expression in nodule | 84 | 13 |

We claim:

1. A polynucleotide encoding a glutamine synthetase (GS) polypeptide comprising an amino acid sequence that is at least 98% identical to SEQ ID NO: 135 wherein the amino acid sequence does not comprise at least one of a leucine corresponding to position 3 of SEQ ID NO: 135, a serine corresponding to position 5 of SEQ ID NO: 135, an isoleucine corresponding to position 8 of SEQ ID NO: 135, an asparagine corresponding to position 11 of SEQ ID NO: 135, an aspartic acid corresponding to position 14 of SEQ ID NO: 135, a threonine corresponding to position 15 of SEQ ID NO: 135, a lysine corresponding to position 18 of SEQ ID NO: 135, an isoleucine corresponding to position 26 of SEQ ID NO: 135, a serine corresponding to position 29 of SEQ ID NO: 135, a leucine corresponding to position 33 of SEQ ID NO: 135, a proline corresponding to position 41 of SEQ ID NO: 135, a tyrosine corresponding to position 55 of SEQ ID NO: 135, an arginine corresponding to position 79 of SEQ ID NO: 135, an arginine corresponding to position 84 of SEQ ID NO: 135, a histidine corresponding to position 108 of SEQ ID NO: 135, a valine corresponding to position 113 of SEQ ID NO: 135, an aspartic acid corresponding to position 118 of SEQ ID NO: 135, a tyrosine corresponding to position 126 of SEQ ID NO: 135, a valine corresponding to position 161 of SEQ ID NO: 135, an isoleucine corresponding to position 171 of SEQ ID NO: 135, a valine corresponding to position 172 of SEQ ID NO: 135, a valine corresponding to position 230 of SEQ ID NO: 135, a lysine corresponding to position 278 of SEQ ID NO: 135, a glutamic acid corresponding to position 286 of SEQ ID NO: 135, a leucine corresponding to position 305 of SEQ ID NO: 135, or an aspartic acid corresponding to position 320 of SEQ ID NO: 135 and the encoded GS polypeptide has increased activity as compared to the polypeptide of SEQ ID NO: 2.

2. The polynucleotide of claim 1, wherein the amino acid sequence comprises at least one of a cysteine corresponding to position 3 of SEQ ID NO: 135, a glycine corresponding to position 14 of SEQ ID NO: 135, an asparagine or arginine corresponding to position 15 of SEQ ID NO: 135, a threonine corresponding to position 29 of SEQ ID NO: 135, a valine corresponding to position 33 of SEQ ID NO: 135, a serine corresponding to position 41 of SEQ ID NO: 135, a phenylalanine corresponding to position 55 of SEQ ID NO: 135, a serine, asparagine, or glycine corresponding to position 109 of SEQ ID NO: 135, an isoleucine corresponding to position 113 of SEQ ID NO: 135, a glutamic acid corresponding to position 118 of SEQ ID NO: 135, a phenylalanine corresponding to position 126 of SEQ ID NO: 135, an isoleucine corresponding to position 161 of SEQ ID NO: 135, an alanine corresponding to position 172 of SEQ ID NO: 135, a lysine corresponding to position 268 of SEQ ID NO: 135, a glycine or arginine corresponding to position 271 of SEQ ID NO: 135, an aspartic acid corresponding to position 286 of SEQ ID NO: 135, a serine or valine corresponding to position 305 of SEQ ID NO: 135, or a glutamic acid or glutamine corresponding to position 320 of SEQ ID NO: 135.

3. The polynucleotide of claim 2, wherein the GS polypeptide comprises:
(a) a serine corresponding to position 41 of SEQ ID NO: 135 and a serine corresponding to position 305 of SEQ ID NO: 135;
(b) a phenylalanine corresponding to position 55 of SEQ ID NO: 135 and a phenylalanine corresponding to position 126 of SEQ ID NO: 135;
(c) an asparagine corresponding to position 15 of SEQ ID NO: 135, a serine corresponding to position 41 of SEQ ID NO: 135, an asparagine corresponding to position 109 of SEQ ID NO: 135, an alanine corresponding to position 172 of SEQ ID NO: 135, an arginine corresponding to position 271 of SEQ ID NO: 135, and a serine corresponding to position 305 of SEQ ID NO: 135;
(d) a valine corresponding to position 33 of SEQ ID NO: 135, an isoleucine corresponding to position 113, and a glutamine corresponding to position 320 of SEQ ID NO: 135;
(e) a threonine corresponding to position 29 of SEQ ID NO: 135, an isoleucine corresponding to position 113 of SEQ ID NO: 135, and a glutamic acid corresponding to position 320 of SEQ ID NO: 135;
(f) a phenylalanine corresponding to position 55 of SEQ ID NO: 135, a phenylalanine corresponding to position 126 of SEQ ID NO: 135, and an aspartic acid corresponding to position 286 of SEQ ID NO: 135;
(g) an asparagine corresponding to position 15 of SEQ ID NO: 135, a serine corresponding to position 41 of SEQ ID NO: 135, an alanine corresponding to position 172 of SEQ ID NO: 135, and a serine corresponding to position 305 of SEQ ID NO: 135;

(h) an asparagine corresponding to position 15 of SEQ ID NO: 135, a serine corresponding to position 41 of SEQ ID NO: 135, an asparagine corresponding to position 109 of SEQ ID NO: 135, an alanine corresponding to position 172 of SEQ ID NO: 135, an arginine corresponding to position 271 of SEQ ID NO: 135, and a serine corresponding to position 305 of SEQ ID NO: 135;

(i) an asparagine corresponding to position 15 of SEQ ID NO: 135, an alanine corresponding to position 172 of SEQ ID NO: 135, and a serine corresponding to position 305 of SEQ ID NO: 135; or (j) an asparagine corresponding to position 15 of SEQ ID NO: 135, an alanine corresponding to position 172 of SEQ ID NO: 135, an arginine corresponding to position 271 of SEQ ID NO: 135, and a serine corresponding to position 305 of SEQ ID NO: 135.

4. A recombinant DNA construct comprising the polynucleotide of claim 1.

5. The recombinant DNA construct of claim 4, further comprising a heterologous regulatory element operably linked to the polynucleotide.

6. A plant cell comprising the polynucleotide of claim 1.

7. The plant cell of claim 6, wherein the plant cell is a maize cell or soybean cell.

8. A plant comprising a polynucleotide encoding a glutamine synthetase (GS) polypeptide comprising an amino acid sequence that is at least 96% identical to SEQ ID NO: 135 wherein the amino acid sequence does not comprise at least one of a leucine corresponding to position 3 of SEQ ID NO: 135, a serine corresponding to position 5 of SEQ ID NO: 135, an isoleucine corresponding to position 8 of SEQ ID NO: 135, an asparagine corresponding to position 11 of SEQ ID NO: 135, an aspartic acid corresponding to position 14 of SEQ ID NO: 135, a threonine corresponding to position 15 of SEQ ID NO: 135, a lysine corresponding to position 18 of SEQ ID NO: 135, an isoleucine corresponding to position 26 of SEQ ID NO: 135, a serine corresponding to position 29 of SEQ ID NO: 135, a leucine corresponding to position 33 of SEQ ID NO: 135, a proline corresponding to position 41 of SEQ ID NO: 135, a tyrosine corresponding to position 55 of SEQ ID NO: 135 an arginine corresponding to position 79 of SEQ ID NO: 135, an arginine corresponding to position 84 of SEQ ID NO: 135, a histidine corresponding to position 108 of SEQ ID NO: 135, a valine corresponding to position 113 of SEQ ID NO: 135, an aspartic acid corresponding to position 118 of SEQ ID NO: 135, a tyrosine corresponding to position 126 of SEQ ID NO: 135, a valine corresponding to position 161 of SEQ ID NO: 135, an isoleucine corresponding to position 171 of SEQ ID NO: 135, a valine corresponding to position 172 of SEQ ID NO: 135, a valine corresponding to position 230 of SEQ ID NO: 135, a lysine corresponding to position 278 of SEQ ID NO: 135, a glutamic acid corresponding to position 286 of SEQ ID NO: 135, a leucine corresponding to position 305 of SEQ ID NO: 135, or an aspartic acid corresponding to position 320 of SEQ ID NO: 135, wherein the plant has increased seed protein content as compared to a control plant.

9. A seed produced by the plant of claim 8, the seed having an increased protein content as compared to a seed of the control plant.

10. A method for increasing seed protein content in the seed of a plant the method comprising:

(a) expressing in a plant cell a polynucleotide encoding a glutamine synthetase (GS) polypeptide comprising an amino acid sequence that is at least 96% identical to SEQ ID NO: 135 wherein the amino acid sequence does not comprise at least one of a leucine corresponding to position 3 of SEQ ID NO: 135, a serine corresponding to position 5 of SEQ ID NO: 135, an isoleucine corresponding to position 8 of SEQ ID NO: 135, an asparagine corresponding to position 11 of SEQ ID NO: 135, an aspartic acid corresponding to position 14 of SEQ ID NO: 135, a threonine corresponding to position 15 of SEQ ID NO: 135, a lysine corresponding to position 18 of SEQ ID NO: 135, an isoleucine corresponding to position 26 of SEQ ID NO: 135, a serine corresponding to position 29 of SEQ ID NO: 135, a leucine corresponding to position 33 of SEQ ID NO: 135, a proline corresponding to position 41 of SEQ ID NO: 135, a tyrosine corresponding to position 55 of SEQ ID NO: 135 an arginine corresponding to position 79 of SEQ ID NO: 135, an arginine corresponding to position 84 of SEQ ID NO: 135, a histidine corresponding to position 108 of SEQ ID NO: 135, a valine corresponding to position 113 of SEQ ID NO: 135, an aspartic acid corresponding to position 118 of SEQ ID NO: 135, a tyrosine corresponding to position 126 of SEQ ID NO: 135, a valine corresponding to position 161 of SEQ ID NO: 135, an isoleucine corresponding to position 171 of SEQ ID NO: 135, a valine corresponding to position 172 of SEQ ID NO: 135, a valine corresponding to position 230 of SEQ ID NO: 135, a lysine corresponding to position 278 of SEQ ID NO: 135, a glutamic acid corresponding to position 286 of SEQ ID NO: 135, a leucine corresponding to position 305 of SEQ ID NO: 135, or an aspartic acid corresponding to position 320 of SEQ ID NO: 135; and (b) generating a plant from the plant cell, wherein the plant has increased seed protein content as compared to a control plant.

11. The method of claim 10, wherein the method comprises:

a. expressing in the plant cell a recombinant DNA construct comprising the polynucleotide; and b. generating a plant from the plant cell, wherein the plant comprises in its genome the recombinant DNA construct and has increased seed protein content as compared to a control plant.

12. The method of claim 10, wherein the method comprises:

a. modifying an endogenous glutamine synthetase (GS) gene in the plant cell to express the polynucleotide; and b. generating a plant from the plant cell, wherein the plant has increased seed protein content as compared to a plant that does not comprise the modification.

13. The method of claim 12, wherein the endogenous GS gene is modified by a CRISPR/Cas guide RNA-mediated system, a Zn-finger nuclease-mediated system, a meganuclease-mediated system, or an oligonucleobase-mediated system.

14. The plant of claim 8, wherein the amino acid sequence comprises at least one of a cysteine corresponding to position 3 of SEQ ID NO: 135, a glycine corresponding to position 14 of SEQ ID NO: 135, an asparagine or arginine corresponding to position 15 of SEQ ID NO: 135, a threonine corresponding to position 29 of SEQ ID NO: 135, a valine corresponding to position 33 of SEQ ID NO: 135, a serine corresponding to position 41 of SEQ ID NO: 135, a phenylalanine corresponding to position 55 of SEQ ID NO: 135, a serine, asparagine, or glycine corresponding to position 109 of SEQ ID NO: 135, an isoleucine corresponding to position 113 of SEQ ID NO: 135, an glutamic acid corresponding to position 118 of SEQ ID NO: 135, a phenylalanine corresponding to position 126 of SEQ ID NO: 135, an isoleucine corresponding to position 161 of SEQ ID NO: 135, an alanine corresponding to position 172 of SEQ ID NO: 135, a lysine corresponding to position 268 of SEQ ID NO: 135, a glycine or arginine corresponding to position 271 of SEQ ID NO: 135, an aspartic acid corresponding to position 286 of SEQ ID NO: 135, a serine or valine corresponding to position 305 of SEQ ID NO: 135, or a glutamic acid or glutamine corresponding to position 320 of SEQ ID NO: 135.

15. The plant of claim 14, wherein the amino acid sequence comprises:
- (a) a serine corresponding to position 41 of SEQ ID NO: 135 and a serine corresponding to position 305 of SEQ ID NO: 135;
- (b) a phenylalanine corresponding to position 55 of SEQ ID NO: 135 and a phenylalanine corresponding to position 126 of SEQ ID NO: 135;
- (c) an asparagine corresponding to position 15 of SEQ ID NO: 135, a serine corresponding to position 41 of SEQ ID NO: 135, an asparagine corresponding to position 109 of SEQ ID NO: 135, an alanine corresponding to position 172 of SEQ ID NO: 135, an arginine corresponding to position 271 of SEQ ID NO: 135, and a serine corresponding to position 305 of SEQ ID NO: 135;
- (d) a valine corresponding to position 33 of SEQ ID NO: 135, an isoleucine corresponding to position 113 of SEQ ID NO: 135, and a glutamine corresponding to position 320 of SEQ ID NO: 135;
- (e) a threonine corresponding to position 29 of SEQ ID NO: 135, an isoleucine corresponding to position 113 of SEQ ID NO: 135, and a glutamic acid corresponding to position 320 of SEQ ID NO: 135;
- (f) a phenylalanine corresponding to position 55 of SEQ ID NO: 135, a phenylalanine corresponding to position 126 of SEQ ID NO: 135, and an aspartic acid corresponding to position 286 of SEQ ID NO: 135;
- (g) an asparagine corresponding to position 15 of SEQ ID NO: 135, a serine corresponding to position 41 of SEQ ID NO: 135, an alanine corresponding to position 172 of SEQ ID NO: 135, and a serine corresponding to position 305 of SEQ ID NO: 135;
- (h) an asparagine corresponding to position 15 of SEQ ID NO: 135, a serine corresponding to position 41 of SEQ ID NO: 135, an asparagine corresponding to position 109 of SEQ ID NO: 135, an alanine corresponding to position 172 of SEQ ID NO: 135, an arginine corresponding to position 271 of SEQ ID NO: 135, and a serine corresponding to position 305 of SEQ ID NO: 135;
- (i) an asparagine corresponding to position 15 of SEQ ID NO: 135, an alanine corresponding to position 172 of SEQ ID NO: 135, and a serine corresponding to position 305 of SEQ ID NO: 135; or
- (j) an asparagine corresponding to position 15 of SEQ ID NO: 135, an alanine corresponding to position 172 of SEQ ID NO: 135, an arginine corresponding to position 271 of SEQ ID NO: 135, and a serine corresponding to position 305 of SEQ ID NO: 135.

16. The plant of claim 8, wherein the plant is soybean.

\* \* \* \* \*

SEQUENCE LISTING

<160> NUMBER OF SEQ ID NOS: 135

<210> SEQ ID NO 1
<211> LENGTH: 357
<212> TYPE: PRT
<213> ORGANISM: Zea mays

<400> SEQUENCE: 1

```
Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
```

```
             210                 215                 220
Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
                275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
            355

<210> SEQ ID NO 2
<211> LENGTH: 356
<212> TYPE: PRT
<213> ORGANISM: Glycine max

<400> SEQUENCE: 2

Met Ser Leu Leu Ser Asp Leu Ile Asn Leu Asn Leu Ser Asp Thr Thr
1               5                   10                  15

Glu Lys Val Ile Ala Glu Tyr Ile Trp Ile Gly Gly Ser Gly Met Asp
                20                  25                  30

Leu Arg Ser Lys Ala Arg Thr Leu Pro Gly Pro Val Ser Asp Pro Ser
            35                  40                  45

Glu Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Arg Asp
65                  70                  75                  80

Pro Phe Arg Arg Gly Asn Asn Ile Leu Val Ile Cys Asp Ala Tyr Thr
                85                  90                  95

Pro Ala Gly Glu Pro Ile Pro Thr Asn Lys Arg His Ala Ala Ala Lys
            100                 105                 110

Val Phe Ser His Pro Asp Val Val Ala Glu Val Pro Trp Tyr Gly Ile
            115                 120                 125

Glu Gln Glu Tyr Thr Leu Leu Gln Lys Asp Ile Gln Trp Pro Leu Gly
    130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Val Asp Ala His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Ala Ala Arg Tyr Ile Leu Glu Arg Ile
    210                 215                 220
```

Thr Glu Ile Ala Gly Val Val Ser Phe Asp Pro Lys Pro Ile Lys
225                 230                 235                 240

Gly Asp Trp Asn Gly Ala Gly Ala His Thr Asn Tyr Ser Thr Lys Ser
            245                 250                 255

Met Arg Glu Asp Gly Gly Tyr Glu Val Ile Lys Ala Ala Ile Asp Lys
                260                 265                 270

Leu Gly Lys Lys His Lys Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Leu Trp Gly Val Ala Asn Arg Gly Ala Ser Val Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Asp Thr Thr Ile
                340                 345                 350

Leu Trp Lys Pro
        355

<210> SEQ ID NO 3
<211> LENGTH: 356
<212> TYPE: PRT
<213> ORGANISM: Glycine max

<400> SEQUENCE: 3

Met Ser Leu Leu Ser Asp Leu Ile Asn Leu Asn Leu Ser Asp Ile Thr
1               5                   10                  15

Asp Lys Val Ile Ala Glu Tyr Ile Trp Val Gly Gly Ser Gly Met Asp
                20                  25                  30

Met Arg Ser Lys Ala Arg Thr Leu Ser Gly Pro Val Lys Asp Pro Ser
            35                  40                  45

Lys Leu Pro Lys Trp Asn Tyr Asp Gly Ser Ser Thr Gly Gln Ala Pro
        50                  55                  60

Gly Gln Asp Ser Glu Val Ile Leu Tyr Pro Gln Ala Ile Phe Lys Asp
65                  70                  75                  80

Pro Phe Arg Arg Gly Ser Asn Ile Leu Val Met Cys Asp Ala Tyr Thr
                85                  90                  95

Pro Ala Gly Glu Pro Ile Pro Thr Asn Lys Arg Asn Asn Ala Ala Lys
                100                 105                 110

Ile Phe Gly His Pro Asp Val Ala Ala Glu Glu Pro Trp Tyr Gly Leu
            115                 120                 125

Glu Gln Glu Tyr Thr Leu Leu Gln Lys Asp Val Gln Trp Pro Leu Gly
    130                 135                 140

Trp Pro Leu Gly Gly Phe Pro Gly Pro Gln Gly Pro Tyr Tyr Cys Gly
145                 150                 155                 160

Thr Gly Ala Asn Lys Ala Phe Gly Arg Asp Ile Val Asp Ser His Tyr
                165                 170                 175

Lys Ala Cys Ile Tyr Ala Gly Ile Asn Ile Ser Gly Ile Asn Gly Glu
                180                 185                 190

Val Met Pro Gly Gln Trp Glu Phe Gln Val Gly Pro Ser Ile Gly Ile
            195                 200                 205

Ser Ala Ala Asp Glu Leu Trp Val Ala Arg Tyr Ile Leu Glu Arg Ile
    210                 215                 220

Thr Glu Ile Ala Gly Val Val Leu Ser Phe Asp Pro Lys Pro Ile Gln
225                 230                 235                 240

Gly Asp Trp Asn Gly Ala Gly Ala His Thr Asn Tyr Ser Thr Lys Ser
            245                 250                 255

Met Arg Asn Asp Gly Gly Tyr Glu Val Ile Lys Lys Ala Ile Ala Lys
            260                 265                 270

Leu Glu Lys Arg His Lys Glu His Ile Ala Ala Tyr Gly Glu Gly Asn
            275                 280                 285

Glu Arg Arg Leu Thr Gly Arg His Glu Thr Ala Asp Met Asn Thr Phe
290                 295                 300

Val Trp Gly Val Ala Asn Arg Gly Ala Ser Ile Arg Val Gly Arg Asp
305                 310                 315                 320

Thr Glu Lys Ala Gly Lys Gly Tyr Phe Glu Asp Arg Arg Pro Ala Ser
            325                 330                 335

Asn Met Asp Pro Tyr Val Val Thr Ser Met Ile Ala Glu Thr Thr Ile
            340                 345                 350

Leu Trp Lys Pro
            355

<210> SEQ ID NO 4
<211> LENGTH: 357
<212> TYPE: PRT
<213> ORGANISM: Zea mays

<400> SEQUENCE: 4

Met Ala Leu Leu Thr Asp Leu Val Asn Leu Asp Leu Ser Asp Asn Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Ser Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Asn Ala Ala Thr
            100                 105                 110

Val Phe Ser His Pro Asp Val Ala Ala Glu Glu Pro Trp Tyr Gly Ile
            115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Val Gly Ala Asp Lys Ala Phe Gly Arg Asp Val Ala Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
        210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser

```
                      245                 250                 255
Met Arg Glu Ala Gly Gly Tyr Glu Val Ile Lys Ala Ala Ile Arg Lys
                260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
        290                 295                 300

Ser Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
            355

<210> SEQ ID NO 5
<211> LENGTH: 357
<212> TYPE: PRT
<213> ORGANISM: Zea mays

<400> SEQUENCE: 5

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Phe Asp Gly Ser Ser Thr Gly Gln Ala Pro
    50                  55                  60

Gly Glu Asp Ser Glu Val Ile Leu Tyr Pro Gln Ala Ile Phe Arg Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg His Lys Ala Ala Thr
            100                 105                 110

Val Phe Ser His Pro Asp Val Ala Ala Glu Val Pro Trp Phe Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255
```

```
Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Asp Gly Asn
            275                 280                 285

Glu Arg Arg Leu Thr Gly Arg His Glu Thr Ala Asp Ile Asn Thr Phe
        290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Thr Thr Ile
            340                 345                 350

Leu Trp Lys Gly Asn
        355

<210> SEQ ID NO 6
<211> LENGTH: 357
<212> TYPE: PRT
<213> ORGANISM: Zea mays

<400> SEQUENCE: 6

Met Ala Ser Leu Ser Asp Leu Ile Asn Leu Asn Leu Ser Asp Cys Thr
1               5                   10                  15

Asp Arg Ile Ile Ala Glu Tyr Ile Trp Ile Gly Gly Ser Gly Ile Asp
            20                  25                  30

Val Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Arg Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Ile Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Ile Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Val Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270
```

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
        290                 295                 300

Lys Trp Gly Val Ala Asn Arg Gly Ala Ser Ile Arg Val Gly Arg Gln
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 7
<211> LENGTH: 357
<212> TYPE: PRT
<213> ORGANISM: Zea mays

<400> SEQUENCE: 7

Met Ala Ser Leu Ser Asp Leu Val Asn Leu Asn Leu Ser Asp Cys Thr
1               5                   10                  15

Asp Lys Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Val Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Lys Glu His Ile Ala Ala Tyr Gly Glu Gly Asn

```
                275                 280                 285
Glu Arg Arg Leu Thr Gly Arg His Glu Thr Ala Asp Ile Asn Thr Phe
        290                 295                 300
Lys Trp Gly Val Ala Asn Arg Gly Ala Ser Ile Arg Val Gly Arg Glu
305                 310                 315                 320
Thr Glu Lys Glu Gly Lys Gly Tyr Phe Glu Asp Arg Arg Pro Ala Ser
                325                 330                 335
Asn Met Asp Pro Tyr Val Val Thr Gly Met Ile Ala Thr Thr Ile
            340                 345                 350
Leu Trp Lys Gly Asn
        355

<210> SEQ ID NO 8
<211> LENGTH: 357
<212> TYPE: PRT
<213> ORGANISM: Zea mays

<400> SEQUENCE: 8

Met Ala Ser Leu Ser Asp Leu Val Asn Leu Asn Leu Ser Asp Cys Thr
1               5                   10                  15
Asp Lys Ile Ile Ala Glu Tyr Ile Trp Ile Gly Gly Thr Gly Ile Asp
            20                  25                  30
Leu Arg Ser Lys Ala Arg Thr Val Lys Gly Pro Ile Thr Asp Pro Ser
        35                  40                  45
Gln Leu Pro Lys Trp Asn Tyr Asp Gly Ser Ser Thr Gly Gln Ala Pro
    50                  55                  60
Gly Glu Asp Ser Glu Val Ile Leu Tyr Pro Gln Ala Ile Phe Lys Asp
65                  70                  75                  80
Pro Phe Arg Lys Gly Asn Asn Ile Leu Val Met Cys Asp Cys Tyr Thr
                85                  90                  95
Pro Gln Gly Glu Pro Ile Pro Ser Asn Lys Arg Tyr Lys Ala Ala Thr
            100                 105                 110
Ile Phe Ser His Pro Asp Val Ala Ala Glu Val Pro Trp Tyr Gly Ile
        115                 120                 125
Glu Gln Glu Tyr Thr Leu Leu Gln Lys Asp Val Ser Trp Pro Leu Gly
    130                 135                 140
Trp Pro Val Gly Gly Tyr Pro Gly Pro Gln Gly Pro Tyr Tyr Cys Ala
145                 150                 155                 160
Ala Gly Ala Asp Lys Ala Phe Gly Arg Asp Val Val Asp Ala His Tyr
                165                 170                 175
Lys Ala Cys Leu Tyr Ala Gly Ile Asn Ile Ser Gly Ile Asn Gly Glu
            180                 185                 190
Val Met Pro Gly Gln Trp Glu Phe Gln Val Gly Pro Ser Val Gly Ile
        195                 200                 205
Ser Ala Gly Asp Glu Ile Trp Val Ala Arg Tyr Ile Leu Glu Arg Ile
    210                 215                 220
Thr Glu Met Ala Gly Val Val Leu Ser Leu Asp Pro Lys Pro Ile Lys
225                 230                 235                 240
Gly Asp Trp Asn Gly Ala Gly Ala His Thr Asn Tyr Ser Thr Lys Ser
                245                 250                 255
Met Arg Glu Ala Gly Gly Tyr Glu Val Ile Lys Glu Ala Ile Glu Lys
            260                 265                 270
Leu Gly Lys Arg His Lys Glu His Ile Ala Ala Tyr Gly Glu Gly Asn
        275                 280                 285
```

```
Glu Arg Arg Leu Thr Gly Arg His Glu Thr Ala Asp Ile Asn Thr Phe
    290                 295                 300
Lys Trp Gly Val Ala Asn Arg Gly Ala Ser Ile Arg Val Gly Arg Glu
305                 310                 315                 320
Thr Glu Lys Glu Gly Lys Gly Tyr Phe Glu Asp Arg Arg Pro Ala Ser
                325                 330                 335
Asn Met Asp Pro Tyr Val Val Thr Gly Met Ile Ala Asp Thr Thr Ile
                340                 345                 350
Leu Trp Lys Gly Asn
            355
```

<210> SEQ ID NO 9
<211> LENGTH: 357
<212> TYPE: PRT
<213> ORGANISM: Zea mays

<400> SEQUENCE: 9

```
Met Ala Ser Leu Thr Asp Leu Val Asn Leu Asp Leu Ser Asp Cys Thr
1               5                   10                  15
Asp Arg Ile Ile Ala Glu Tyr Ile Trp Val Gly Gly Ser Gly Ile Asp
                20                  25                  30
Leu Arg Ser Lys Ala Arg Thr Val Ser Gly Pro Ile Thr Asp Pro Ser
            35                  40                  45
Gln Leu Pro Lys Trp Asn Tyr Asp Gly Ser Ser Thr Gly Gln Ala Pro
50                  55                  60
Gly Glu Asp Ser Glu Val Ile Leu Tyr Pro Gln Ala Ile Phe Lys Asp
65                  70                  75                  80
Pro Phe Arg Lys Gly Asn Asn Ile Leu Val Met Cys Asp Cys Tyr Thr
                85                  90                  95
Pro Gln Gly Glu Pro Ile Pro Ser Asn Lys Arg Tyr Lys Ala Ala Thr
            100                 105                 110
Val Phe Ser His Pro Asp Val Ala Ala Glu Glu Pro Trp Tyr Gly Ile
        115                 120                 125
Glu Gln Glu Tyr Thr Leu Leu Gln Lys Asp Val Ser Trp Pro Leu Gly
    130                 135                 140
Trp Pro Val Gly Gly Tyr Pro Gly Pro Gln Gly Pro Tyr Tyr Cys Val
145                 150                 155                 160
Ala Gly Ala Asp Lys Ala Phe Gly Arg Asp Val Val Asp Ala His Tyr
                165                 170                 175
Lys Ala Cys Leu Tyr Ala Gly Ile Asn Ile Ser Gly Ile Asn Gly Glu
            180                 185                 190
Val Met Pro Gly Gln Trp Glu Phe Gln Val Gly Pro Ser Val Gly Ile
        195                 200                 205
Ser Ala Gly Asp Glu Ile Trp Val Ala Arg Tyr Ile Leu Glu Arg Ile
    210                 215                 220
Thr Glu Met Ala Gly Ile Val Leu Ser Leu Asp Pro Lys Pro Ile Lys
225                 230                 235                 240
Gly Asp Trp Asn Gly Ala Gly Ala His Thr Asn Tyr Ser Thr Lys Ser
                245                 250                 255
Met Arg Glu Ala Gly Gly Tyr Glu Val Ile Lys Glu Ala Ile Glu Lys
            260                 265                 270
Leu Gly Lys Arg His Arg Glu His Ile Ala Ala Tyr Gly Glu Gly Asn
        275                 280                 285
Glu Arg Arg Leu Thr Gly Arg His Glu Thr Ala Asp Ile Asn Thr Phe
    290                 295                 300
```

```
Ser Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Thr Thr Ile
        340                 345                 350

Leu Trp Lys Gly Asn
        355
```

<210> SEQ ID NO 10
<211> LENGTH: 357
<212> TYPE: PRT
<213> ORGANISM: Zea mays

<400> SEQUENCE: 10

```
Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Phe Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Phe Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
```

```
            305                 310                 315                 320
Thr Glu Lys Glu Gly Lys Gly Tyr Phe Glu Asp Arg Arg Pro Ala Ser
                    325                 330                 335

Asn Met Asp Pro Tyr Val Val Thr Gly Met Ile Ala Asp Thr Thr Ile
                    340                 345                 350

Leu Trp Lys Gly Asn
            355

<210> SEQ ID NO 11
<211> LENGTH: 357
<212> TYPE: PRT
<213> ORGANISM: Zea mays

<400> SEQUENCE: 11

Met Ala Ser Leu Thr Asp Leu Val Asn Leu Asp Leu Ser Asp Cys Thr
1               5                   10                  15

Asp Lys Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Arg Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Val Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Glu
305                 310                 315                 320
```

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Thr Thr Ile
            340                 345                 350

Leu Trp Lys Gly Asn
            355

<210> SEQ ID NO 12
<211> LENGTH: 356
<212> TYPE: PRT
<213> ORGANISM: Glycine max

<400> SEQUENCE: 12

Met Ser Leu Leu Ser Asp Leu Ile Asn Leu Asn Leu Ser Asp Asn Thr
1               5                   10                  15

Glu Lys Val Ile Ala Glu Tyr Ile Trp Ile Gly Gly Ser Gly Met Asp
            20                  25                  30

Leu Arg Ser Lys Ala Arg Thr Leu Ser Gly Pro Val Ser Asp Pro Ser
        35                  40                  45

Glu Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Arg Asp
65                  70                  75                  80

Pro Phe Arg Arg Gly Asn Asn Ile Leu Val Ile Cys Asp Ala Tyr Thr
                85                  90                  95

Pro Ala Gly Glu Pro Ile Pro Thr Asn Lys Arg His Ala Ala Ala Lys
            100                 105                 110

Val Phe Ser His Pro Asp Val Val Ala Glu Glu Pro Trp Tyr Gly Ile
        115                 120                 125

Glu Gln Glu Tyr Thr Leu Leu Gln Lys Asp Ile Gln Trp Pro Leu Gly
    130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Ala Asp Ala His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Ala Ala Arg Tyr Ile Leu Glu Arg Ile
    210                 215                 220

Thr Glu Ile Ala Gly Val Val Ser Phe Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Asp Gly Gly Tyr Glu Val Ile Lys Ala Ala Ile Asp Lys
            260                 265                 270

Leu Gly Lys Lys His Lys Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Asp Thr Thr Ile
                340                 345                 350

Leu Trp Lys Pro
        355

<210> SEQ ID NO 13
<211> LENGTH: 356
<212> TYPE: PRT
<213> ORGANISM: Glycine max

<400> SEQUENCE: 13

Met Ser Leu Leu Ser Asp Leu Ile Asn Leu Asn Leu Ser Asp Asn Thr
1               5                   10                  15

Glu Lys Val Ile Ala Glu Tyr Ile Trp Ile Gly Gly Ser Gly Met Asp
            20                  25                  30

Leu Arg Ser Lys Ala Arg Thr Leu Ser Gly Pro Val Ser Asp Pro Ser
        35                  40                  45

Glu Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Arg Asp
65                  70                  75                  80

Pro Phe Arg Arg Gly Asn Asn Ile Leu Val Ile Cys Asp Ala Tyr Thr
                85                  90                  95

Pro Ala Gly Glu Pro Ile Pro Thr Asn Lys Arg His Asn Ala Ala Lys
            100                 105                 110

Val Phe Ser His Pro Asp Val Val Ala Glu Glu Pro Trp Tyr Gly Ile
        115                 120                 125

Glu Gln Glu Tyr Thr Leu Leu Gln Lys Asp Ile Gln Trp Pro Leu Gly
    130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Ala Asp Ala His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Ala Ala Arg Tyr Ile Leu Glu Arg Ile
    210                 215                 220

Thr Glu Ile Ala Gly Val Val Ser Phe Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Asp Gly Gly Tyr Glu Val Ile Lys Ala Ala Ile Arg Lys
            260                 265                 270

Leu Gly Lys Lys His Lys Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Val Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Asp Thr Thr Ile

Leu Trp Lys Pro
        355

<210> SEQ ID NO 14
<211> LENGTH: 356
<212> TYPE: PRT
<213> ORGANISM: Glycine max

<400> SEQUENCE: 14

Met Ser Leu Leu Ser Asp Leu Ile Asn Leu Asn Leu Ser Asp Asn Thr
1               5                   10                  15

Asp Lys Val Ile Ala Glu Tyr Ile Trp Val Gly Gly Ser Gly Met Asp
            20                  25                  30

Met Arg Ser Lys Ala Arg Thr Leu Ser Gly Pro Val Lys Asp Pro Ser
        35                  40                  45

Lys Leu Pro Lys Trp Asn Tyr Asp Gly Ser Ser Thr Gly Gln Ala Pro
    50                  55                  60

Gly Gln Asp Ser Glu Val Ile Leu Tyr Pro Gln Ala Ile Phe Lys Asp
65                  70                  75                  80

Pro Phe Arg Arg Gly Ser Asn Ile Leu Val Met Cys Asp Ala Tyr Thr
                85                  90                  95

Pro Ala Gly Glu Pro Ile Pro Thr Asn Lys Arg Asn Asn Ala Ala Lys
            100                 105                 110

Ile Phe Gly His Pro Asp Val Ala Ala Glu Glu Pro Trp Tyr Gly Leu
        115                 120                 125

Glu Gln Glu Tyr Thr Leu Leu Gln Lys Asp Val Gln Trp Pro Leu Gly
    130                 135                 140

Trp Pro Leu Gly Gly Phe Pro Gly Pro Gln Gly Pro Tyr Tyr Cys Gly
145                 150                 155                 160

Val Gly Ala Asn Lys Ala Phe Gly Arg Asp Ile Ala Asp Ser His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Ile Gly Ile
        195                 200                 205

Ser Ala Ala Asp Glu Leu Trp Val Ala Arg Tyr Ile Leu Glu Arg Ile
    210                 215                 220

Thr Glu Ile Ala Gly Val Val Leu Ser Phe Asp Pro Lys Pro Ile Gln
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Val Ile Lys Lys Ala Ile Ala Lys
            260                 265                 270

Leu Glu Lys Arg His Lys Glu His Ile Ala Ala Tyr Gly Glu Gly Asn
        275                 280                 285

Glu Arg Arg Leu Thr Gly Arg His Glu Thr Ala Asp Met Asn Thr Phe
    290                 295                 300

Ser Trp Gly Val Ala Asn Arg Gly Ala Ser Ile Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Glu Thr Thr Ile
            340                 345                 350

```
Leu Trp Lys Pro
        355

<210> SEQ ID NO 15
<211> LENGTH: 356
<212> TYPE: PRT
<213> ORGANISM: Glycine max

<400> SEQUENCE: 15

Met Ser Leu Leu Ser Asp Leu Ile Asn Leu Asn Leu Ser Asp Asn Thr
1               5                   10                  15

Asp Lys Val Ile Ala Glu Tyr Ile Trp Val Gly Gly Ser Gly Met Asp
            20                  25                  30

Met Arg Ser Lys Ala Arg Thr Leu Ser Gly Pro Val Lys Asp Pro Ser
        35                  40                  45

Lys Leu Pro Lys Trp Asn Tyr Asp Gly Ser Ser Thr Gly Gln Ala Pro
50                  55                  60

Gly Gln Asp Ser Glu Val Ile Leu Tyr Pro Gln Ala Ile Phe Lys Asp
65                  70                  75                  80

Pro Phe Arg Arg Gly Ser Asn Ile Leu Val Met Cys Asp Ala Tyr Thr
                85                  90                  95

Pro Ala Gly Glu Pro Ile Pro Thr Asn Lys Arg Asn Asn Ala Ala Lys
            100                 105                 110

Ile Phe Gly His Pro Asp Val Ala Ala Glu Pro Trp Tyr Gly Leu
        115                 120                 125

Glu Gln Glu Tyr Thr Leu Leu Gln Lys Asp Val Gln Trp Pro Leu Gly
    130                 135                 140

Trp Pro Leu Gly Gly Phe Pro Gly Pro Gln Gly Pro Tyr Tyr Cys Gly
145                 150                 155                 160

Val Gly Ala Asn Lys Ala Phe Gly Arg Asp Ile Ala Asp Ser His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Ile Gly Ile
        195                 200                 205

Ser Ala Ala Asp Glu Leu Trp Val Ala Arg Tyr Ile Leu Glu Arg Ile
    210                 215                 220

Thr Glu Ile Ala Gly Val Val Leu Ser Phe Asp Pro Lys Pro Ile Gln
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Val Ile Lys Ala Ala Ile Arg Lys
            260                 265                 270

Leu Glu Lys Arg His Lys Glu His Ile Ala Ala Tyr Gly Glu Gly Asn
        275                 280                 285

Glu Arg Arg Leu Thr Gly Arg His Glu Thr Ala Asp Met Asn Thr Phe
    290                 295                 300

Ser Trp Gly Val Ala Asn Arg Gly Ala Ser Ile Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Glu Thr Thr Ile
            340                 345                 350

Leu Trp Lys Pro
        355
```

<210> SEQ ID NO 16
<211> LENGTH: 357
<212> TYPE: PRT
<213> ORGANISM: Zea mays

<400> SEQUENCE: 16

Met Ala Leu Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 17
<211> LENGTH: 357
<212> TYPE: PRT
<213> ORGANISM: Zea mays

<400> SEQUENCE: 17

```
Met Ala Cys Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355
```

<210> SEQ ID NO 18
<211> LENGTH: 357

```
<212> TYPE: PRT
<213> ORGANISM: Zea mays

<400> SEQUENCE: 18

Met Ala Ser Leu Ser Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 19
<211> LENGTH: 357
<212> TYPE: PRT
<213> ORGANISM: Zea mays
```

<400> SEQUENCE: 19

```
Met Ala Ser Leu Thr Asp Leu Ile Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355
```

<210> SEQ ID NO 20
<211> LENGTH: 357
<212> TYPE: PRT
<213> ORGANISM: Zea mays

<400> SEQUENCE: 20

Met Ala Ser Leu Thr Asp Leu Val Asn Leu Asn Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 21
<211> LENGTH: 357
<212> TYPE: PRT
<213> ORGANISM: Zea mays

<400> SEQUENCE: 21

Met Ala Ser Leu Thr Asp Leu Val Asn Leu Asp Leu Ser Gly Cys Thr

```
            1               5                  10                 15
        Asp Arg Ile Ile Ala Glu Tyr Ile Trp Val Gly Gly Ser Gly Ile Asp
                        20                 25                 30

Leu Arg Ser Lys Ala Arg Thr Val Lys Gly Pro Ile Thr Asp Pro Ser
                        35                 40                 45

Gln Leu Pro Lys Trp Asn Tyr Asp Gly Ser Ser Thr Gly Gln Ala Pro
                    50                 55                 60

Gly Glu Asp Ser Glu Val Ile Leu Tyr Pro Gln Ala Ile Phe Lys Asp
         65                 70                 75                 80

Pro Phe Arg Lys Gly Asn Asn Ile Leu Val Met Cys Asp Cys Tyr Thr
                            85                 90                 95

Pro Gln Gly Glu Pro Ile Pro Ser Asn Lys Arg Tyr Lys Ala Ala Thr
                        100                105                110

Val Phe Ser His Pro Asp Val Ala Ala Glu Val Pro Trp Tyr Gly Ile
                        115                120                125

Glu Gln Glu Tyr Thr Leu Leu Gln Lys Asp Val Ser Trp Pro Leu Gly
                        130                135                140

Trp Pro Val Gly Gly Tyr Pro Gly Pro Gln Gly Pro Tyr Tyr Cys Ala
        145                150                155                160

Ala Gly Ala Asp Lys Ala Phe Gly Arg Asp Val Val Asp Ala His Tyr
                        165                170                175

Lys Ala Cys Leu Tyr Ala Gly Ile Asn Ile Ser Gly Ile Asn Gly Glu
                        180                185                190

Val Met Pro Gly Gln Trp Glu Phe Gln Val Gly Pro Ser Val Gly Ile
                        195                200                205

Ser Ala Gly Asp Glu Ile Trp Val Ala Arg Tyr Ile Leu Glu Arg Ile
                210                215                220

Thr Glu Met Ala Gly Ile Val Leu Ser Leu Asp Pro Lys Pro Ile Lys
        225                230                235                240

Gly Asp Trp Asn Gly Ala Gly Ala His Thr Asn Tyr Ser Thr Lys Ser
                        245                250                255

Met Arg Glu Ala Gly Gly Tyr Glu Val Ile Lys Glu Ala Ile Glu Lys
                        260                265                270

Leu Gly Lys Arg His Arg Glu His Ile Ala Ala Tyr Gly Glu Gly Asn
                        275                280                285

Glu Arg Arg Leu Thr Gly Arg His Glu Thr Ala Asp Ile Asn Thr Phe
                        290                295                300

Lys Trp Gly Val Ala Asn Arg Gly Ala Ser Ile Arg Val Gly Arg Asp
        305                310                315                320

Thr Glu Lys Glu Gly Lys Gly Tyr Phe Glu Asp Arg Arg Pro Ala Ser
                        325                330                335

Asn Met Asp Pro Tyr Val Val Thr Gly Met Ile Ala Thr Thr Ile
                        340                345                350

Leu Trp Lys Gly Asn
                        355
```

<210> SEQ ID NO 22
<211> LENGTH: 357
<212> TYPE: PRT
<213> ORGANISM: Zea mays

<400> SEQUENCE: 22

```
        Met Ala Ser Leu Thr Asp Leu Val Asn Leu Asp Leu Ser Asp Asn Thr
        1               5                  10                 15
```

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 23
<211> LENGTH: 357
<212> TYPE: PRT
<213> ORGANISM: Zea mays

<400> SEQUENCE: 23

Met Ala Ser Leu Thr Asp Leu Val Asn Leu Asp Leu Ser Asp Thr Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Thr Gly Gln Ala Pro
 50                  55                  60

Gly Glu Asp Ser Glu Val Ile Leu Tyr Pro Gln Ala Ile Phe Lys Asp
 65                  70                  75                  80

Pro Phe Arg Lys Gly Asn Asn Ile Leu Val Met Cys Asp Cys Tyr Thr
                 85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Tyr Gly Ile
                115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
                195                 200                 205

Ser Ala Gly Asp Glu Ile Trp Val Ala Arg Tyr Ile Leu Glu Arg Ile
        210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
                290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
        355

<210> SEQ ID NO 24
<211> LENGTH: 357
<212> TYPE: PRT
<213> ORGANISM: Zea mays

<400> SEQUENCE: 24

Met Ala Ser Leu Thr Asp Leu Val Asn Leu Asp Leu Ser Asp Arg Thr
 1               5                  10                  15

Asp Arg Ile Ile Ala Glu Tyr Ile Trp Val Gly Gly Ser Gly Ile Asp
                 20                  25                  30

Leu Arg Ser Lys Ala Arg Thr Val Lys Gly Pro Ile Thr Asp Pro Ser

```
                35                  40                  45
Gln Leu Pro Lys Trp Asn Tyr Asp Gly Ser Ser Thr Gly Gln Ala Pro
 50                  55                  60

Gly Glu Asp Ser Glu Val Ile Leu Tyr Pro Gln Ala Ile Phe Lys Asp
 65                  70                  75                  80

Pro Phe Arg Lys Gly Asn Asn Ile Leu Val Met Cys Asp Cys Tyr Thr
                 85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 25
<211> LENGTH: 357
<212> TYPE: PRT
<213> ORGANISM: Zea mays

<400> SEQUENCE: 25

Met Ala Ser Leu Thr Asp Leu Val Asn Leu Asp Leu Ser Asp Cys Thr
  1               5                  10                  15

Asp Lys Ile Ile Ala Glu Tyr Ile Trp Val Gly Gly Ser Gly Ile Asp
             20                  25                  30

Leu Arg Ser Lys Ala Arg Thr Val Lys Gly Pro Ile Thr Asp Pro Ser
         35                  40                  45
```

Gln Leu Pro Lys Trp Asn Tyr Asp Gly Ser Ser Thr Gly Gln Ala Pro
            50                  55                  60

Gly Glu Asp Ser Glu Val Ile Leu Tyr Pro Gln Ala Ile Phe Lys Asp
 65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
            130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
            210                 215                 220

Thr Glu Met Ala Gly Ile Val Leu Ser Leu Asp Pro Lys Pro Ile Lys
225                 230                 235                 240

Gly Asp Trp Asn Gly Ala Gly His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
            290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Asp Thr Thr Ile
            340                 345                 350

Leu Trp Lys Gly Asn
            355

<210> SEQ ID NO 26
<211> LENGTH: 357
<212> TYPE: PRT
<213> ORGANISM: Zea mays

<400> SEQUENCE: 26

Met Ala Ser Leu Thr Asp Leu Val Asn Leu Asp Leu Ser Asp Cys Thr
 1                   5                  10                  15

Asp Arg Ile Ile Ala Glu Tyr Ile Trp Ile Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
            50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
            85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
            130                 135                 140

Trp Pro Val Gly Gly Tyr Pro Gly Pro Gln Gly Pro Tyr Cys Ala
145                 150                 155                 160

Ala Gly Ala Asp Lys Ala Phe Gly Arg Asp Val Val Asp Ala His Tyr
            165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
            245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Asp Thr Thr Ile
            340                 345                 350

Leu Trp Lys Gly Asn
            355

<210> SEQ ID NO 27
<211> LENGTH: 357
<212> TYPE: PRT
<213> ORGANISM: Zea mays

<400> SEQUENCE: 27

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Thr Gly Ile Asp
            20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp

```
                65                  70                  75                  80
Pro Phe Arg Lys Gly Asn Asn Ile Leu Val Met Cys Asp Cys Tyr Thr
                    85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Tyr Gly Ile
                115                 120                 125

Glu Gln Glu Tyr Thr Leu Leu Gln Lys Asp Val Ser Trp Pro Leu Gly
                130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
                195                 200                 205

Ser Ala Gly Asp Glu Ile Trp Val Ala Arg Tyr Ile Leu Glu Arg Ile
                210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Glu Gly Asn
                275                 280                 285

Glu Arg Arg Leu Thr Gly Arg His Glu Thr Ala Asp Ile Asn Thr Phe
                290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
                355

<210> SEQ ID NO 28
<211> LENGTH: 357
<212> TYPE: PRT
<213> ORGANISM: Zea mays

<400> SEQUENCE: 28

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Val Arg Ser Lys Ala Arg Thr Val Lys Gly Pro Ile Thr Asp Pro Ser
                35                  40                  45

Gln Leu Pro Lys Trp Asn Tyr Asp Gly Ser Ser Thr Gly Gln Ala Pro
                50                  55                  60

Gly Glu Asp Ser Glu Val Ile Leu Tyr Pro Gln Ala Ile Phe Lys Asp
65                  70                  75                  80
```

```
Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
            130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
            210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
            290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Asp Thr Thr Ile
            340                 345                 350

Leu Trp Lys Gly Asn
            355

<210> SEQ ID NO 29
<211> LENGTH: 357
<212> TYPE: PRT
<213> ORGANISM: Zea mays

<400> SEQUENCE: 29

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Ser Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95
```

```
Pro Gln Gly Glu Pro Ile Pro Ser Asn Lys Arg Tyr Lys Ala Ala Thr
                100                 105                 110

Val Phe Ser His Pro Asp Val Ala Glu Val Pro Trp Tyr Gly Ile
            115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 30
<211> LENGTH: 357
<212> TYPE: PRT
<213> ORGANISM: Zea mays

<400> SEQUENCE: 30

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Pro Gly Pro Ile Thr Asp Pro Ser
        35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
```

```
                100                 105                 110
    Val Phe Ser His Pro Asp Val Ala Glu Val Pro Trp Tyr Gly Ile
            115                 120                 125
    Glu Gln Glu Tyr Thr Leu Leu Gln Lys Asp Val Ser Trp Pro Leu Gly
            130                 135                 140
    Trp Pro Val Gly Gly Tyr Pro Gly Pro Gln Pro Tyr Tyr Cys Ala
    145                 150                 155                 160
    Ala Gly Ala Asp Lys Ala Phe Gly Arg Asp Val Val Asp Ala His Tyr
                        165                 170                 175
    Lys Ala Cys Leu Tyr Ala Gly Ile Asn Ile Ser Gly Ile Asn Gly Glu
                    180                 185                 190
    Val Met Pro Gly Gln Trp Glu Phe Gln Val Gly Pro Ser Val Gly Ile
                195                 200                 205
    Ser Ala Gly Asp Glu Ile Trp Val Ala Arg Tyr Ile Leu Glu Arg Ile
        210                 215                 220
    Thr Glu Met Ala Gly Ile Val Leu Ser Leu Asp Pro Lys Pro Ile Lys
    225                 230                 235                 240
    Gly Asp Trp Asn Gly Ala Gly Ala His Thr Asn Tyr Ser Thr Lys Ser
                        245                 250                 255
    Met Arg Glu Ala Gly Gly Tyr Glu Val Ile Lys Glu Ala Ile Glu Lys
                    260                 265                 270
    Leu Gly Lys Arg His Arg Glu His Ile Ala Ala Tyr Gly Glu Gly Asn
                275                 280                 285
    Glu Arg Arg Leu Thr Gly Arg His Glu Thr Ala Asp Ile Asn Thr Phe
        290                 295                 300
    Lys Trp Gly Val Ala Asn Arg Gly Ala Ser Ile Arg Val Gly Arg Asp
    305                 310                 315                 320
    Thr Glu Lys Glu Gly Lys Gly Tyr Phe Glu Asp Arg Arg Pro Ala Ser
                        325                 330                 335
    Asn Met Asp Pro Tyr Val Val Thr Gly Met Ile Ala Thr Thr Ile
                    340                 345                 350
    Leu Trp Lys Gly Asn
            355

<210> SEQ ID NO 31
<211> LENGTH: 357
<212> TYPE: PRT
<213> ORGANISM: Zea mays

<400> SEQUENCE: 31

Met Ala Ser Leu Thr Asp Leu Val Asn Leu Asp Leu Ser Asp Cys Thr
    1               5                   10                  15
    Asp Arg Ile Ile Ala Glu Tyr Ile Trp Val Gly Gly Ser Gly Ile Asp
                    20                  25                  30
    Leu Arg Ser Lys Ala Arg Thr Val Lys Gly Pro Ile Thr Asp Pro Ser
                35                  40                  45
    Gln Leu Pro Lys Trp Asn Phe Asp Gly Ser Ser Thr Gly Gln Ala Pro
        50                  55                  60
    Gly Glu Asp Ser Glu Val Ile Leu Tyr Pro Gln Ala Ile Phe Lys Asp
    65                  70                  75                  80
    Pro Phe Arg Lys Gly Asn Asn Ile Leu Val Met Cys Asp Cys Tyr Thr
                    85                  90                  95
    Pro Gln Gly Glu Pro Ile Pro Ser Asn Lys Arg Tyr Lys Ala Ala Thr
                100                 105                 110
```

```
Val Phe Ser His Pro Asp Val Ala Glu Val Pro Trp Tyr Gly Ile
            115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
    195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
    275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 32
<211> LENGTH: 357
<212> TYPE: PRT
<213> ORGANISM: Zea mays

<400> SEQUENCE: 32

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Arg Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125
```

```
Glu Gln Glu Tyr Thr Leu Leu Gln Lys Asp Val Ser Trp Pro Leu Gly
            130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Thr Thr Ile
                340                 345                 350

Leu Trp Lys Gly Asn
            355

<210> SEQ ID NO 33
<211> LENGTH: 357
<212> TYPE: PRT
<213> ORGANISM: Zea mays

<400> SEQUENCE: 33

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Arg Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
```

```
                130                 135                 140
Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
                195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Glu Gly Asn
                275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
            355

<210> SEQ ID NO 34
<211> LENGTH: 357
<212> TYPE: PRT
<213> ORGANISM: Zea mays

<400> SEQUENCE: 34

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg His Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140
```

```
Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
            165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
            245                 250                 255

Met Arg Glu Ala Gly Tyr Glu Val Ile Lys Glu Ala Ile Glu Lys
            260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Thr Thr Ile
            340                 345                 350

Leu Trp Lys Gly Asn
        355

<210> SEQ ID NO 35
<211> LENGTH: 357
<212> TYPE: PRT
<213> ORGANISM: Zea mays

<400> SEQUENCE: 35

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
            85                  90                  95

Pro Gln Gly Glu Pro Ile Pro Ser Asn Lys Arg Tyr Asn Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160
```

```
Ala Gly Ala Asp Lys Ala Phe Gly Arg Asp Val Val Asp Ala His Tyr
            165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
            245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
            290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
            325                 330                 335

Asn Met Asp Pro Tyr Val Val Thr Gly Met Ile Ala Asp Thr Thr Ile
            340                 345                 350

Leu Trp Lys Gly Asn
            355

<210> SEQ ID NO 36
<211> LENGTH: 357
<212> TYPE: PRT
<213> ORGANISM: Zea mays

<400> SEQUENCE: 36

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
            85                  90                  95

Pro Gln Gly Glu Pro Ile Pro Ser Asn Lys Arg Tyr Ser Ala Ala Thr
            100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
            130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
```

```
                    165                 170                 175
Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
                195                 200                 205

Ser Ala Gly Asp Glu Ile Trp Val Ala Arg Tyr Ile Leu Glu Arg Ile
                210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Glu Gly Asn
                275                 280                 285

Glu Arg Arg Leu Thr Gly Arg His Glu Thr Ala Asp Ile Asn Thr Phe
                290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Thr Thr Ile
                340                 345                 350

Leu Trp Lys Gly Asn
                355

<210> SEQ ID NO 37
<211> LENGTH: 357
<212> TYPE: PRT
<213> ORGANISM: Zea mays

<400> SEQUENCE: 37

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Gly Ala Ala Thr
                100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Asp Ala His Tyr
                165                 170                 175
```

```
Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 38
<211> LENGTH: 357
<212> TYPE: PRT
<213> ORGANISM: Zea mays

<400> SEQUENCE: 38

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Ile Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190
```

```
Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
        260                 265                 270

Leu Gly Lys Arg His Arg Glu His Ile Ala Ala Tyr Gly Glu Gly Asn
    275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355
```

<210> SEQ ID NO 39
<211> LENGTH: 357
<212> TYPE: PRT
<213> ORGANISM: Zea mays

<400> SEQUENCE: 39

```
Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Glu Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
```

```
                195                 200                 205
Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                    245                 250                 255

Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                    325                 330                 335

Asn Met Asp Pro Tyr Val Val Thr Gly Met Ile Ala Asp Thr Thr Ile
                340                 345                 350

Leu Trp Lys Gly Asn
        355

<210> SEQ ID NO 40
<211> LENGTH: 357
<212> TYPE: PRT
<213> ORGANISM: Zea mays

<400> SEQUENCE: 40

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Phe Gly Ile
            115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
            195                 200                 205
```

```
Ser Ala Gly Asp Glu Ile Trp Val Ala Arg Tyr Ile Leu Glu Arg Ile
    210                 215                 220
Thr Glu Met Ala Gly Ile Val Leu Ser Leu Asp Pro Lys Pro Ile Lys
225                 230                 235                 240
Gly Asp Trp Asn Gly Ala Gly Ala His Thr Asn Tyr Ser Thr Lys Ser
                245                 250                 255
Met Arg Glu Ala Gly Gly Tyr Glu Val Ile Lys Glu Ala Ile Glu Lys
            260                 265                 270
Leu Gly Lys Arg His Arg Glu His Ile Ala Ala Tyr Gly Glu Gly Asn
        275                 280                 285
Glu Arg Arg Leu Thr Gly Arg His Glu Thr Ala Asp Ile Asn Thr Phe
290                 295                 300
Lys Trp Gly Val Ala Asn Arg Gly Ala Ser Ile Arg Val Gly Arg Asp
305                 310                 315                 320
Thr Glu Lys Glu Gly Lys Gly Tyr Phe Glu Asp Arg Arg Pro Ala Ser
                325                 330                 335
Asn Met Asp Pro Tyr Val Val Thr Gly Met Ile Ala Asp Thr Thr Ile
            340                 345                 350
Leu Trp Lys Gly Asn
        355

<210> SEQ ID NO 41
<211> LENGTH: 357
<212> TYPE: PRT
<213> ORGANISM: Zea mays

<400> SEQUENCE: 41

Met Ala Ser Leu Thr Asp Leu Val Asn Leu Asp Leu Ser Asp Cys Thr
1               5                   10                  15
Asp Arg Ile Ile Ala Glu Tyr Ile Trp Val Gly Gly Ser Gly Ile Asp
                20                  25                  30
Leu Arg Ser Lys Ala Arg Thr Val Lys Gly Pro Ile Thr Asp Pro Ser
            35                  40                  45
Gln Leu Pro Lys Trp Asn Tyr Asp Gly Ser Ser Thr Gly Gln Ala Pro
        50                  55                  60
Gly Glu Asp Ser Glu Val Ile Leu Tyr Pro Gln Ala Ile Phe Lys Asp
65                  70                  75                  80
Pro Phe Arg Lys Gly Asn Asn Ile Leu Val Met Cys Asp Cys Tyr Thr
                85                  90                  95
Pro Gln Gly Glu Pro Ile Pro Ser Asn Lys Arg Tyr Lys Ala Ala Thr
            100                 105                 110
Val Phe Ser His Pro Asp Val Ala Ala Glu Val Pro Trp Tyr Gly Ile
        115                 120                 125
Glu Gln Glu Tyr Thr Leu Leu Gln Lys Asp Val Ser Trp Pro Leu Gly
        130                 135                 140
Trp Pro Val Gly Gly Tyr Pro Gly Pro Gln Gly Pro Tyr Tyr Cys Ala
145                 150                 155                 160
Val Gly Ala Asp Lys Ala Phe Gly Arg Asp Val Val Asp Ala His Tyr
                165                 170                 175
Lys Ala Cys Leu Tyr Ala Gly Ile Asn Ile Ser Gly Ile Asn Gly Glu
            180                 185                 190
Val Met Pro Gly Gln Trp Glu Phe Gln Val Gly Pro Ser Val Gly Ile
        195                 200                 205
Ser Ala Gly Asp Glu Ile Trp Val Ala Arg Tyr Ile Leu Glu Arg Ile
    210                 215                 220
```

```
Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
                260                 265                 270

Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
        290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
        355

<210> SEQ ID NO 42
<211> LENGTH: 357
<212> TYPE: PRT
<213> ORGANISM: Zea mays

<400> SEQUENCE: 42

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Ile Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
        210                 215                 220

Thr Glu Met Ala Gly Ile Val Leu Ser Leu Asp Pro Lys Pro Ile Lys
```

```
                225                 230                 235                 240
Gly Asp Trp Asn Gly Ala Gly His Thr Asn Tyr Ser Thr Lys Ser
            245                 250                 255
Met Arg Glu Ala Gly Gly Tyr Glu Val Ile Lys Glu Ala Ile Glu Lys
            260                 265                 270
Leu Gly Lys Arg His Arg Glu His Ile Ala Ala Tyr Gly Glu Gly Asn
            275                 280                 285
Glu Arg Arg Leu Thr Gly Arg His Glu Thr Ala Asp Ile Asn Thr Phe
            290                 295                 300
Lys Trp Gly Val Ala Asn Arg Gly Ala Ser Ile Arg Val Gly Arg Asp
305                 310                 315                 320
Thr Glu Lys Glu Gly Lys Gly Tyr Phe Glu Asp Arg Arg Pro Ala Ser
                325                 330                 335
Asn Met Asp Pro Tyr Val Val Thr Gly Met Ile Ala Asp Thr Thr Ile
                340                 345                 350
Leu Trp Lys Gly Asn
            355

<210> SEQ ID NO 43
<211> LENGTH: 357
<212> TYPE: PRT
<213> ORGANISM: Zea mays

<400> SEQUENCE: 43

Met Ala Ser Leu Thr Asp Leu Val Asn Leu Asp Leu Ser Asp Cys Thr
1               5                   10                  15
Asp Arg Ile Ile Ala Glu Tyr Ile Trp Val Gly Gly Ser Gly Ile Asp
                20                  25                  30
Leu Arg Ser Lys Ala Arg Thr Val Lys Gly Pro Ile Thr Asp Pro Ser
            35                  40                  45
Gln Leu Pro Lys Trp Asn Tyr Asp Gly Ser Ser Thr Gly Gln Ala Pro
        50                  55                  60
Gly Glu Asp Ser Glu Val Ile Leu Tyr Pro Gln Ala Ile Phe Lys Asp
65                  70                  75                  80
Pro Phe Arg Lys Gly Asn Asn Ile Leu Val Met Cys Asp Cys Tyr Thr
                85                  90                  95
Pro Gln Gly Glu Pro Ile Pro Ser Asn Lys Arg Tyr Lys Ala Ala Thr
            100                 105                 110
Val Phe Ser His Pro Asp Val Ala Ala Glu Val Pro Trp Tyr Gly Ile
        115                 120                 125
Glu Gln Glu Tyr Thr Leu Leu Gln Lys Asp Val Ser Trp Pro Leu Gly
    130                 135                 140
Trp Pro Val Gly Gly Tyr Pro Gly Pro Gln Gly Pro Tyr Tyr Cys Ala
145                 150                 155                 160
Ala Gly Ala Asp Lys Ala Phe Gly Arg Asp Ile Val Asp Ala His Tyr
                165                 170                 175
Lys Ala Cys Leu Tyr Ala Gly Ile Asn Ile Ser Gly Ile Asn Gly Glu
            180                 185                 190
Val Met Pro Gly Gln Trp Glu Phe Gln Val Gly Pro Ser Val Gly Ile
        195                 200                 205
Ser Ala Gly Asp Glu Ile Trp Val Ala Arg Tyr Ile Leu Glu Arg Ile
    210                 215                 220
Thr Glu Met Ala Gly Ile Val Leu Ser Leu Asp Pro Lys Pro Ile Lys
225                 230                 235                 240
```

Gly Asp Trp Asn Gly Ala Gly Ala His Thr Asn Tyr Ser Thr Lys Ser
            245                 250                 255

Met Arg Glu Ala Gly Gly Tyr Glu Val Ile Lys Glu Ala Ile Glu Lys
        260                 265                 270

Leu Gly Lys Arg His Arg Glu His Ile Ala Ala Tyr Gly Glu Gly Asn
    275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 44
<211> LENGTH: 357
<212> TYPE: PRT
<213> ORGANISM: Zea mays

<400> SEQUENCE: 44

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Ala Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 45
<211> LENGTH: 357
<212> TYPE: PRT
<213> ORGANISM: Zea mays

<400> SEQUENCE: 45

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Val Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys

```
            260                 265                 270
Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
            290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
                355

<210> SEQ ID NO 46
<211> LENGTH: 357
<212> TYPE: PRT
<213> ORGANISM: Zea mays

<400> SEQUENCE: 46

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Glu Val Ala Ala Glu Val Pro Trp Tyr Gly Ile
            115                 120                 125

Glu Gln Glu Tyr Thr Leu Leu Gln Lys Asp Val Ser Trp Pro Leu Gly
            130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
            210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270
```

```
Leu Gly Lys Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
        290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
        355

<210> SEQ ID NO 47
<211> LENGTH: 357
<212> TYPE: PRT
<213> ORGANISM: Zea mays

<400> SEQUENCE: 47

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
        130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
        210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Lys Ala Ile Glu Lys
                260                 265                 270

Leu Gly Lys Arg His Arg Glu His Ile Ala Ala Tyr Gly Glu Gly Asn
            275                 280                 285
```

```
Glu Arg Arg Leu Thr Gly Arg His Glu Thr Ala Asp Ile Asn Thr Phe
        290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                    325                 330                 335

Asn Met Asp Pro Tyr Val Val Thr Gly Met Ile Ala Asp Thr Thr Ile
                    340                 345                 350

Leu Trp Lys Gly Asn
                355

<210> SEQ ID NO 48
<211> LENGTH: 357
<212> TYPE: PRT
<213> ORGANISM: Zea mays

<400> SEQUENCE: 48

Met Ala Ser Leu Thr Asp Leu Val Asn Leu Asp Leu Ser Asp Cys Thr
1                   5                   10                  15

Asp Arg Ile Ile Ala Glu Tyr Ile Trp Val Gly Gly Ser Gly Ile Asp
                    20                  25                  30

Leu Arg Ser Lys Ala Arg Thr Val Lys Gly Pro Ile Thr Asp Pro Ser
                    35                  40                  45

Gln Leu Pro Lys Trp Asn Tyr Asp Gly Ser Ser Thr Gly Gln Ala Pro
            50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                    85                  90                  95

Pro Gln Gly Glu Pro Ile Pro Ser Asn Lys Arg Tyr Lys Ala Ala Thr
                    100                 105                 110

Val Phe Ser His Pro Asp Val Ala Ala Glu Val Pro Trp Tyr Gly Ile
                115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                    165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
                195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                    245                 250                 255

Met Arg Glu Ala Gly Gly Tyr Glu Val Ile Lys Ala Ala Ile Glu Lys
                260                 265                 270

Leu Gly Lys Arg His Arg Glu His Ile Ala Ala Tyr Gly Glu Gly Asn
                275                 280                 285

Glu Arg Arg Leu Thr Gly Arg His Glu Thr Ala Asp Ile Asn Thr Phe
```

```
        290                 295                 300
Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
                340                 345                 350

Leu Trp Lys Gly Asn
            355

<210> SEQ ID NO 49
<211> LENGTH: 357
<212> TYPE: PRT
<213> ORGANISM: Zea mays

<400> SEQUENCE: 49

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
                100                 105                 110

Val Phe Ser His Pro Asp Val Ala Ala Glu Val Pro Trp Tyr Gly Ile
            115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
            195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
                260                 265                 270

Leu Gly Lys Arg His Lys Glu His Ile Ala Ala Tyr Gly Glu Gly Asn
            275                 280                 285

Glu Arg Arg Leu Thr Gly Arg His Glu Thr Ala Asp Ile Asn Thr Phe
    290                 295                 300
```

```
Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 50
<211> LENGTH: 357
<212> TYPE: PRT
<213> ORGANISM: Zea mays

<400> SEQUENCE: 50

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Arg Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320
```

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 51
<211> LENGTH: 357
<212> TYPE: PRT
<213> ORGANISM: Zea mays

<400> SEQUENCE: 51

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Gly Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser

-continued

```
                    325                 330                 335

Asn Met Asp Pro Tyr Val Val Thr Gly Met Ile Ala Asp Thr Thr Ile
                340                 345                 350

Leu Trp Lys Gly Asn
            355

<210> SEQ ID NO 52
<211> LENGTH: 357
<212> TYPE: PRT
<213> ORGANISM: Zea mays

<400> SEQUENCE: 52

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
                20                  25                  30

Leu Arg Ser Lys Ala Arg Thr Val Lys Gly Pro Ile Thr Asp Pro Ser
            35                  40                  45

Gln Leu Pro Lys Trp Asn Tyr Asp Gly Ser Ser Thr Gly Gln Ala Pro
        50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Asp Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335
```

Asn Met Asp Pro Tyr Val Val Thr Gly Met Ile Ala Asp Thr Ile
            340                 345                 350
Leu Trp Lys Gly Asn
        355

<210> SEQ ID NO 53
<211> LENGTH: 357
<212> TYPE: PRT
<213> ORGANISM: Zea mays

<400> SEQUENCE: 53

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Asp Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 54
<211> LENGTH: 357
<212> TYPE: PRT
<213> ORGANISM: Zea mays

<400> SEQUENCE: 54

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Ser Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn

```
<210> SEQ ID NO 55
<211> LENGTH: 357
<212> TYPE: PRT
<213> ORGANISM: Zea mays

<400> SEQUENCE: 55

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Val Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355
```

```
<210> SEQ ID NO 56
<211> LENGTH: 357
<212> TYPE: PRT
<213> ORGANISM: Zea mays

<400> SEQUENCE: 56

Met Ala Ser Leu Thr Asp Leu Val Asn Leu Asp Leu Ser Asp Cys Thr
 1               5                  10                  15

Asp Arg Ile Ile Ala Glu Tyr Ile Trp Val Gly Gly Ser Gly Ile Asp
             20                  25                  30

Leu Arg Ser Lys Ala Arg Thr Val Lys Gly Pro Ile Thr Asp Pro Ser
         35                  40                  45

Gln Leu Pro Lys Trp Asn Tyr Asp Gly Ser Ser Thr Gly Gln Ala Pro
     50                  55                  60

Gly Glu Asp Ser Glu Val Ile Leu Tyr Pro Gln Ala Ile Phe Lys Asp
 65                  70                  75                  80

Pro Phe Arg Lys Gly Asn Asn Ile Leu Val Met Cys Asp Cys Tyr Thr
                 85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Gln
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 57
```

```
<211> LENGTH: 357
<212> TYPE: PRT
<213> ORGANISM: Zea mays

<400> SEQUENCE: 57

Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Glu
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355

<210> SEQ ID NO 58
<211> LENGTH: 357
<212> TYPE: PRT
```

<213> ORGANISM: Zea mays

<400> SEQUENCE: 58

```
Met Ala Ser Leu Thr Asp Leu Val Asn Leu Asp Leu Ser Asp Cys Thr
1               5                   10                  15

Asp Arg Ile Ile Ala Glu Tyr Ile Trp Val Gly Gly Ser Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn Asn Ile Leu Val Met Cys Asp Cys Tyr Thr
                85                  90                  95

Pro Gln Gly Glu Pro Ile Pro Ser Asn Lys Arg Tyr Lys Ala Ala Thr
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Gly
145                 150                 155                 160

Ile Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Gly Tyr Glu Val Ile Lys Glu Ala Ile Glu Lys
            260                 265                 270

Leu Gly Lys Arg His Arg Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Val Val Thr Gly Met Ile Ala Asp Thr Thr Ile
            340                 345                 350

Leu Trp Lys Gly Asn
        355
```

<210> SEQ ID NO 59
<211> LENGTH: 357
<212> TYPE: PRT
<213> ORGANISM: Zea mays

<400> SEQUENCE: 59

```
Met Ala Ser Leu Thr Asp Leu Val Asn Leu Asp Leu Ser Asp Cys Thr
1               5                   10                  15

Asp Arg Ile Ile Ala Glu Tyr Ile Trp Ile Gly Gly Thr Gly Ile Asp
            20                  25                  30

Leu Arg Ser Lys Ala Arg Thr Val Lys Gly Pro Ile Thr Asp Pro Ser
        35                  40                  45

Gln Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Lys Gly Asn His Ile Leu Val Met Cys Asp Cys Tyr Thr
                85                  90                  95

Pro Gln Gly Glu Pro Ile Pro Thr Asn Lys Arg Tyr Ser Ala Ala Lys
            100                 105                 110

Val Phe Ser His Pro Asp Val Ala Ala Glu Val Pro Trp Tyr Gly Ile
        115                 120                 125

Glu Gln Glu Tyr Thr Leu Leu Gln Lys Asp Val Ser Trp Pro Leu Gly
    130                 135                 140

Trp Pro Val Gly Gly Tyr Pro Gly Pro Gln Gly Pro Tyr Tyr Cys Ala
145                 150                 155                 160

Ala Gly Ala Asp Lys Ala Phe Gly Arg Asp Val Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Val Ala Arg Tyr Ile Leu Glu Arg Ile
    210                 215                 220

Thr Glu Met Ala Gly Ile Val Leu Ser Leu Asp Pro Lys Pro Ile Lys
225                 230                 235                 240

Gly Asp Trp Asn Gly Ala Gly Ala His Thr Asn Tyr Ser Thr Lys Ser
                245                 250                 255

Met Arg Glu Ala Gly Tyr Glu Val Ile Lys Ala Ala Ile Asp Lys
            260                 265                 270

Leu Gly Lys Arg His Lys Glu His Ile Ala Ala Tyr Gly Glu Gly Asn
            275                 280                 285

Glu Arg Arg Leu Thr Gly Arg His Glu Thr Ala Asp Ile Asn Thr Phe
    290                 295                 300

Lys Trp Gly Val Ala Asn Arg Gly Ala Ser Ile Arg Val Gly Arg Asp
305                 310                 315                 320

Thr Glu Arg Glu Gly Lys Gly Tyr Phe Glu Asp Arg Arg Pro Ala Ser
                325                 330                 335

Asn Met Asp Pro Tyr Val Val Thr Gly Met Ile Ala Glu Thr Thr Ile
            340                 345                 350

Leu Trp Asn Gly Asn
        355
```

<210> SEQ ID NO 60
<211> LENGTH: 368
<212> TYPE: PRT
<213> ORGANISM: Zea mays

<400> SEQUENCE: 60

Met Ala Leu Leu Ser Asp Leu Ile Asn Leu Asp Leu Ser Gly Arg Thr
1               5                   10                  15

Gly Lys Ile Ile Ala Glu Tyr Ile Trp Val Gly Gly Ser Gly Met Asp
            20                  25                  30

Val Arg Ser Lys Ala Arg Thr Leu Ser Gly Pro Val Asp Asp Pro Ser
        35                  40                  45

Lys Leu Pro Lys Trp Asn Phe Asp Gly Ser Ser Thr Gly Gln Ala Pro
50                  55                  60

Gly Asp Asp Ser Glu Val Ile Leu Cys Pro Arg Ala Ile Phe Arg Asp
65                  70                  75                  80

Pro Phe Arg Lys Gly Gln Asn Ile Leu Val Met Cys Asp Cys Tyr Glu
                85                  90                  95

Pro Asn Gly Glu Pro Ile Pro Ser Asn Lys Arg His Gly Ala Ala Lys
            100                 105                 110

Ile Phe Ser His Pro Asp Val Lys Ala Glu Glu Pro Trp Phe Gly Ile
        115                 120                 125

Glu Gln Glu Tyr Thr Leu Leu Gln Lys Asp Thr Lys Trp Pro Leu Gly
    130                 135                 140

Trp Pro Leu Ala Tyr Pro Gly Pro Gln Gly Pro Tyr Tyr Cys Ala Ala
145                 150                 155                 160

Gly Ala Asp Lys Ser Tyr Gly Arg Asp Ile Val Asp Cys Ala Tyr Lys
                165                 170                 175

Ala Cys Leu Tyr Ala Gly Ile Asp Ile Ser Gly Ile Asn Gly Glu Val
            180                 185                 190

Met Pro Gly Gln Trp Glu Phe Gln Val Ala Pro Ala Val Gly Val Ser
        195                 200                 205

Ala Gly Asp Gln Leu Trp Val Ala Arg Tyr Ile Leu Glu Arg Ile Thr
    210                 215                 220

Glu Ile Ala Gly Val Val Val Ser Phe Asp Pro Lys Pro Ile Pro Gly
225                 230                 235                 240

Asp Trp Asn Gly Ala Gly Ala His Thr Asn Tyr Ser Thr Lys Ser Met
                245                 250                 255

Arg Ser Asp Gly Gly Tyr Glu Val Ile Lys Lys Ala Ile Gly Lys Leu
            260                 265                 270

Gly Leu Arg His Arg Glu His Ile Ala Ala Tyr Gly Asp Gly Asn Glu
        275                 280                 285

Arg Pro Leu Thr Gly Arg His Glu Thr Ala Asp Ile Asn Thr Phe Val
    290                 295                 300

Trp Gly Val Pro Asn Arg Gly Ala Ser Val Arg Val Gly Arg Asp Thr
305                 310                 315                 320

Glu Lys Glu Gly Lys Gly Tyr Phe Glu Asp Arg Arg Pro Ala Ser Asn
                325                 330                 335

Met Asp Pro Tyr Val Val Thr Cys Leu Ile Ala Glu Thr Thr Met Leu
            340                 345                 350

Trp Glu Pro Ser His Ser Asn Gly Asp Gly Lys Gly Ala Ala Ala Pro
        355                 360                 365

<210> SEQ ID NO 61
<211> LENGTH: 356
<212> TYPE: PRT
<213> ORGANISM: Zea mays

<400> SEQUENCE: 61

Met Ala Cys Leu Thr Asp Leu Val Asn Leu Asn Leu Ser Asp Asn Thr
1               5                   10                  15

```
Glu Lys Ile Ile Ala Glu Tyr Ile Trp Ile Gly Gly Ser Gly Met Asp
            20                  25                  30

Leu Arg Ser Lys Ala Arg Thr Leu Ser Gly Pro Val Thr Asp Pro Ser
        35                  40                  45

Lys Leu Pro Lys Trp Asn Tyr Asp Gly Ser Thr Gly Gln Ala Pro
50                  55                  60

Gly Glu Asp Ser Glu Val Ile Leu Tyr Pro Gln Ala Ile Phe Lys Asp
65                  70                  75                  80

Pro Phe Arg Arg Gly Asn Asn Ile Leu Val Met Cys Asp Cys Tyr Thr
                85                  90                  95

Pro Ala Gly Glu Pro Ile Pro Thr Asn Lys Arg Tyr Asn Ala Ala Lys
                100                 105                 110

Ile Phe Ser Ser Pro Glu Val Ala Ala Glu Pro Trp Tyr Gly Ile
            115                 120                 125

Glu Gln Glu Tyr Thr Leu Leu Gln Lys Asp Thr Asn Trp Pro Leu Gly
            130                 135                 140

Trp Pro Ile Gly Gly Phe Pro Gly Pro Gln Gly Pro Tyr Tyr Cys Gly
145                 150                 155                 160

Ile Gly Ala Glu Lys Ser Phe Gly Arg Asp Ile Val Asp Ala His Tyr
                165                 170                 175

Lys Ala Cys Leu Tyr Ala Gly Ile Asn Ile Ser Gly Ile Asn Gly Glu
                180                 185                 190

Val Met Pro Gly Gln Trp Glu Phe Gln Val Gly Pro Ser Val Gly Ile
            195                 200                 205

Ser Ser Gly Asp Gln Val Trp Val Ala Arg Tyr Ile Leu Glu Arg Ile
210                 215                 220

Thr Glu Ile Ala Gly Val Val Val Thr Phe Asp Pro Lys Pro Ile Pro
225                 230                 235                 240

Gly Asp Trp Asn Gly Ala Gly Ala His Thr Asn Tyr Ser Thr Glu Ser
                245                 250                 255

Met Arg Lys Glu Gly Gly Tyr Glu Val Ile Lys Ala Ala Ile Glu Lys
                260                 265                 270

Leu Lys Leu Arg His Arg Glu His Ile Ala Ala Tyr Gly Glu Gly Asn
            275                 280                 285

Glu Arg Arg Leu Thr Gly Arg His Glu Thr Ala Asp Ile Asn Thr Phe
290                 295                 300

Ser Trp Gly Val Ala Asn Arg Gly Ala Ser Val Arg Val Gly Arg Glu
305                 310                 315                 320

Thr Glu Gln Asn Gly Lys Gly Tyr Phe Glu Asp Arg Arg Pro Ala Ser
                325                 330                 335

Asn Met Asp Pro Tyr Val Val Thr Ser Met Ile Ala Gly Thr Thr Ile
                340                 345                 350

Ile Trp Lys Pro
        355

<210> SEQ ID NO 62
<211> LENGTH: 355
<212> TYPE: PRT
<213> ORGANISM: Zea mays

<400> SEQUENCE: 62

Met Ala Cys Leu Thr Asp Leu Val Asn Leu Asn Leu Ser Asp Thr Thr
1               5                   10                  15

Glu Lys Ile Ile Ala Glu Tyr Ile Trp Ile Gly Gly Ser Gly Met Asp
```

```
            20                  25                  30
Leu Arg Ser Lys Ala Arg Thr Leu Pro Gly Pro Val Thr Asp Pro Ser
         35                  40                  45
Lys Leu Pro Lys Trp Asn Tyr Asp Gly Ser Ser Thr Gly Gln Ala Pro
     50                  55                  60
Gly Glu Asp Ser Glu Val Ile Leu Tyr Pro Gln Ala Ile Phe Lys Asp
 65                  70                  75                  80
Pro Phe Arg Arg Gly Asn Asn Ile Leu Val Met Cys Asp Cys Tyr Thr
                 85                  90                  95
Pro Ala Gly Glu Pro Ile Pro Thr Asn Lys Arg Tyr Ser Ala Ala Lys
            100                 105                 110
Ile Phe Ser Ser Pro Glu Val Ala Ala Glu Pro Trp Tyr Gly Ile
        115                 120                 125
Glu Gln Glu Tyr Thr Leu Leu Gln Lys Asp Thr Asn Trp Pro Leu Gly
    130                 135                 140
Trp Pro Ile Gly Gly Phe Pro Gly Pro Gln Gly Pro Tyr Tyr Cys Gly
145                 150                 155                 160
Ile Gly Ala Glu Lys Ser Phe Gly Arg Asp Ile Val Asp Ala His Tyr
                165                 170                 175
Lys Ala Cys Leu Tyr Ala Gly Ile Asn Ile Ser Gly Ile Asn Gly Glu
            180                 185                 190
Val Met Pro Gly Gln Trp Glu Phe Gln Val Gly Pro Ser Val Gly Ile
        195                 200                 205
Ser Ser Gly Asp Gln Val Trp Val Ala Arg Tyr Ile Leu Glu Arg Ile
    210                 215                 220
Thr Glu Ile Ala Gly Val Val Val Thr Phe Asp Pro Lys Pro Ile Pro
225                 230                 235                 240
Gly Asp Trp Asn Gly Ala Gly Ala His Thr Asn Tyr Ser Thr Glu Ser
                245                 250                 255
Met Arg Lys Glu Gly Gly Tyr Glu Val Ile Lys Ala Ala Ile Glu Lys
            260                 265                 270
Leu Lys Leu Arg His Lys Glu His Ile Ala Ala Tyr Gly Glu Gly Asn
        275                 280                 285
Glu Arg Arg Leu Thr Gly Arg His Glu Thr Ala Asp Ile Asn Thr Phe
    290                 295                 300
Ser Trp Gly Val Ala Asn Arg Gly Ala Ser Val Ala Val Gly Gln Thr
305                 310                 315                 320
Glu Gln Asn Gly Lys Gly Tyr Phe Glu Asp Arg Arg Pro Ala Ser Asn
                325                 330                 335
Met Asp Leu Tyr Val Val Thr Ser Met Ile Ala Glu Thr Thr Ile Val
            340                 345                 350
Trp Lys Pro
        355

<210> SEQ ID NO 63
<211> LENGTH: 356
<212> TYPE: PRT
<213> ORGANISM: Glycine max

<400> SEQUENCE: 63

Met Ser Leu Leu Ser Asp Leu Ile Asn Leu Asn Leu Ser Glu Ser Thr
  1               5                  10                  15
Glu Lys Ile Ile Ala Glu Tyr Ile Trp Val Gly Gly Ser Gly Met Asp
             20                  25                  30
```

```
Leu Arg Ser Lys Ala Arg Thr Leu Pro Gly Pro Val Ser Asp Pro Ala
            35                  40                  45

Lys Leu Pro Lys Trp Asn Tyr Asp Gly Ser Ser Thr Asp Gln Ala Pro
 50                      55                  60

Gly Asp Ser Glu Val Ile Leu Tyr Pro Gln Ala Ile Phe Lys Asp
 65                  70                  75                  80

Pro Phe Arg Arg Gly Asn Asn Ile Leu Val Ile Cys Asp Val Tyr Thr
                85                  90                  95

Pro Ala Gly Glu Pro Leu Pro Thr Asn Lys Arg Tyr Gly Ala Ala Lys
               100                 105                 110

Ile Phe Ser His Pro Asp Val Ala Ala Glu Glu Pro Trp Tyr Gly Ile
           115                 120                 125

Glu Gln Glu Tyr Thr Leu Leu Gln Lys Asp Val Asn Trp Pro Leu Gly
       130                 135                 140

Trp Pro Leu Gly Gly Phe Pro Gly Pro Gln Gly Pro Tyr Tyr Cys Gly
145                 150                 155                 160

Ile Gly Ala Asp Lys Ala Tyr Gly Arg Asp Ile Val Asp Ala His Tyr
               165                 170                 175

Lys Ala Cys Ile Tyr Ala Gly Ile Asn Ile Ser Gly Ile Asn Gly Glu
           180                 185                 190

Val Met Pro Gly Gln Trp Glu Phe Gln Val Gly Pro Ser Val Gly Ile
       195                 200                 205

Ser Ala Gly Asp Glu Val Trp Ala Ala Arg Tyr Ile Leu Glu Arg Ile
210                 215                 220

Thr Glu Ile Ala Gly Ala Ile Val Ser Phe Asp Pro Lys Pro Ile Pro
225                 230                 235                 240

Gly Asp Trp Asn Gly Ala Gly Ala His Ser Asn Tyr Ser Thr Lys Ser
               245                 250                 255

Met Arg Glu Glu Gly Tyr Glu Val Ile Lys Lys Ala Ile Glu Lys
           260                 265                 270

Leu Gly Leu Arg His Lys Glu His Ile Ala Ala Tyr Gly Glu Gly Asn
       275                 280                 285

Glu Arg Arg Leu Thr Gly Arg His Glu Thr Ala Asp Ile Asn Thr Phe
290                 295                 300

Ser Trp Gly Val Ala Asn Arg Gly Ser Ser Ile Arg Val Gly Arg Asp
305                 310                 315                 320

Thr Glu Lys Asn Gly Lys Gly Tyr Phe Glu Asp Arg Arg Pro Ala Ser
               325                 330                 335

Asn Met Asp Pro Tyr Val Val Thr Ser Met Ile Ala Gly Thr Thr Ile
           340                 345                 350

Leu Trp Lys Pro
       355

<210> SEQ ID NO 64
<211> LENGTH: 356
<212> TYPE: PRT
<213> ORGANISM: Glycine max

<400> SEQUENCE: 64

Met Ser Leu Leu Ser Asp Leu Ile Asn Leu Asn Leu Ser Glu Ser Thr
 1               5                  10                  15

Glu Lys Ile Val Ala Glu Tyr Ile Trp Val Gly Gly Ser Gly Met Asp
                20                  25                  30

Leu Arg Ser Lys Ala Arg Thr Leu Pro Gly Pro Val Ser Asp Pro Ala
            35                  40                  45
```

Lys Leu Pro Lys Trp Asn Tyr Asp Gly Ser Ser Thr Asp Gln Ala Pro
            50                  55                  60

Gly Asp Asp Ser Glu Val Ile Leu Tyr Pro Gln Ala Ile Phe Lys Asp
65                  70                  75                  80

Pro Phe Arg Arg Gly Asn Asn Ile Leu Val Ile Cys Asp Val Tyr Thr
                85                  90                  95

Pro Ala Gly Glu Pro Leu Pro Thr Asn Lys Arg Tyr Asp Ala Ala Lys
            100                 105                 110

Ile Phe Ser His Pro Asp Val Ala Ala Glu Glu Pro Trp Tyr Gly Ile
            115                 120                 125

Glu Gln Glu Tyr Thr Leu Leu Gln Lys Asp Val Asn Trp Pro Leu Gly
            130                 135                 140

Trp Pro Leu Gly Gly Phe Pro Gly Pro Gln Gly Pro Tyr Tyr Cys Gly
145                 150                 155                 160

Thr Gly Ala Asp Lys Ala Tyr Gly Arg Asp Ile Val Asp Ala His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
            195                 200                 205

Ser Ala Gly Asp Glu Val Trp Ala Ala Arg Tyr Ile Leu Glu Arg Ile
210                 215                 220

Thr Glu Met Ala Gly Val Ile Val Ser Phe Asp Pro Lys Pro Ile Pro
225                 230                 235                 240

Gly Asp Trp Asn Gly Ala Gly Ala His Ser Asn Tyr Ser Thr Lys Ser
                245                 250                 255

Met Arg Asp Glu Gly Gly Tyr Glu Val Ile Lys Lys Ala Ile Glu Lys
            260                 265                 270

Leu Gly Leu Arg His Lys Glu His Ile Ala Ala Tyr Gly Glu Gly Asn
            275                 280                 285

Glu Arg Arg Leu Thr Gly Arg His Glu Thr Ala Asp Ile Asn Thr Phe
            290                 295                 300

Ser Trp Gly Val Ala Asn Arg Gly Ser Ser Ile Arg Val Gly Arg Asp
305                 310                 315                 320

Thr Glu Lys Asn Gly Lys Gly Tyr Phe Glu Asp Arg Arg Pro Ala Ser
                325                 330                 335

Asn Met Asp Pro Tyr Val Val Thr Ser Met Ile Ala Glu Thr Thr Ile
            340                 345                 350

Leu Trp Lys Pro
            355

<210> SEQ ID NO 65
<211> LENGTH: 420
<212> TYPE: PRT
<213> ORGANISM: Glycine max

<400> SEQUENCE: 65

Met Ala Gln Ile Leu Ala Pro Ser Thr Gln Trp Gln Met Arg Ile Ser
1               5                   10                  15

Lys Ser Ser Pro Asn Ala Thr Pro Ile Thr Ser Asn Met Trp Ser Ser
            20                  25                  30

Leu Leu Trp Lys Gln Asn Lys Lys Val Ser Pro Thr Ser Ser Ala Lys
            35                  40                  45

Phe Arg Val Leu Ala Ile Lys Ser Asp Asn Ser Thr Ile Asn Arg Leu

```
            50                  55                  60
Glu Gly Leu Leu Asn Leu Asp Ile Thr Pro Phe Thr Asp Lys Ile Ile
 65                  70                  75                  80

Ala Glu Tyr Ile Trp Ile Gly Thr Gly Ile Asp Val Arg Ser Lys
                 85                  90                  95

Ser Arg Thr Ile Ser Lys Pro Val Glu Asp Pro Ser Glu Leu Pro Lys
                100                 105                 110

Trp Asn Tyr Asp Gly Ser Ser Thr Gly Gln Ala Pro Gly Asp Asp Ser
                115                 120                 125

Glu Val Ile Leu Tyr Pro Gln Ala Ile Phe Lys Asp Pro Phe Arg Gly
                130                 135                 140

Gly Asn Asn Ile Leu Val Ile Cys Asp Ser Tyr Thr Pro Gln Gly Glu
145                 150                 155                 160

Pro Ile Pro Thr Asn Lys Arg His Arg Ala Ala Glu Ile Phe Ser Asn
                165                 170                 175

Pro Lys Val Gln Ala Glu Val Pro Trp Tyr Gly Ile Glu Gln Glu Tyr
                180                 185                 190

Thr Leu Leu Gln Thr Asn Val Lys Trp Pro Leu Gly Trp Pro Val Gly
                195                 200                 205

Gly Tyr Pro Gly Pro Gln Gly Pro Tyr Tyr Cys Ser Ala Gly Ala Asp
                210                 215                 220

Lys Ser Phe Gly Arg Asp Ile Ser Asp Ala His Tyr Lys Ala Cys Leu
225                 230                 235                 240

Tyr Ala Gly Ile Asn Ile Ser Gly Thr Asn Gly Glu Val Met Pro Gly
                245                 250                 255

Gln Trp Glu Tyr Gln Val Gly Pro Ser Val Gly Ile Glu Ala Gly Asp
                260                 265                 270

His Ile Trp Ala Ser Arg Tyr Ile Leu Glu Arg Ile Thr Glu Gln Ala
                275                 280                 285

Gly Val Val Leu Ser Leu Asp Pro Lys Pro Ile Glu Gly Asp Trp Asn
                290                 295                 300

Gly Ala Gly Cys His Thr Asn Tyr Ser Thr Lys Ser Met Arg Glu Asp
305                 310                 315                 320

Gly Gly Phe Glu Val Ile Lys Lys Ala Ile Leu Asn Leu Ser Leu Arg
                325                 330                 335

His Lys Asp His Ile Ser Ala Tyr Gly Glu Gly Asn Glu Arg Arg Leu
                340                 345                 350

Thr Gly Lys His Glu Thr Ala Ser Ile Asn Thr Phe Ser Trp Gly Val
                355                 360                 365

Ala Asn Arg Gly Cys Ser Ile Arg Val Gly Arg Asp Thr Glu Lys Asn
370                 375                 380

Gly Lys Gly Tyr Leu Glu Asp Arg Arg Pro Ala Ser Asn Met Asp Pro
385                 390                 395                 400

Tyr Val Val Thr Ser Leu Leu Ala Glu Thr Thr Leu Leu Trp Glu Pro
                405                 410                 415

Thr Leu Glu Ala
                420

<210> SEQ ID NO 66
<211> LENGTH: 420
<212> TYPE: PRT
<213> ORGANISM: Glycine max

<400> SEQUENCE: 66
```

-continued

```
Met Ala Gln Ile Leu Ala Pro Ser Thr Gln Trp Gln Met Arg Ile Ser
1               5                   10                  15
Lys Ser Ser Pro Asn Ala Ser Pro Ile Thr Ser Asn Met Trp Ser Ser
            20                  25                  30
Leu Leu Trp Lys Gln Asn Lys Lys Val Ser Pro Thr Ser Ser Ala Lys
            35                  40                  45
Phe Arg Val Met Ala Ile Lys Ser Asp Asn Ser Ile Ile Asn Arg Leu
        50                  55                  60
Glu Gly Leu Leu Asn Leu Asp Ile Thr Pro Phe Thr Asp Lys Ile Ile
65                  70                  75                  80
Ala Glu Tyr Ile Trp Ile Gly Gly Thr Gly Ile Asp Val Arg Ser Lys
                85                  90                  95
Ser Arg Thr Ile Ser Lys Pro Val Glu His Pro Ser Glu Leu Pro Lys
            100                 105                 110
Trp Asn Tyr Asp Gly Ser Ser Thr Gly Gln Ala Pro Gly Asp Asp Ser
            115                 120                 125
Glu Val Ile Leu Tyr Pro Gln Ala Ile Phe Lys Asp Pro Phe Arg Gly
    130                 135                 140
Gly Asn Asn Ile Leu Val Ile Cys Asp Ser Tyr Thr Pro Gln Gly Glu
145                 150                 155                 160
Pro Ile Pro Thr Asn Lys Arg His Arg Ala Ala Glu Ile Phe Ser Asn
                165                 170                 175
Pro Lys Val Gln Ala Glu Val Pro Trp Tyr Gly Ile Glu Gln Glu Tyr
            180                 185                 190
Thr Leu Leu Gln Thr Asn Val Lys Trp Pro Leu Gly Trp Pro Val Gly
            195                 200                 205
Gly Tyr Pro Gly Pro Gln Gly Pro Tyr Tyr Cys Ser Ala Gly Ala Asp
    210                 215                 220
Lys Ser Phe Gly Arg Asp Ile Ser Asp Ala His Tyr Lys Ala Cys Leu
225                 230                 235                 240
Tyr Ala Gly Ile Asn Ile Ser Gly Thr Asn Gly Glu Val Met Pro Gly
                245                 250                 255
Gln Trp Glu Tyr Gln Val Gly Pro Ser Val Gly Ile Glu Ala Gly Asp
            260                 265                 270
His Ile Trp Ala Ser Arg Tyr Ile Leu Glu Arg Ile Thr Glu Gln Ala
            275                 280                 285
Gly Val Val Leu Ser Leu Asp Pro Lys Pro Ile Glu Gly Asp Trp Asn
    290                 295                 300
Gly Ala Gly Cys His Thr Asn Tyr Ser Thr Lys Ser Met Arg Glu Asp
305                 310                 315                 320
Gly Gly Phe Glu Val Ile Lys Lys Ala Ile Leu Asn Leu Ser Leu Arg
                325                 330                 335
His Lys Asp His Ile Ser Ala Tyr Gly Glu Gly Asn Glu Arg Arg Leu
            340                 345                 350
Thr Gly Lys His Glu Thr Ala Ser Ile Asn Thr Phe Ser Trp Gly Val
            355                 360                 365
Ala Asn Arg Gly Cys Ser Ile Arg Val Gly Arg Asp Thr Glu Lys Asn
    370                 375                 380
Gly Lys Gly Tyr Leu Glu Asp Arg Arg Pro Ala Ser Asn Met Asp Pro
385                 390                 395                 400
Tyr Val Val Thr Ser Leu Leu Ala Glu Thr Thr Leu Leu Trp Glu Pro
                405                 410                 415
Thr Leu Glu Ala
```

420

<210> SEQ ID NO 67
<211> LENGTH: 356
<212> TYPE: PRT
<213> ORGANISM: Glycine max

<400> SEQUENCE: 67

```
Met Ser Leu Leu Ser Asp Leu Ile Asn Leu Asn Leu Ser Asp Thr Thr
1               5                   10                  15

Glu Lys Val Ile Ala Glu Tyr Ile Trp Ile Gly Gly Ser Gly Met Asp
            20                  25                  30

Leu Arg Ser Lys Ala Arg Thr Leu Pro Gly Pro Val Ser Asp Pro Ser
        35                  40                  45

Lys Leu Pro Lys Trp Asn Tyr Asp Gly Ser Ser Thr Gly Gln Ala Pro
    50                  55                  60

Gly Glu Asp Ser Glu Val Ile Ile Tyr Pro Gln Ala Ile Phe Arg Asp
65                  70                  75                  80

Pro Phe Arg Arg Gly Asn Asn Ile Leu Val Ile Cys Asp Thr Tyr Thr
                85                  90                  95

Pro Ala Gly Glu Pro Ile Pro Thr Asn Lys Arg His Asp Ala Ala Lys
            100                 105                 110

Val Phe Ser His Pro Asp Val Val Ala Glu Glu Thr Trp Tyr Gly Ile
        115                 120                 125

Glu Gln Glu Tyr Thr Leu Leu Gln Lys Asp Ile Gln Trp Pro Leu Gly
    130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Val Asp Ala His Tyr
                165                 170                 175

Lys Ala Cys Leu Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Val Trp Ala Ala Arg Tyr Ile Leu Glu Arg Ile
    210                 215                 220

Thr Glu Ile Ala Gly Val Val Ser Phe Asp Pro Lys Pro Ile Gln
225                 230                 235                 240

Gly Asp Trp Asn Gly Ala Gly Ala His Thr Asn Tyr Ser Thr Lys Ser
                245                 250                 255

Met Arg Asn Asp Gly Gly Tyr Glu Val Ile Lys Thr Ala Ile Glu Lys
            260                 265                 270

Leu Gly Lys Arg His Lys Glu His Ile Ala Ala Tyr Gly Glu Gly Asn
        275                 280                 285

Glu Arg Arg Leu Thr Gly Arg His Glu Thr Ala Asp Ile Asn Thr Phe
    290                 295                 300

Leu Trp Gly Val Ala Asn Arg Gly Ala Ser Val Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Asp Thr Thr Ile
            340                 345                 350

Leu Trp Lys Pro
        355
```

<210> SEQ ID NO 68
<211> LENGTH: 356
<212> TYPE: PRT
<213> ORGANISM: Glycine max

<400> SEQUENCE: 68

```
Met Ser Leu Leu Ser Asp Leu Ile Asn Leu Asn Leu Ser Asp Ile Thr
1               5                   10                  15

Asp Lys Val Ile Ala Glu Tyr Ile Trp Val Gly Gly Ser Gly Met Asp
            20                  25                  30

Met Arg Ser Lys Ala Arg Thr Leu Ser Gly Leu Val Asn Asp Pro Ser
        35                  40                  45

Lys Leu Pro Lys Trp Asn Tyr Asp Gly Ser Ser Thr Gly Gln Ala Pro
    50                  55                  60

Gly Gln Asp Ser Glu Val Ile Leu Tyr Pro Gln Ala Ile Phe Arg Asp
65                  70                  75                  80

Pro Phe Arg Arg Gly Asn Asn Ile Leu Val Met Cys Asp Ala Tyr Thr
                85                  90                  95

Pro Ala Gly Glu Pro Ile Pro Thr Asn Lys Arg Asn Lys Ala Ala Lys
            100                 105                 110

Ile Phe Ser Asn Pro Asp Val Ala Ala Glu Glu Pro Trp Tyr Gly Leu
        115                 120                 125

Glu Gln Glu Tyr Thr Leu Leu Gln Lys Asp Val Gln Trp Pro Leu Gly
    130                 135                 140

Trp Pro Leu Gly Gly Phe Pro Gly Pro Gln Gly Pro Tyr Tyr Cys Gly
145                 150                 155                 160

Thr Gly Ala Asn Lys Ala Phe Gly Arg Asp Ile Val Asp Ser His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Ala Asp Glu Leu Trp Val Ala Arg Tyr Ile Leu Glu Arg Ile
    210                 215                 220

Thr Glu Ile Ala Gly Val Val Leu Ser Phe Asp Pro Lys Pro Ile Gln
225                 230                 235                 240

Gly Asp Trp Asn Gly Ala Gly Ala His Thr Asn Tyr Ser Thr Lys Leu
                245                 250                 255

Met Arg Asn Asp Gly Gly Tyr Glu Ile Ile Lys Lys Ala Ile Ala Lys
            260                 265                 270

Leu Glu Lys Arg His Lys Glu His Ile Ala Ala Tyr Gly Glu Gly Asn
        275                 280                 285

Glu Arg Arg Leu Thr Gly Arg His Glu Thr Ala Asp Met Asn Thr Phe
    290                 295                 300

Leu Trp Gly Val Ala Asn Arg Gly Ala Ser Ile Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Met Ile Ala Gly Thr Thr Ile
            340                 345                 350

Leu Trp Lys Pro
        355
```

<210> SEQ ID NO 69

```
<211> LENGTH: 354
<212> TYPE: PRT
<213> ORGANISM: Delosperma nubigenum

<400> SEQUENCE: 69

Met Thr Ser Leu Leu Asp Leu Gln Asn Leu Asn Leu Ser Glu Ser Thr
1               5                   10                  15

Glu Lys Val Ile Ala Glu Tyr Ile Trp Ile Gly Gly Ser Gly Met Asp
            20                  25                  30

Leu Arg Ser Lys Ala Arg Thr Leu Asn Gly Pro Val Asp Pro Lys
        35                  40                  45

Lys Leu Pro Lys Trp Asn Tyr Asp Gly Ser Ser Thr Gly Gln Ala Pro
50                  55                  60

Gly Gln Asp Ser Glu Val Ile Leu Tyr Pro Gln Ala Ile Phe Lys Asp
65                  70                  75                  80

Pro Phe Arg Arg Gly Asn Asn Ile Leu Val Met Cys Asp Ala Tyr Thr
                85                  90                  95

Pro Gln Gly Glu Pro Ile Pro Thr Asn Lys Arg Tyr Asn Ala Glu Lys
            100                 105                 110

Ile Phe Ser Asn Pro Gln Val Ala Ala Glu Glu Thr Trp Tyr Gly Ile
        115                 120                 125

Glu Gln Glu Tyr Thr Leu Leu Gln Lys Asp Val Asn Trp Pro Val Gly
130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Val Asp Ala His Tyr
                165                 170                 175

Lys Ala Cys Leu Tyr Ala Gly Ile Asn Ile Ser Gly Thr Asn Gly Glu
            180                 185                 190

Val Met Pro Gly Gln Trp Glu Phe Gln Val Gly Pro Ser Val Gly Ile
        195                 200                 205

Ser Ala Ala Asp Glu Ile Trp Ile Ala Arg Tyr Ile Leu Glu Arg Ile
210                 215                 220

Thr Glu Ile Ala Gly Val Val Leu Ser Phe Asp Pro Lys Pro Ile Pro
225                 230                 235                 240

Gly Gly Trp Asn Gly Ala Gly Ala His Thr Asn Tyr Ser Thr Lys Ser
                245                 250                 255

Met Arg Glu Glu Gly Gly Tyr Glu Val Ile Lys Ala Ala Ile Glu Lys
            260                 265                 270

Leu Gly Leu Lys His Lys Glu His Ile Ala Ala Tyr Gly Glu Gly Asn
        275                 280                 285

Glu Arg Arg Leu Thr Gly Lys His Glu Thr Ala Ser Ile Asp Asn Phe
290                 295                 300

Ser Trp Gly Val Ala Asn Arg Gly Ala Ser Val Arg Val Gly Arg Asp
305                 310                 315                 320

Thr Glu Lys Glu Gly Lys Gly Tyr Phe Glu Asp Arg Arg Pro Ala Ser
                325                 330                 335

Asn Met Asp Pro Tyr Ile Val Thr Ser Met Ile Ala Glu Thr Thr Ile
            340                 345                 350

Leu Gly

<210> SEQ ID NO 70
<211> LENGTH: 357
<212> TYPE: PRT
<213> ORGANISM: Chlorophytum comosum Variegatum
```

<400> SEQUENCE: 70

```
Met Ala Ser Leu Val Asn Asp Leu Ile Asn Leu Asp Leu Thr Ser Ser
1               5                   10                  15

Thr Glu Lys Ile Ile Thr Glu Tyr Ile Trp Ile Gly Gly Ser Gly Met
            20                  25                  30

Asp Ile Arg Ser Lys Ala Arg Thr Leu Pro Gly Pro Val Thr Asp Pro
        35                  40                  45

Ser Gln Leu Pro Lys Trp Asn Tyr Asp Gly Ser Ser Thr Gly Gln Ala
    50                  55                  60

Pro Gly Glu Asp Ser Glu Val Ile Leu Tyr Pro Gln Ala Ile Phe Lys
65                  70                  75                  80

Asp Pro Phe Arg Lys Gly Asn Asn Ile Leu Val Met Cys Asp Cys Tyr
                85                  90                  95

Thr Pro Ala Gly Glu Pro Ile Pro Thr Asn Lys Arg Ala Lys Ala Ala
            100                 105                 110

Glu Ile Phe Ser Arg Pro Glu Val Ala Ala Glu Val Thr Trp Tyr Gly
        115                 120                 125

Ile Glu Gln Glu Tyr Thr Leu Leu Gln Lys Asp Val Lys Trp Pro Leu
    130                 135                 140

Gly Trp Pro Val Gly Gly Tyr Pro Gly Pro Gln Gly Pro Tyr Tyr Cys
145                 150                 155                 160

Ala Ala Gly Ala Asp Lys Ala Phe Gly Arg Asp Val Val Asp Ala His
                165                 170                 175

Tyr Lys Ala Cys Leu Tyr Ala Gly Ile Asn Ile Ser Gly Ile Asn Gly
            180                 185                 190

Glu Val Met Pro Gly Gln Trp Glu Phe Gln Val Gly Pro Ser Val Gly
        195                 200                 205

Ile Ser Ala Gly Asp Glu Val Trp Val Ala Arg Tyr Ile Leu Glu Arg
    210                 215                 220

Ile Thr Glu Leu Ala Gly Val Val Val Ser Phe Asp Pro Lys Pro Ile
225                 230                 235                 240

Glu Gly Asp Trp Asn Gly Ala Gly Ala His Thr Asn Tyr Ser Thr Lys
                245                 250                 255

Ser Met Arg Glu Asp Gly Gly Tyr Glu Val Ile Lys Lys Ala Ile Glu
            260                 265                 270

Lys Leu Gly Leu Arg His Lys Glu His Ile Ala Ala Tyr Gly Glu Gly
        275                 280                 285

Asn Glu Arg Arg Leu Thr Gly Lys His Glu Thr Ala Asp Ile Asn Thr
    290                 295                 300

Phe Lys Trp Gly Val Ala Asn Arg Gly Ala Ser Ile Arg Val Gly Arg
305                 310                 315                 320

Asp Thr Glu Lys Asn Gly Lys Gly Tyr Phe Glu Asp Arg Arg Pro Ala
                325                 330                 335

Ser Asn Met Asp Pro Tyr Val Val Thr Ser Met Val Ala Asp Thr Thr
            340                 345                 350

Ile Cys Trp Lys Pro
            355
```

<210> SEQ ID NO 71
<211> LENGTH: 356
<212> TYPE: PRT
<213> ORGANISM: Peperomia caperata

<400> SEQUENCE: 71

```
Met Ser Leu Ile Asn Asp Leu Ile Asn Leu Asn Leu Ser Asp Thr Thr
1               5                   10                  15

Asp Lys Ile Ile Ala Glu Tyr Ile Trp Ile Gly Gly Ser Gly Leu Asp
            20                  25                  30

Leu Arg Ser Lys Ala Arg Thr Leu Pro Gly Pro Val Ser Asp Pro Ser
        35                  40                  45

Glu Leu Pro Lys Trp Asn Tyr Asp Gly Ser Ser Thr Gly Gln Ala Pro
    50                  55                  60

Gly Glu Asp Ser Glu Val Ile Leu Tyr Pro Gln Ala Ile Phe Lys Asp
65                  70                  75                  80

Pro Phe Arg Arg Gly Asn Asn Ile Leu Val Ile Cys Asp Ala Tyr Thr
                85                  90                  95

Pro Ala Gly Glu Pro Ile Pro Ser Asn Lys Arg Tyr Asn Ala Ala Lys
                100                 105                 110

Ile Phe Ser His Pro Asp Val Val Ala Glu Val Pro Trp Tyr Gly Ile
            115                 120                 125

Glu Gln Glu Tyr Thr Leu Leu Gln Lys Glu Val Lys Trp Pro Leu Gly
        130                 135                 140

Trp Pro Val Gly Gly Phe Pro Gly Pro Gln Gly Pro Tyr Tyr Cys Gly
145                 150                 155                 160

Val Gly Ala Asp Lys Ala Phe Gly Arg Asp Ile Val Asp Ser His Tyr
                165                 170                 175

Lys Ala Cys Leu Tyr Ala Gly Val Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Ile Ala Arg Tyr Ile Leu Glu Arg Ile
210                 215                 220

Thr Glu Ile Ala Gly Val Val Leu Ser Leu Asp Pro Lys Pro Ile Gln
225                 230                 235                 240

Gly Asp Trp Asn Gly Ala Gly Ala His Thr Asn Tyr Ser Thr Glu Ser
                245                 250                 255

Met Arg Asn Asp Gly Gly Tyr Glu Ile Ile Lys Lys Ala Ile Glu Lys
                260                 265                 270

Leu Gly Leu Lys His Lys Glu His Ile Ala Ala Tyr Gly Glu Gly Asn
            275                 280                 285

Glu Arg Arg Leu Thr Gly Arg His Glu Thr Ala Asp Ile Asn Thr Phe
        290                 295                 300

Leu Trp Gly Val Ala Asn Arg Gly Ala Ser Ile Arg Val Gly Arg Asp
305                 310                 315                 320

Thr Glu Lys Ala Gly Lys Gly Tyr Phe Glu Asp Arg Arg Pro Ala Ser
                325                 330                 335

Asn Met Asp Pro Tyr Val Val Thr Ser Lys Ile Ala Glu Thr Thr Ile
                340                 345                 350

Leu Trp Lys Pro
        355
```

<210> SEQ ID NO 72
<211> LENGTH: 356
<212> TYPE: PRT
<213> ORGANISM: Amaranthus hypochondriacus

<400> SEQUENCE: 72

Met Ser Leu Leu Asn Asp Leu Ile Asn Leu Asn Leu Ser Glu Thr Thr

```
             1               5              10              15
           Asp Lys Ile Ile Ala Glu Tyr Ile Trp Ile Gly Gly Ser Gly Leu Asp
                           20              25              30

Met Arg Ser Lys Ala Arg Thr Leu Pro Gly Val Ser Asp Pro Ser
                       35              40              45

Glu Leu Pro Lys Trp Asn Tyr Asp Gly Ser Thr Asn Gln Ala Pro
                   50              55              60

Gly Asp Asp Ser Glu Val Ile Ile Tyr Pro Gln Ala Ile Phe Lys Asp
           65              70              75              80

Pro Phe Arg Arg Gly Asn Asn Ile Leu Val Met Cys Asp Ala Tyr Thr
                           85              90              95

Pro Ala Gly Glu Pro Ile Pro Thr Asn Lys Arg Phe Asn Ala Asn Lys
                          100             105             110

Ile Phe Ser His Pro Asp Val Val Ala Glu Pro Trp Tyr Gly Ile
                       115             120             125

Glu Gln Glu Tyr Thr Leu Leu Gln Lys Asp Ile Asn Trp Pro Leu Gly
                          130             135             140

Trp Pro Val Gly Gly Phe Pro Gly Pro Gln Gly Pro Tyr Tyr Cys Gly
           145             150             155             160

Val Gly Ala Asp Lys Ser Phe Gly Arg Asp Ile Val Asp Ala His Tyr
                           165             170             175

Lys Ala Cys Leu Tyr Ala Gly Ile Asn Ile Ser Gly Ile Asn Gly Glu
                       180             185             190

Val Met Pro Gly Gln Trp Glu Phe Gln Val Gly Pro Thr Val Gly Ile
                       195             200             205

Ser Ser Gly Asp Gln Val Trp Val Ala Arg Tyr Ile Leu Glu Arg Ile
               210             215             220

Ala Glu Val Ala Gly Ala Ile Val Ser Phe Asp Pro Lys Pro Val Lys
           225             230             235             240

Gly Asp Trp Asn Gly Ala Gly Ala His Thr Asn Tyr Ser Thr Lys Ser
                           245             250             255

Met Arg Asn Asp Gly Gly Ile Asp Val Ile Lys Lys Ala Ile Glu Lys
                       260             265             270

Leu Ser Leu Arg His Lys Glu His Ile Ser Ser Tyr Gly Glu Gly Asn
                       275             280             285

Glu Arg Arg Leu Thr Gly Arg His Glu Thr Ala Asp Ile Gly Thr Phe
                       290             295             300

Ser Trp Gly Val Ala Asn Arg Gly Ala Ser Val Arg Val Gly Arg Asp
           305             310             315             320

Thr Glu Lys Ala Gly Lys Gly Tyr Phe Glu Asp Arg Arg Pro Ala Ser
                           325             330             335

Asn Met Asp Pro Tyr Val Val Thr Ser Met Ile Ala Glu Thr Thr Ile
                           340             345             350

Ile Trp Lys Pro
                       355

<210> SEQ ID NO 73
           <211> LENGTH: 1074
           <212> TYPE: DNA
           <213> ORGANISM: Zea mays

<400> SEQUENCE: 73
atggccagcc tcactgacct cgtcaacctc gacctgagtg actgcacaga caggatcatc      60
gccgagtaca tctgggttgg aggctccggc atagacctca ggagcaaagc aaggacggtg     120
```

```
aaaggcccca tcaccgatcc gagccagctg ccaaaatgga actacgacgg ctccagcacc      180
gggcaggctc ccggagagga cagcgaagtc atcctctacc ctcaagccat tttcaaggac      240
ccgttcagga agggtaacaa catccttgtg atgtgtgact gctacacgcc acaaggcgag      300
ccaatcccca gtaacaagag gtacaaagct gccacggttt tcagccaccc cgatgttgca      360
gctgaggtgc cgtggtacgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 74
<211> LENGTH: 1517
<212> TYPE: DNA
<213> ORGANISM: Glycine max

<400> SEQUENCE: 74

```
agaatttggt agggagagaa caaacccact ataaaatgcc cacacccctg cctcgctgtt       60
ctcacatctt cttttacgta ttgaatctca gaattctcta aaagagatct ttttctgctc      120
tttgaagaaa gaagggtctt tgcttgattt tggagatgtc tctgctctca gatctcatca      180
accttaacct ctccgatacc accgagaagg tgatcgcaga gtacatatgg atcggtggat      240
caggaatgga ccctgaggag caaagcaagga ctctcccagg accagttagc gacccttcag      300
agcttcccaa gtggaactat gatggttcca gcacaggtca agctcctggt gaagacagtg      360
aagtgatttt atacccacaa gccatttttca gggatccatt cagaaggggt aacaatatct      420
tggttatctg tgatgcctac actcctgctg gagaacctat tcccactaac aagaggcacg      480
ctgctgccaa ggttttcagc catcctgatg ttgttgctga agtgccatgg tacggtattg      540
aacaagaata caccttgttg cagaaagata tccaatggcc tcttgggtgg cctgttggtg      600
gtttccctgg acctcaggat ccatactact gtggtgttgg cgctgacaag gcttttggcc      660
gtgacattgt tgacgcacac tacaaagcct gtatttatgc tggcatcaac atcagtggaa      720
ttaatggaga agtgatgccc ggtcagtggg aattccaagt ggaccttca gttgaatct       780 cagctggtga tgagatttgg gcagctcgtt acatcttgga gaggatcact gagattgctg      840
gtgtggtggt tcccttgac cccaagccaa ttaagggtga ttggaatggt gctggtgctc       900
acacaaacta cagcaccaag tccatgagag aagatggtg ctatgaagtg atcaaagcag       960
caattgacaa gttggggaag aagcacaagg agcacattgc tgcttatgga aaggcaacg      1020 aacgtcgttt gacaggacgc cacgaaaccg ctgacatcaa caccttctta tgggagttg    1080 caaaccgtgg agcttctgtt agggttggga gagacacaga gaaagcaggg aagggatatt    1140
```

```
ttgaggacag aaggccagct tccaacatgg acccatacgt ggttacttcc atgattgcag   1200
acacaaccat tctgtggaag ccatgagcaa aacctgcatg ttttctccct ttggatggaa   1260
aggaacagtt atgcttttct tagtaggatt tggtctctct ctcttttac cttttgattg    1320 gtactatggt tggtgccttg ttggttggtg caactaactg gcaagggttg ttcattgttt   1380
tcttctattc ctttccctcg ttttccgatt gttacaatga caataattta atggttatta   1440
tcagtcttga acaaagaaat gctgattgtg aagtataata ataatatatg aaattgtcat   1500
gttcattgga gtaggaa                                                  1517

<210> SEQ ID NO 75
<211> LENGTH: 1497
<212> TYPE: DNA
<213> ORGANISM: Glycine max

<400> SEQUENCE: 75
taaaataaac tgaagagcat tatctgtttta acatcctata aaggattaaa tgtaccactt    60
tctctcaagg gaaaatcttt tatcttttaa aaagttatct taaatatctt aatttttattt   120 tcgtaattca gagataacac tataaaacct acgcaacaac cttacatcga agcagaggaa    180
caaagaaagg aaaagagaaa aaaatttctc agaagagtcc ccgctgaaag ttttggtttc    240
ttgaagatgt cgttgctctc cgatcttatc aaccttaacc tctccgacat caccgataaa    300
gtgatcgccg agtacatatg ggtaggtgga tctggcatgg atatgaggag caaagcaagg    360
acactctcag gaccggttaa agacccttcg aagcttccca gtggaactat gatggttcc    420 agcactggtc aagctcctgg gcaagatagt gaagtgatct tatatccaca gcaattttc    480 aaggatccat tcaggagggg tagcaatatc ctggttatgt gtgatgctta cactcctgct    540
ggggaaccca ttcctacaaa caagagaaat aatgctgcaa agatattcgg ccatcctgat    600
gttgctgctg aagaaccctg gtatggccta gagcaagaat acaccttgtt gcaaaaagat    660
gtccaatggc ctctaggatg gcctcttggt ggttttcctg ggccacaagg accatatatt    720
tgtggtactg gtgctaacaa ggctttcggg cgtgatattg ttgactcaca ttacaaagca    780
tgtatttatg cgggcattaa catcagtgga atcaatggag aagtgatgcc tggtcagtgg    840
gaattccaag ttggtccatc aattggcatc tctgctgctg acgaattgtg ggttgctcgt    900
tatatttggg agaggatcac cgagattgca ggagtggtgc tttcctttga ccctaaacca    960
attcagggtg attggaatgg tgctggtgct cacacaaatt acagtaccaa gtccatgaga   1020
aacgatggtg gctatgaagt catcaaaaaa gcaattgcta agttggaaaa agacacaag    1080 gagcacattg cagcttacgg agaaggcaac gaacgtcgtt tgactggacg acacgagaca   1140
gctgacatga acacctttgt atggggtgtt gcaaaccgtg gtgcttctat tagagtaggg   1200
agggacactg agaaggcagg gaaggggtat tttgaggata ggaggcctgc ctctaatatg   1260
gacccttatg tggtcacttc catgattgct gagacaacca ttctttggaa accataagca   1320
gcctcaaaaa taatcacaca tgccttgttt tttcatgttt tgtgtgcact cttgttgtga   1380
ctacctcgcc ttttcttagg cattgttttgt tggtagtact gaagtgaaga attgtcgtgt   1440
cattccatta atgtacgttt tcaaaggaat tgtttgtgtg cactcttgtt gtgatta       1497

<210> SEQ ID NO 76
<211> LENGTH: 1074
<212> TYPE: DNA
<213> ORGANISM: Zea mays

<400> SEQUENCE: 76
```

```
atggccctgc tcactgacct cgtcaacctc gacctgagtg acaatacaga caggatcatc    60
gccgagtaca tctggqttgg aggctccggc atagacctca ggagcaaagc aaggacggtg   120
tcaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacacgcc acaaggcgag   300
ccaatcccca gtaacaagag gtacaatgct gccacggttt tcagccaccc cgatgttgca   360
gctgaggaac cctggtacgg tattgagcag gagtacactc tccttcagaa ggatgtgagc   420
tggccccttg gctggcctgt tggtggatac cctggtcccc agggaccata ctactgtgct   480
gttggtgccg ataaggcctt tgggcgcgac gtggctgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa ggccgcgatc aggaagctgg ggaagaggca cagggagcac   840
atcgccgcgt acggcgaggg caacgagcgc cgcctcacgg gccgccacga gaccgccgac   900
atcaacacct tcagttgggg cgtggcgaac cgcggcgcgt ccatccgcgt cggccgcgac   960
accgagaagg agggcaaggg atacttcgag gaccgcaggc cggcttccaa catggacccc  1020
tacgtcgtca ccggcatgat cgccgacacc accatcctgt ggaagggaaa ctaa         1074

<210> SEQ ID NO 77
<211> LENGTH: 1074
<212> TYPE: DNA
<213> ORGANISM: Zea mays

<400> SEQUENCE: 77
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga acttcgacgg ctccagcacc   180
gggcaggctc ccggagagga cagcgaagtc atcctctacc ctcaagccat tttccgcgac   240
ccgttcagga agggtaacaa catccttgtg atgtgtgact gctacacgcc acaaggcgag   300
ccaatcccca gtaacaagag gcataaagct gccacggttt tcagccaccc cgatgttgca   360
gctgaggtgc cctggttcgg tattgagcag gagtacactc tccttcagaa ggatgtgagc   420
tggccccttg gctggcctgt tggtggatac cctggtcccc agggaccata ctactgtgct   480
gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa ggaggcgatc gagaagctgg ggaagaggca cagggagcac   840
atcgccgcgt acggcgatgg caacgagcgc cgcctcacgg gccgccacga gaccgccgac   900
atcaacacct tcaaatgggg cgtggcgaac cgcggcgcgt ccatccgcgt cggccgcgac   960
accgagaagg agggcaaggg atacttcgag gaccgcaggc cggcttccaa catggacccc  1020
```

| | |
|---|---|
| tacgtcgtca ccggcatgat cgccgacacc accatcctgt ggaagggaaa ttaa | 1074 |

<210> SEQ ID NO 78
<211> LENGTH: 1074
<212> TYPE: DNA
<213> ORGANISM: Zea mays

<400> SEQUENCE: 78

| | |
|---|---|
| atggccagcc tctctgacct cattaacctc aacctgagtg actgcacaga caggatcatc | 60 |
| gccgagtaca tctggattgg agggtctggc atagacgtaa ggagcaaagc aaggacggtg | 120 |
| aaaggcccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcaggc gcggtaacaa catccttgtg atgtgtgact gctacgcc acaaggcgag | 300 |
| ccaatcccca gtaacaagag gtacaaagct gccacgattt tcagccaccc cgatgttgca | 360 |
| gctgaggtgc catggtacgg tattgagcag gagtacactc tccttcagaa ggatgtgagc | 420 |
| tggccccttg gctggcctgt tggtggatac cctggtcccc aggaccata ctactgtgct | 480 |
| gccggtgccg ataaggcctt tgggcgcgac attgttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggagtg gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccattcgcgt cggccgccaa | 960 |
| accgagaagg agggcaaggg atacttcgag gaccgcaggc cggcttccaa catggacccc | 1020 |
| tacgtcgtca ccggcatgat cgccgatacc accattctgt ggaagggaaa ctaa | 1074 |

<210> SEQ ID NO 79
<211> LENGTH: 1074
<212> TYPE: DNA
<213> ORGANISM: Zea mays

<400> SEQUENCE: 79

| | |
|---|---|
| atggccagcc tctctgacct cgttaacctc aacctgagtg actgcacaga caagatcatc | 60 |
| gccgagtaca tctgggttgg aggatccggc atagacctca ggagcaaagc aaggacggtg | 120 |
| aaaggcccca ttaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacgcc acaaggcgag | 300 |
| ccaatcccca gtaacaagag gtacaaagct gccacggttt tcagccaccc cgatgttgca | 360 |
| gctgaggtgc catggtacgg tattgagcag gagtacactc tccttcagaa ggatgtgagc | 420 |
| tggccccttg gctggcctgt tggtggatac cctggtcccc aggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggagtg gttctctccc tcgacccgaa gccgatcaag | 720 |
| ggtgactgga acggcgccgg cgctcacacc aactacagca ccaagtcgat gagggaggcc | 780 |

```
ggtggctacg aggtgatcaa ggaggcgatc gagaagctgg ggaagaggca caaagagcac      840
atcgccgcgt acggcgaggg caacgagcgc cgcctcacgg ccgccacga gaccgccgac      900 atcaacacct tcaaatgggg cgtggcgaac cgcggcgcgt ccatccgcgt cggccgcgaa      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 80
<211> LENGTH: 1074
<212> TYPE: DNA
<213> ORGANISM: Zea mays

<400> SEQUENCE: 80

```
atggccagcc tctctgacct cgttaacctc aacctgagtg actgcacaga caagatcatc       60
gccgagtaca tctggattgg agggactggc atagacctca ggagcaaagc aaggacggtg      120
aaaggcccca ttaccgatcc gagccagctg ccaaaatgga actacgacgg ctccagcacc      180
gggcaggctc ccggagagga cagcgaagtc atcctctacc tcaagccat tttcaaggac       240 ccgttcagga agggtaacaa catccttgtg atgtgtgact gctacgcc acaaggcgag        300 ccaatcccca gtaacaagag gtacaaagct gccacgattt tcagccaccc cgatgttgca      360
gctgaggtgc catggtacgg tattgagcag gagtacactc tccttcagaa ggatgtgagc      420
tggccccttg gctggcctgt tggtggatac cctggtcccc aggaccata ctactgtgct       480 gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggagtg gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca caaagagcac      840
atcgccgcgt acggcgaggg caacgagcgc cgcctcacgg ccgccacga gaccgccgac       900 atcaacacct tcaaatgggg cgtggcgaac cgcggcgcgt ccattcgcgt cggccgcgaa      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 81
<211> LENGTH: 1074
<212> TYPE: DNA
<213> ORGANISM: Zea mays

<400> SEQUENCE: 81

```
atggccagcc tcactgacct cgtcaacctc gacctgagtg actgcacaga caggatcatc       60
gccgagtaca tctgggttgg aggctccggc atagacctca ggagcaaagc aaggacggtg      120
tcaggcccca tcaccgatcc gagccagctg ccaaaatgga actacgacgg ctccagcacc      180
gggcaggctc ccggagagga cagcgaagtc atcctctacc tcaagccat tttcaaggac       240 ccgttcagga agggtaacaa catccttgtg atgtgtgact gctacgcc acaaggcgag        300 ccaatcccca gtaacaagag gtacaaagct gccacggttt tcagccaccc cgatgttgca      360
gctgaggaac cgtggtacgg tattgagcag gagtacactc tccttcagaa ggatgtgagc      420
tggccccttg gctggcctgt tggtggatac cctggtcccc aggaccata ctactgtgct       480
```

```
gttggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acgcgagggg caacgagcgc cgcctcacgg gccgccacga gaccgccgac      900
atcaacacct tcagttgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa          1074
```

<210> SEQ ID NO 82
<211> LENGTH: 1074
<212> TYPE: DNA
<213> ORGANISM: Zea mays

<400> SEQUENCE: 82

```
atggccagcc tcactgacct cgtcaacctc gacctgagtg actgcacaga caggatcatc       60
gccgagtaca tctgggttgg aggctccggc atagacctca ggagcaaagc aaggacggtg      120
aaaggcccca tcaccgatcc gagccagctg ccaaaatgga acttcgacgg ctccagcacc      180
gggcaggctc ccggagagga cagcgaagtc atcctctacc ctcaagccat tttcaaggac      240
ccgttcagga agggtaacaa catccttgtg atgtgtgact gctacacgcc acaaggcgag      300
ccaatcccca gtaacaagag gtacaaagct gccacggttt tcagccaccc cgatgttgca      360
gctgaggtgc cctggttcgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acgcgagggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa          1074
```

<210> SEQ ID NO 83
<211> LENGTH: 1074
<212> TYPE: DNA
<213> ORGANISM: Zea mays

<400> SEQUENCE: 83

```
atggccagcc tcactgacct cgtcaacctc gacctgagtg actgcacaga caagatcatc       60
gccgagtaca tctgggttgg aggctccggc atagacctca ggagcaaagc aaggacggtg      120
aaaggcccca tcaccgatcc gagccagctg ccaaaatgga actacgacgg ctccagcacc      180
gggcaggctc ccggagagga cagcgaagtc atcctctacc ctcaagccat tttccgcgac      240
```

```
ccgttcagga agggtaacaa catccttgtg atgtgtgact gctacacgcc acaaggcgag      300
ccaatcccca gtaacaagag gtacaaagct gccacggttt tcagccaccc cgatgttgca      360
gctgaggtgc cgtggtacgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggagtc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgaa      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 84
<211> LENGTH: 1074
<212> TYPE: DNA
<213> ORGANISM: Zea mays

<400> SEQUENCE: 84

```
atggccctgc tcactgacct cgtcaacctc gacctgagtg actgcacaga caggatcatc       60
gccgagtaca tctgggttgg aggctccggc atagacctca ggagcaaagc aaggacggtg      120
aaaggcccca tcaccgatcc gagccagctg ccaaaatgga actacgacgg ctccagcacc      180
gggcaggctc ccgagagga cagcgaagtc atcctctacc ctcaagccat tttcaaggac      240
ccgttcagga agggtaacaa catccttgtg atgtgtgact gctacacgcc acaaggcgag      300
ccaatcccca gtaacaagag gtacaaagct gccacggttt tcagccaccc cgatgttgca      360
gctgaggtgc cgtggtacgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 85
<211> LENGTH: 1074
<212> TYPE: DNA
<213> ORGANISM: Zea mays

<400> SEQUENCE: 85

```
atggccagcc tcactgacct cgtcaacctc gacctgtccg gatgcacaga caggatcatc      60
gccgagtaca tctgggttgg aggctccggc atagacctca ggagcaaagc aaggacggtg     120
aaaggcccca tcaccgatcc gagccagctg ccaaaatgga actacgacgg ctccagcacc     180
gggcaggctc ccggagagga cagcgaagtc atcctctacc ctcaagccat tttcaaggac     240
ccgttcagga agggtaacaa catccttgtg atgtgtgact gctacacgcc acaaggcgag     300
ccaatcccca gtaacaagag gtacaaagct gccacggttt tcagccaccc cgatgttgca     360
gctgaggtgc cgtggtacgg tattgagcag gagtacactc tccttcagaa ggatgtgagc     420
tggccccttg gctggcctgt tggtggatac cctggtcccc aggaccata ctactgtgct      480
gccggtgccg ataaggcctt tgggcgcgac gtggttgacg cccactacaa agcctgcctc     540
tacgccggca tcaacatcag cggcatcaac ggcgaagtca tgcctggaca gtgggagttc     600
caagtcgggc cgtccgttgg gatctctgcc ggcgacgaga tatgggtcgc ccgctacatt     660
ctcgagagga tcactgagat ggccggaatc gttctctccc tcgacccgaa gccgatcaag     720
ggtgactgga acggcgccgg cgctcacacc aactacagca ccaagtcgat gagggaggcc     780
ggtggctacg aggtgatcaa ggaggcgatc gagaagctgg ggaagaggca gggagcac      840
atcgccgcgt acggcgaggg caacgagcgc cgcctcacgg gccgccacga gaccgccgac     900
atcaacacct tcaaatgggg cgtggcgaac gcgggcgcgt ccatccgcgt cggccgcgac     960
accgagaagg agggcaaggg atacttcgag gaccgcaggc cggcttccaa catggacccc    1020
tacgtcgtca ccggcatgat cgccgacacc accatcctgt ggaagggaaa ctaa          1074
```

<210> SEQ ID NO 86
<211> LENGTH: 1074
<212> TYPE: DNA
<213> ORGANISM: Zea mays

<400> SEQUENCE: 86

```
atggccagcc tcactgacct cgtcaacctc gacctgagtg actgcacaga caggatcatc      60
gccgagtaca tctgggttgg aggcaccggt atagacctca ggagcaaagc aaggacggtg     120
aaaggcccca tcaccgatcc gagccagctg ccaaaatgga actacgacgg ctccagcacc     180
gggcaggctc ccggagagga cagcgaagtc atcctctacc ctcaagccat tttcaaggac     240
ccgttcagga agggtaacaa catccttgtg atgtgtgact gctacacgcc acaaggcgag     300
ccaatcccca gtaacaagag gtacaaagct gccacggttt tcagccaccc cgatgttgca     360
gctgaggtgc cgtggtacgg tattgagcag gagtacactc tccttcagaa ggatgtgagc     420
tggccccttg gctggcctgt tggtggatac cctggtcccc aggaccata ctactgtgct      480
gccggtgccg ataaggcctt tgggcgcgac gtggttgacg cccactacaa agcctgcctc     540
tacgccggca tcaacatcag cggcatcaac ggcgaagtca tgcctggaca gtgggagttc     600
caagtcgggc cgtccgttgg gatctctgcc ggcgacgaga tatgggtcgc ccgctacatt     660
ctcgagagga tcactgagat ggccggaatc gttctctccc tcgacccgaa gccgatcaag     720
ggtgactgga acggcgccgg cgctcacacc aactacagca ccaagtcgat gagggaggcc     780
ggtggctacg aggtgatcaa ggaggcgatc gagaagctgg ggaagaggca gggagcac      840
atcgccgcgt acggcgaggg caacgagcgc cgcctcacgg gccgccacga gaccgccgac     900
atcaacacct tcaaatgggg cgtggcgaac gcgggcgcgt ccatccgcgt cggccgcgac     960
accgagaagg agggcaaggg atacttcgag gaccgcaggc cggcttccaa catggacccc    1020
```

| | |
|---|---|
| tacgtcgtca ccggcatgat cgccgacacc accatcctgt ggaagggaaa ctaa | 1074 |

<210> SEQ ID NO 87
<211> LENGTH: 1074
<212> TYPE: DNA
<213> ORGANISM: Zea mays

<400> SEQUENCE: 87

| | |
|---|---|
| atggccagcc tcactgacct cgtcaacctc gacctgagtg actgcacaga caggatcatc | 60 |
| gccgagtaca tctggattgg aggctccggc atagacctca ggagcaaagc aaggacggtg | 120 |
| aaagggccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggagaggca cagggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 88
<211> LENGTH: 1074
<212> TYPE: DNA
<213> ORGANISM: Zea mays

<400> SEQUENCE: 88

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| tccggaccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |

| | |
|---|---|
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 89
<211> LENGTH: 1074
<212> TYPE: DNA
<213> ORGANISM: Zea mays

<400> SEQUENCE: 89

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| aaaggcccca tcaccgatcc gagccagctc ccaaaatgga acttcgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 90
<211> LENGTH: 1074
<212> TYPE: DNA
<213> ORGANISM: Zea mays

<400> SEQUENCE: 90

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| aaaggcccca tcaccgatcc gagccagctg ccaaaatgga actacgacgg ctccagcacc | 180 |
| gggcaggctc ccggagagga cagcgaagtc atcctctacc ctcaagccat ttttcgcgac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |

| | |
|---|---|
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac gcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 91
<211> LENGTH: 1074
<212> TYPE: DNA
<213> ORGANISM: Zea mays

<400> SEQUENCE: 91

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| aaaggcccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacgcc acaaggcgag | 300 |
| ccaatccctt cgaacaagag gtacaacgct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc aggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac gcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 92
<211> LENGTH: 1074
<212> TYPE: DNA
<213> ORGANISM: Zea mays

<400> SEQUENCE: 92

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| aaaggcccca tcaccgatcc gagccagctg ccaaaatgga actacgacgg ctccagcacc | 180 |

```
gggcaggctc ccggagagga cagcgaagtc atcctctacc ctcaagccat tttcaaggac    240
ccgttcagga agggtaacaa catccttgtg atgtgtgact gctacacgcc acaaggcgag    300
ccaatcccca gtaacaagag gtacaaagct gccacggttt tcagccaccc cgaagttgca    360
gctgaggtgc cgtggtacgg tattgagcag gagtacactc tccttcagaa ggacgtcagc    420
tggccccttg gctggcctgt tggtggatac cctggtcccc aggaccata ctactgtgct     480 gccggtgccg ataaggcctt tgggcgcgac gtggttgacg cccactacaa agcctgcctc    540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctcgagagga tcactgagat ggccggaatc gttctctccc tcgacccgaa gccgatcaag    720
ggtgactgga acggcgccgg cgctcacacc aactacagca ccaagtcgat gagggaggcc    780
ggtggctacg aggtgatcaa ggaggcgatc gagaagctgg ggaagaggca cagggagcac    840
atcgccgcgt acggcgaggg caacgagcgc cgcctcacgg gccgccacga gaccgccgac    900
atcaacacct tcaaatgggg cgtggcgaac cgcggcgcgt ccatccgcgt cggccgcgac    960
accgagaagg agggcaaggg atacttcgag gaccgcaggc cggcttccaa catggacccc    1020
tacgtcgtca ccggcatgat cgccgacacc accatcctgt ggaagggaaa ctaa          1074

<210> SEQ ID NO 93
<211> LENGTH: 1074
<212> TYPE: DNA
<213> ORGANISM: Zea mays

<400> SEQUENCE: 93
atggccagcc tcactgacct cgtcaacctc gacctgagtg actgcacaga caggatcatc    60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacacgcc acaaggcgag    300
ccaatcccca gtaacaagag gtacaaagct gccacggttt tcagccaccc cgatgttgca    360
gctgaggtgc cgtggttcgg tattgagcag gagtacactc tccttcagaa ggatgtgagc    420
tggccccttg gctggcctgt tggtggatac cctggtcccc aggaccata ctactgtgct     480 gccggtgccg ataaggcctt tgggcgcgac gtggttgacg cccactacaa agcctgcctc    540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctggagagga tcactgagat ggccggaatc gttctctccc tcgacccgaa gccgatcaag    720
ggtgactgga acggcgccgg cgctcacacc aactacagca ccaagtcgat gagggaggcc    780
ggtggctacg aggtgatcaa ggaggcgatc gagaagctgg ggaagaggca cagggagcac    840
atcgccgcgt acggcgaggg caacgagcgc cgcctcacgg gccgccacga gaccgccgac    900
atcaacacct tcaaatgggg cgtggcgaac cgcggcgcgt ccatccgcgt cggccgcgac    960
accgagaagg agggcaaggg atacttcgag gaccgcaggc cggcttccaa catggacccc    1020
tacgtcgtca ccggcatgat cgccgacacc accatcctgt ggaagggaaa ctaa          1074

<210> SEQ ID NO 94
<211> LENGTH: 1074
<212> TYPE: DNA
<213> ORGANISM: Zea mays
```

<400> SEQUENCE: 94

```
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacgcc acaaggcgag   300
ccaatcccca gtaacaagag gtacaaagct gccacggttt tcagccaccc cgatgttgca   360
gccgaggagc cgtggtacgg tattgagcag gagtacactc tccttcagaa ggatgtgagc   420
tggccccttg gctggcctgt tggtggatac cctggtcccc agggaccata ctactgtgct   480
gccggtgccg ataaggcctt gggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acgcgccgg cgctcacacc aactacagca ccaagtcgat gagggaggcc   780
ggtggctacg aggtgatcaa ggaggcgatc gagaagctgg ggaagaggca gggagcac   840
atcgccgcgt acgcgagggg caacgagcgc gccctcacgg gccgcacga gaccgccgac   900
atcaacacct tcaaatgggg cgtggcgaac cgcggcgcgt ccatccgcgt cggccgcgac   960
accgagaagg agggcaaggg atacttcgag gaccgcaggc cggcttccaa catggaccc   1020
tacgtcgtca ccggcatgat cgccgacacc accatcctgt ggaagggaaa ctaa        1074
```

<210> SEQ ID NO 95
<211> LENGTH: 1074
<212> TYPE: DNA
<213> ORGANISM: Zea mays

<400> SEQUENCE: 95

```
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacgcc acaaggcgag   300
ccaatcccca gtaacaagag gtacaaagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc agggaccata ctactgtgct   480
gtcggtgccg ataaggcatt gggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acgcgccgg cgctcacacc aactacagca ccaagtcgat gagggaggcc   780
ggtggctacg aggtgatcaa ggaggcgatc gagaagctgg ggaagaggca gggagcac   840
atcgccgcgt acgcgagggg caacgagcgc gccctcacgg gccgcacga gaccgccgac   900
atcaacacct tcaaatgggg cgtggcgaac cgcggcgcgt ccatccgcgt cggccgcgac   960
```

```
accgagaagg agggcaaggg atacttcgag gaccgcaggc cggcttccaa catggacccc    1020
tacgtcgtca ccggcatgat cgccgacacc accatcctgt ggaagggaaa ctaa          1074

<210> SEQ ID NO 96
<211> LENGTH: 1074
<212> TYPE: DNA
<213> ORGANISM: Zea mays

<400> SEQUENCE: 96
atggccagcc tcactgacct cgtcaacctc gacctgagtg actgcacaga caggatcatc    60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacgcc acaaggcgag     300 ccaatcccca gtaacaagag gtacaaagct gccacggttt tcagccaccc cgatgttgca    360
gctgaggtgc cgtggtacgg tattgagcag gagtacactc tccttcagaa ggatgtgagc    420
tggccccttg gctggcctgt tggtggatac cctggtcccc agggaccata ctactgtgct    480
gccggtgccg ataaggcctt gggcgcgac gtggccgacg cccactacaa agcctgcctc     540
tacgcgggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctcgagagga tcactgagat ggccggaatc gttctctccc tcgacccgaa gccgatcaag    720
ggtgactgga acgcgccgg cgctcacacc aactacagca ccaagtcgat gagggaggcc    780
ggtggctacg aggtgatcaa ggaggcgatc gagaagctgg ggaagaggca cagggagcac    840
atcgccgcgt acggcgaggg caacgagcgc cgcctcacgg gccgcacga gaccgccgac     900 atcaacacct tcaaatgggg cgtggcgaac cgcggcgcgt ccatccgcgt cggccgcgac    960
accgagaagg agggcaaggg atacttcgag gaccgcaggc cggcttccaa catggacccc    1020
tacgtcgtca ccggcatgat cgccgacacc accatcctgt ggaagggaaa ctaa          1074

<210> SEQ ID NO 97
<211> LENGTH: 1074
<212> TYPE: DNA
<213> ORGANISM: Zea mays

<400> SEQUENCE: 97
atggccagcc tcactgacct cgtcaacctc gacctgagtg actgcacaga caggatcatc    60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacgcc acaaggcgag     300 ccaatcccca gtaacaagag gtacaaagct gccacggttt tcagccaccc cgatgttgca    360
gctgaggtgc cgtggtacgg tattgagcag gagtacactc tccttcagaa ggatgtgagc    420
tggccccttg gctggcctgt tggtggatac cctggtcccc agggaccata ctactgtgct    480
gccggtgccg ataaggcctt gggcgcgac gtggttgacg cccactacaa agcctgcctc     540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctcgagagga tcactgagat ggccggaatc gttctctccc tcgacccgaa gccgatcaag    720
```

| | | |
|---|---|---|
| ggtgactgga acggcgccgg cgctcacacc aactacagca ccaagtcgat gagggaggcc | 780 | |
| ggtggctacg aggtgattaa ggcggcgatc gagaagctgg ggaagaggca cagggagcac | 840 | |
| atcgccgcgt acggcgaggg caacgagcgc cgcctcacgg gccgccacga gaccgccgac | 900 | |
| atcaacacct tcaaatgggg cgtggcgaac cgcggcgcgt ccatccgcgt cggccgcgac | 960 | |
| accgagaagg agggcaaggg atacttcgag gaccgcaggc cggcttccaa catggacccc | 1020 | |
| tacgtcgtca ccggcatgat cgccgacacc accatcctgt ggaagggaaa ctaa | 1074 | |

<210> SEQ ID NO 98
<211> LENGTH: 1074
<212> TYPE: DNA
<213> ORGANISM: Zea mays

<400> SEQUENCE: 98

| | | |
|---|---|---|
| atggccagcc tcactgacct cgtcaacctc gacctgagtg actgcacaga caggatcatc | 60 | |
| gccgagtaca tctgggttgg aggctccggc atagacctca ggagcaaagc aaggacggtg | 120 | |
| aaaggcccca tcaccgatcc gagccagctg ccaaaatgga actacgacgg ctccagcacc | 180 | |
| gggcaggctc ccggagagga cagcgaagtc atcctctacc ctcaagccat tttcaaggac | 240 | |
| ccgttcagga agggtaacaa catccttgtg atgtgtgact gctacgcc acaaggcgag | 300 | |
| ccaatcccca gtaacaagag gtacaaagct gccacggttt tcagccaccc cgatgttgca | 360 | |
| gctgaggtgc cgtggtacgg tattgagcag gagtacactc tccttcagaa ggatgtgagc | 420 | |
| tggccccttg gctggcctgt tggtggatac cctggtcccc aggaccata ctactgtgct | 480 | |
| gccggtgccg ataaggcctt tgggcgcgac gtggttgacg cccactacaa agcctgcctc | 540 | |
| tacgccggca tcaacatcag cggcatcaac ggcgaagtca tgcctggaca gtgggagttc | 600 | |
| caagtcgggc cgtccgttgg gatctctgcc ggcgacgaga tatgggtcgc ccgctacatt | 660 | |
| ctcgagagga tcactgagat ggccggaatc gttctctccc tcgacccgaa gccgatcaag | 720 | |
| ggtgactgga acggcgccgg cgctcacacc aactacagca ccaagtcgat gagggaggcc | 780 | |
| ggtggctacg aggtgatcaa ggaggcgatc aggaagctgg ggaagaggca cagggagcac | 840 | |
| atcgccgcgt acggcgaggg caacgagcgc cgcctcacgg gccgccacga gaccgccgac | 900 | |
| atcaacacct tcaaatgggg cgtggcgaac cgcggcgcgt ccatccgcgt cggccgcgac | 960 | |
| accgagaagg agggcaaggg atacttcgag gaccgcaggc cggcttccaa catggacccc | 1020 | |
| tacgtcgtca ccggcatgat cgccgacacc accatcctgt ggaagggaaa ctaa | 1074 | |

<210> SEQ ID NO 99
<211> LENGTH: 1074
<212> TYPE: DNA
<213> ORGANISM: Zea mays

<400> SEQUENCE: 99

| | | |
|---|---|---|
| atggccagcc tcactgacct cgtcaacctc gacctgagtg actgcacaga caggatcatc | 60 | |
| gccgagtaca tctgggttgg aggctccggc atagacctca ggagcaaagc aaggacggtg | 120 | |
| aaaggcccca tcaccgatcc gagccagctg ccaaaatgga actacgacgg ctccagcacc | 180 | |
| gggcaggctc ccggagagga cagcgaagtc atcctctacc ctcaagccat tttcaaggac | 240 | |
| ccgttcagga agggtaacaa catccttgtg atgtgtgact gctacgcc acaaggcgag | 300 | |
| ccaatcccca gtaacaagag gtacaaagct gccacggttt tcagccaccc cgatgttgca | 360 | |
| gctgaggtgc cgtggtacgg tattgagcag gagtacactc tccttcagaa ggatgtgagc | 420 | |

| | |
|---|---|
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca aggagcac | 840 |
| atcgccgcgt acggcgaggg caacgagcgc cgcctcacgg gccgccacga gaccgccgac | 900 |
| atcaacacct tcaaatgggg cgtggcgaac cgtggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 100
<211> LENGTH: 1074
<212> TYPE: DNA
<213> ORGANISM: Zea mays

<400> SEQUENCE: 100

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| aaaggcccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcagctgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 101
<211> LENGTH: 1074
<212> TYPE: DNA
<213> ORGANISM: Zea mays

<400> SEQUENCE: 101

| | |
|---|---|
| atggccagcc tcactgacct cgtcaacctc gacctgagtg actgcacaga caggatcatc | 60 |
| gccgagtaca tctgggttgg aggctccggc atagacctca ggagcaaagc aaggacggtg | 120 |
| aaaggcccca tcaccgatcc gagccagctg ccaaaatgga actacgacgg ctccagcacc | 180 |

| | | | | |
|---|---|---|---|---|
| gggcaggctc | ccggagagga | cagcgaagtc | atcctctacc ctcaagccat tttcaaggac | 240 |
| ccgttcagga | agggtaacaa | catccttgtg | atgtgtgact gctacacgcc acaaggcgag | 300 |
| ccaatcccca | gtaacaagag | gtacaaagct | gccacggttt tcagccaccc cgatgttgca | 360 |
| gctgaggtgc | cgtggtacgg | tattgagcag | gagtacactc tccttcagaa ggatgtgagc | 420 |
| tggccccttg | gctggcctgt | tggtggatac | cctggtcccc agggaccata ctactgtgct | 480 |
| gccggtgccg | ataaggcctt | tgggcgcgac | gtggttgacg cccactacaa agcctgcctc | 540 |
| tacgccggca | tcaacatcag | cggcatcaac | ggcgaagtca tgcctggaca gtgggagttc | 600 |
| caagtcgggc | cgtccgttgg | gatctctgcc | ggcgacgaga tatgggtcgc ccgctacatt | 660 |
| ctcgagagga | tcactgagat | ggccggaatc | gttctctccc tcgacccgaa gccgatcaag | 720 |
| ggtgactgga | acggcgccgg | cgctcacacc | aactacagca ccaagtcgat gagggaggcc | 780 |
| ggtggctacg | aggtgatcaa | ggaggcgatc | gagaagctgg ggaagaggca gggagcac | 840 |
| atcgccgcgt | acggcgaggg | caacgagcgc | cgcctcacgg gccgccacga gaccgccgac | 900 |
| atcaacacct | tcaaatgggg | cgtggcgaac | gcggcgcgt ccatccgcgt cgggccggcag | 960 |
| accgagaagg | agggcaaggg | atacttcgag | gaccgcaggc cggcttccaa catggacccc | 1020 |
| tacgtcgtca | ccggcatgat | cgccgacacc | accatcctgt ggaagggaaa ctaa | 1074 |

<210> SEQ ID NO 102
<211> LENGTH: 1074
<212> TYPE: DNA
<213> ORGANISM: Zea mays

<400> SEQUENCE: 102

| | | | | |
|---|---|---|---|---|
| atggccagcc | tcactgacct | cgtcaacctc | gacctgagtg actgcacaga caggatcatc | 60 |
| gccgagtaca | tctgggttgg | aggctccggc | atagacctca ggagcaaagc aaggacggtg | 120 |
| aaaggcccca | tcaccgatcc | gagccagctg | ccaaaatgga actacgacgg ctccagcacc | 180 |
| gggcaggctc | ccggagagga | cagcgaagtc | atcctctacc ctcaagccat tttcaaggac | 240 |
| ccgttcagga | agggtaacaa | catccttgtg | atgtgtgact gctacacgcc acaaggcgag | 300 |
| ccaatcccca | gtaacaagag | gtacaaagct | gccacggttt tcagccaccc cgatgttgca | 360 |
| gctgaggtgc | cgtggtacgg | tattgagcag | gagtacactc tccttcagaa ggatgtgagc | 420 |
| tggccccttg | gctggcctgt | tggtggatac | cctggtcccc agggaccata ctactgtgct | 480 |
| gccggtgccg | ataaggcctt | tgggcgcgac | gtggttgacg cccactacaa agcctgcctc | 540 |
| tacgccggca | tcaacatcag | cggcatcaac | ggcgaagtca tgcctggaca gtgggagttc | 600 |
| caagtcgggc | cgtccgttgg | gatctctgcc | ggcgacgaga tatgggtcgc ccgctacatt | 660 |
| ctcgagagga | tcactgagat | ggccggaatc | gttctctccc tcgacccgaa gccgatcaag | 720 |
| ggtgactgga | acggcgccgg | cgctcacacc | aactacagca ccaagtcgat gagggaggcc | 780 |
| ggtggctacg | aggtgatcaa | ggaggcgatc | gagaagctgg ggaagaggca gggagcac | 840 |
| atcgccgcgt | acggcgaggg | caacgagcgc | cgcctcacgg gccgccacga gaccgccgac | 900 |
| atcaacacct | tcaaatgggg | cgtggcgaac | gcggcgcgt ccatccgcgt cgggcgcgag | 960 |
| accgagaagg | agggcaaggg | atacttcgag | gaccgcaggc cggcttccaa catggacccc | 1020 |
| tacgtcgtca | ccggcatgat | cgccgacacc | accatcctgt ggaagggaaa ctaa | 1074 |

<210> SEQ ID NO 103
<211> LENGTH: 1074
<212> TYPE: DNA

<213> ORGANISM: Zea mays

<400> SEQUENCE: 103

```
atggccctcc tcactgacct cgtcaacctc gacctgagtg actgcacaga caggatcatc        60
gccgagtaca tctgggttgg aggctccggc atagacctca ggagcaaagc aaggacggtg       120
aaaggcccca tcaccgatcc gagccagctg ccaaaatgga actacgacgg ctccagcacc       180
gggcaggctc ccggagagga cagcgaagtc atcctctacc ctcaagccat tttcaaggac       240
ccgttcagga agggtaacaa catccttgtg atgtgtgact gctacgcc acaaggcgag         300
ccaatcccca gtaacaagag gtacaaagct gccacggttt tcagccaccc cgatgttgca       360
gctgaggtgc cgtggtacgg tattgagcag gagtacactc tccttcagaa ggatgtgagc       420
tggccccttg gctggcctgt tggtggatac cctggtcccc agggaccata ctactgtgct       480
gccggtgccg ataaggcctt tgggcgcgac gtggttgacg cccactacaa agcctgcctc       540
tacgccggca tcaacatcag cggcatcaac ggcgaagtca tgcctggaca gtgggagttc       600
caagtcgggc cgtccgttgg gatctctgcc ggcgacgaga tatgggtcgc ccgctacatt       660
ctcgagagga tcactgagat ggccggaatc gttctctccc tcgacccgaa gccgatcaag       720
ggtgactgga acggcgccgg cgctcacacc aactacagca ccaagtcgat gagggaggcc       780
ggtggctacg aggtgatcaa ggaggcgatc gagaagctgg ggaagaggca cagggagcac       840
atcgccgcgt acggcgaggg caacgagcgc cgcctcacgg gccgccacga gaccgccgac       900
atcaacacct tcaaatgggg cgtggcgaac cgcggcgcgt ccatccgcgt cggccgcgac       960
accgagaagg agggcaaggg atacttcgag gaccgcaggc cggcttccaa catgaccccc      1020
tacgtcgtca ccggcatgat cgccgacacc accatcctgt ggaagggaaa ctaa            1074
```

<210> SEQ ID NO 104
<211> LENGTH: 1074
<212> TYPE: DNA
<213> ORGANISM: Zea mays

<400> SEQUENCE: 104

```
atggccagcc tctctgacct cgtcaacctc gacctgagtg actgcacaga caggatcatc        60
gccgagtaca tctgggttgg aggctccggc atagacctca ggagcaaagc aaggacggtg       120
aaaggcccca tcaccgatcc gagccagctg ccaaaatgga actacgacgg ctccagcacc       180
gggcaggctc ccggagagga cagcgaagtc atcctctacc ctcaagccat tttcaaggac       240
ccgttcagga agggtaacaa catccttgtg atgtgtgact gctacgcc acaaggcgag         300
ccaatcccca gtaacaagag gtacaaagct gccacggttt tcagccaccc cgatgttgca       360
gctgaggtgc cgtggtacgg tattgagcag gagtacactc tccttcagaa ggatgtgagc       420
tggccccttg gctggcctgt tggtggatac cctggtcccc agggaccata ctactgtgct       480
gccggtgccg ataaggcctt tgggcgcgac gtggttgacg cccactacaa agcctgcctc       540
tacgccggca tcaacatcag cggcatcaac ggcgaagtca tgcctggaca gtgggagttc       600
caagtcgggc cgtccgttgg gatctctgcc ggcgacgaga tatgggtcgc ccgctacatt       660
ctcgagagga tcactgagat ggccggaatc gttctctccc tcgacccgaa gccgatcaag       720
ggtgactgga acggcgccgg cgctcacacc aactacagca ccaagtcgat gagggaggcc       780
ggtggctacg aggtgatcaa ggaggcgatc gagaagctgg ggaagaggca cagggagcac       840
atcgccgcgt acggcgaggg caacgagcgc cgcctcacgg gccgccacga gaccgccgac       900
atcaacacct tcaaatgggg cgtggcgaac cgcggcgcgt ccatccgcgt cggccgcgac       960
```

```
accgagaagg agggcaaggg atacttcgag gaccgcaggc cggcttccaa catggacccc    1020
tacgtcgtca ccggcatgat cgccgacacc accatcctgt ggaagggaaa ctaa          1074
```

<210> SEQ ID NO 105
<211> LENGTH: 1074
<212> TYPE: DNA
<213> ORGANISM: Zea mays

<400> SEQUENCE: 105

```
atggccagcc tcactgacct catcaacctc gacctgagtg actgcacaga caggatcatc     60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacacgcc acaaggcgag    300
ccaatcccca gtaacaagag gtacaaagct gccacggttt tcagccaccc cgatgttgca    360
gctgaggtgc cgtggtacgg tattgagcag gagtacactc tccttcagaa ggatgtgagc    420
tggccccttg gctggcctgt tggtggatac cctggtcccc aggaccata ctactgtgct     480 gccggtgccg ataaggcctt tgggcgcgac gtggttgacg cccactacaa agcctgcctc    540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctcgagagga tcactgagat ggccggaatc gttctctccc tcgacccgaa gccgatcaag    720
ggtgactgga acggcgccgg cgctcacacc aactacagca ccaagtcgat gagggaggcc    780
ggtggctacg aggtgatcaa ggaggcgatc gagaagctgg ggaagaggca cagggagcac    840
atcgccgcgt acgcgagggg caacgagcgc cgcctcacgg gccgccacga gaccgccgac    900
atcaacacct tcaaatgggg cgtggcgaac cgcggcgcgt ccatccgcgt cggccgcgac    960
accgagaagg agggcaaggg atacttcgag gaccgcaggc cggcttccaa catggacccc   1020
tacgtcgtca ccggcatgat cgccgacacc accatcctgt ggaagggaaa ctaa         1074
```

<210> SEQ ID NO 106
<211> LENGTH: 1074
<212> TYPE: DNA
<213> ORGANISM: Zea mays

<400> SEQUENCE: 106

```
atggccagcc tcactgacct cgtcaacctc aacctgagtg actgcacaga caggatcatc     60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacacgcc acaaggcgag    300
ccaatcccca gtaacaagag gtacaaagct gccacggttt tcagccaccc cgatgttgca    360
gctgaggtgc cgtggtacgg tattgagcag gagtacactc tccttcagaa ggatgtgagc    420
tggccccttg gctggcctgt tggtggatac cctggtcccc aggaccata ctactgtgct     480 gccggtgccg ataaggcctt tgggcgcgac gtggttgacg cccactacaa agcctgcctc    540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
```

| | | |
|---|---|---|
| ctcgagagga tcactgagat ggccggaatc gttctctccc tcgacccgaa gccgatcaag | 720 | |
| ggtgactgga acggcgccgg cgctcacacc aactacagca ccaagtcgat gagggaggcc | 780 | |
| ggtggctacg aggtgatcaa ggaggcgatc gagaagctgg ggaagaggca cagggagcac | 840 | |
| atcgccgcgt acggcgaggg caacgagcgc cgcctcacgg ccgccacga gaccgccgac | 900 | |
| atcaacacct tcaaatgggg cgtggcgaac cgcggcgcgt ccatccgcgt cggccgcgac | 960 | |
| accgagaagg agggcaaggg atacttcgag gaccgcaggc cggcttccaa catggacccc | 1020 | |
| tacgtcgtca ccggcatgat cgccgacacc accatcctgt ggaagggaaa ctaa | 1074 | |

<210> SEQ ID NO 107
<211> LENGTH: 1074
<212> TYPE: DNA
<213> ORGANISM: Zea mays

<400> SEQUENCE: 107

| | | |
|---|---|---|
| atggccagcc tcactgacct cgtcaacctc gacctgagtg acaacacaga caggatcatc | 60 | |
| gccgagtaca tctgggttgg aggctccggc atagacctca ggagcaaagc aaggacggtg | 120 | |
| aaaggcccca tcaccgatcc gagccagctg ccaaaatgga actacgacgg ctccagcacc | 180 | |
| gggcaggctc ccggagagga cagcgaagtc atcctctacc ctcaagccat tttcaaggac | 240 | |
| ccgttcagga agggtaacaa catccttgtg atgtgtgact gctacacgcc acaaggcgag | 300 | |
| ccaatcccca gtaacaagag gtacaaagct gccacggttt tcagccaccc cgatgttgca | 360 | |
| gctgaggtgc cgtggtacgg tattgagcag gagtacactc tccttcagaa ggatgtgagc | 420 | |
| tggccccttg gctggcctgt tggtggatac cctggtcccc agggaccata ctactgtgct | 480 | |
| gccggtgccg ataaggcctt tgggcgcgac gtggttgacg cccactacaa agcctgcctc | 540 | |
| tacgccggca tcaacatcag cggcatcaac ggcgaagtca tgcctggaca gtgggagttc | 600 | |
| caagtcgggc cgtccgttgg gatctctgcc ggcgacgaga tatgggtcgc ccgctacatt | 660 | |
| ctcgagagga tcactgagat ggccggaatc gttctctccc tcgacccgaa gccgatcaag | 720 | |
| ggtgactgga acggcgccgg cgctcacacc aactacagca ccaagtcgat gagggaggcc | 780 | |
| ggtggctacg aggtgatcaa ggaggcgatc gagaagctgg ggaagaggca cagggagcac | 840 | |
| atcgccgcgt acggcgaggg caacgagcgc cgcctcacgg ccgccacga gaccgccgac | 900 | |
| atcaacacct tcaaatgggg cgtggcgaac cgcggcgcgt ccatccgcgt cggccgcgac | 960 | |
| accgagaagg agggcaaggg atacttcgag gaccgcaggc cggcttccaa catggacccc | 1020 | |
| tacgtcgtca ccggcatgat cgccgacacc accatcctgt ggaagggaaa ctaa | 1074 | |

<210> SEQ ID NO 108
<211> LENGTH: 1074
<212> TYPE: DNA
<213> ORGANISM: Zea mays

<400> SEQUENCE: 108

| | | |
|---|---|---|
| atggccagcc tcactgacct cgtcaacctc gacctgagtg acaccacaga caggatcatc | 60 | |
| gccgagtaca tctgggttgg aggctccggc atagacctca ggagcaaagc aaggacggtg | 120 | |
| aaaggcccca tcaccgatcc gagccagctg ccaaaatgga actacgacgg ctccagcacc | 180 | |
| gggcaggctc ccggagagga cagcgaagtc atcctctacc ctcaagccat tttcaaggac | 240 | |
| ccgttcagga agggtaacaa catccttgtg atgtgtgact gctacacgcc acaaggcgag | 300 | |
| ccaatcccca gtaacaagag gtacaaagct gccacggttt tcagccaccc cgatgttgca | 360 | |
| gctgaggtgc cgtggtacgg tattgagcag gagtacactc tccttcagaa ggatgtgagc | 420 | |

| | |
|---|---|
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca gggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 109
<211> LENGTH: 1074
<212> TYPE: DNA
<213> ORGANISM: Zea mays

<400> SEQUENCE: 109

| | |
|---|---|
| atggccagcc tcactgacct cgtcaacctc gacctgagtg accgcacaga caggatcatc | 60 |
| gccgagtaca tctgggttgg aggctccggc atagacctca ggagcaaagc aaggacggtg | 120 |
| aaaggcccca tcaccgatcc gagccagctg ccaaaatgga actacgacgg ctccagcacc | 180 |
| gggcaggctc ccgagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca gggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 110
<211> LENGTH: 1074
<212> TYPE: DNA
<213> ORGANISM: Zea mays

<400> SEQUENCE: 110

| | |
|---|---|
| atggccagcc tcactgacct cgtcaacctc gacctgagtg actgcacaga caagatcatc | 60 |
| gccgagtaca tctgggttgg aggctccggc atagacctca ggagcaaagc aaggacggtg | 120 |

| | |
|---|---|
| aaaggcccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 111
<211> LENGTH: 1074
<212> TYPE: DNA
<213> ORGANISM: Zea mays

<400> SEQUENCE: 111

| | |
|---|---|
| atggccagcc tcactgacct cgtcaacctc gacctgagtg actgcacaga caggatcatc | 60 |
| gccgagtaca tctgggttgg aggctccggc atagacgtca ggagcaaagc aaggacggtg | 120 |
| aaaggcccca tcaccgatcc gagccagctg ccaaaatgga actacgacgg ctccagcacc | 180 |
| gggcaggctc ccggagagga cagcgaagtc atcctctacc ctcaagccat tttcaaggac | 240 |
| ccgttcagga agggtaacaa catccttgtg atgtgtgact gctacacgcc acaaggcgag | 300 |
| ccaatcccca gtaacaagag gtacaaagct gccacggttt tcagccaccc cgatgttgca | 360 |
| gctgaggtgc cgtggtacgg tattgagcag gagtacactc tccttcagaa ggatgtgagc | 420 |
| tggccccttg gctggcctgt tggtggatac cctggtcccc agggaccata ctactgtgct | 480 |
| gccggtgccg ataaggcctt tgggcgcgac gtggttgacg cccactacaa agcctgcctc | 540 |
| tacgccggca tcaacatcag cggcatcaac ggcgaagtca tgcctggaca gtgggagttc | 600 |
| caagtcgggc cgtccgttgg gatctctgcc ggcgacgaga tatgggtcgc ccgctacatt | 660 |
| ctcgagagga tcactgagat ggccggaatc gttctctccc tcgacccgaa gccgatcaag | 720 |
| ggtgactgga acggcgccgg cgctcacacc aactacagca ccaagtcgat gagggaggcc | 780 |
| ggtggctacg aggtgatcaa ggaggcgatc gagaagctgg ggaagaggca cagggagcac | 840 |
| atcgccgcgt acggcgaggg caacgagcgc cgcctcacgg gccgccacga gaccgccgac | 900 |
| atcaacacct tcaaatgggg cgtggcgaac cgcggcgcgt ccatccgcgt cggccgcgac | 960 |
| accgagaagg agggcaaggg atacttcgag gaccgcaggc cggcttccaa catggacccc | 1020 |
| tacgtcgtca ccggcatgat cgccgacacc accatcctgt ggaagggaaa ctaa | 1074 |

<210> SEQ ID NO 112
<211> LENGTH: 1074

<212> TYPE: DNA
<213> ORGANISM: Zea mays

<400> SEQUENCE: 112

```
atggccagcc tcactgacct cgtcaacctc gacctgagtg actgcacaga caggatcatc    60
gccgagtaca tctgggttgg aggctccggc atagacctca ggagcaaagc aaggacggtg   120
ccaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacacgcc acaaggcgag   300
ccaatcccca gtaacaagag gtacaaagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc aggaccata ctactgtgct   480
gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa ggaggcgatc gagaagctgg ggaagaggca cagggagcac   840
atcgccgcgt acggcgaggg caacgagcgc cgcctcacgg ccgccacga gaccgccgac   900
atcaacacct tcaaatgggg cgtggcgaac cgcggcgcgt ccatccgcgt cggccgcgac   960
accgagaagg agggcaaggg atacttcgag gaccgcaggc cggcttccaa catggacccc  1020
tacgtcgtca ccggcatgat cgccgacacc accatcctgt ggaagggaaa ctaa         1074
```

<210> SEQ ID NO 113
<211> LENGTH: 1074
<212> TYPE: DNA
<213> ORGANISM: Zea mays

<400> SEQUENCE: 113

```
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga ggggtaacaa catccttgtg atgtgtgact gctacacgcc acaaggcgag   300
ccaatcccca gtaacaagag gtacaaagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc aggaccata ctactgtgct   480
gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa ggaggcgatc gagaagctgg ggaagaggca cagggagcac   840
atcgccgcgt acggcgaggg caacgagcgc cgcctcacgg ccgccacga gaccgccgac   900
```

```
atcaacacct tcaaatgggg cgtggcgaac cgcggcgcgt ccatccgcgt cggccgcgac   960
accgagaagg agggcaaggg atacttcgag gaccgcaggc cggcttccaa catggacccc  1020
tacgtcgtca ccggcatgat cgccgacacc accatcctgt ggaagggaaa ctaa        1074

<210> SEQ ID NO 114
<211> LENGTH: 1074
<212> TYPE: DNA
<213> ORGANISM: Zea mays

<400> SEQUENCE: 114
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacgcc acaaggcgag    300 ccaatcccca gtaacaagag gcacaaagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc aggaccata ctactgtgct    480 gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa ggaggcgatc gagaagctgg ggaagaggca cagggagcac   840
atcgccgcgt acggcgaggg caacgagcgc cgcctcacgg gccgccacga gaccgccgac   900
atcaacacct tcaaatgggg cgtggcgaac cgcggcgcgt ccatccgcgt cggccgcgac   960
accgagaagg agggcaaggg atacttcgag gaccgcaggc cggcttccaa catggacccc  1020
tacgtcgtca ccggcatgat cgccgacacc accatcctgt ggaagggaaa ctaa        1074

<210> SEQ ID NO 115
<211> LENGTH: 1074
<212> TYPE: DNA
<213> ORGANISM: Zea mays

<400> SEQUENCE: 115
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacgcc acaaggcgag    300 ccaatcccca gtaacaagag gtactcagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc aggaccata ctactgtgct    480 gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
```

```
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgcacga gaccgccgac       900 atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 116
<211> LENGTH: 1074
<212> TYPE: DNA
<213> ORGANISM: Zea mays

<400> SEQUENCE: 116

```
atggccagcc tcactgacct cgtcaacctc gacctgagtg actgcacaga caggatcatc       60
gccgagtaca tctgggttgg aggctccggc atagacctca ggagcaaagc aaggacggtg      120
aaaggcccca tcaccgatcc gagccagctg ccaaaatgga actacgacgg ctccagcacc      180
gggcaggctc ccggagagga cagcgaagtc atcctctacc ctcaagccat tttcaaggac      240
ccgttcagga agggtaacaa catccttgtg atgtgtgact gctacgcc acaaggcgag        300 ccaatcccca gtaacaagag gtacggagct gccacggttt tcagccaccc cgatgttgca      360
gctgaggtgc cgtggtacgg tattgagcag gagtacactc tccttcagaa ggatgtgagc      420 tggcccttg gctggcctgt tggtggatac cctggtcccc aggaccata ctactgtgct        480 gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

<210> SEQ ID NO 117
<211> LENGTH: 1074
<212> TYPE: DNA
<213> ORGANISM: Zea mays

<400> SEQUENCE: 117

```
atggccagcc tcactgacct cgtcaacctc gacctgagtg actgcacaga caggatcatc       60
gccgagtaca tctgggttgg aggctccggc atagacctca ggagcaaagc aaggacggtg      120
aaaggcccca tcaccgatcc gagccagctg ccaaaatgga actacgacgg ctccagcacc      180
gggcaggctc ccggagagga cagcgaagtc atcctctacc ctcaagccat tttcaaggac      240
ccgttcagga agggtaacaa catccttgtg atgtgtgact gctacgcc acaaggcgag        300 ccaatcccca gtaacaagag gtacaaagct gccacgattt tcagccaccc cgatgttgca      360
```

```
gctgaggtgc cgtggtacgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa          1074

<210> SEQ ID NO 118
<211> LENGTH: 1074
<212> TYPE: DNA
<213> ORGANISM: Zea mays

<400> SEQUENCE: 118
atggccagcc tcactgacct cgtcaacctc gacctgagtg actgcacaga caggatcatc       60
gccgagtaca tctgggttgg aggctccggc atagacctca ggagcaaagc aaggacggtg      120
aaaggcccca tcaccgatcc gagccagctg ccaaaatgga actacgacgg ctccagcacc      180
gggcaggctc ccggagagga cagcgaagtc atcctctacc ctcaagccat tttcaaggac      240
ccgttcagga agggtaacaa catccttgtg atgtgtgact gctacgcc acaaggcgag       300 ccaatcccca gtaacaagag gtacaaagct gccacggttt tcagccaccc cgatgttgca      360
gctgaggtgc cgtggtacgg tattgagcag gagtacactc tccttcagaa ggatgtgagc      420
tggccccttg gctggcctgt tggtggatac cctggtcccc agggaccata ctactgtgct      480
atcggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa          1074

<210> SEQ ID NO 119
<211> LENGTH: 1074
<212> TYPE: DNA
<213> ORGANISM: Zea mays

<400> SEQUENCE: 119
atggccagcc tcactgacct cgtcaacctc gacctgagtg actgcacaga caggatcatc       60
gccgagtaca tctgggttgg aggctccggc atagacctca ggagcaaagc aaggacggtg      120
```

```
aaaggcccca tcaccgatcc gagccagctg ccaaaatgga actacgacgg ctccagcacc      180
gggcaggctc ccggagagga cagcgaagtc atcctctacc ctcaagccat tttcaaggac      240
ccgttcagga agggtaacaa catccttgtg atgtgtgact gctacacgcc acaaggcgag      300
ccaatcccca gtaacaagag gtacaaagct gccacggttt tcagccaccc cgatgttgca      360
gctgaggtgc cgtggtacgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

```
<210> SEQ ID NO 120
<211> LENGTH: 1074
<212> TYPE: DNA
<213> ORGANISM: Zea mays

<400> SEQUENCE: 120
```

```
atggccagcc tcactgacct cgtcaacctc gacctgagtg actgcacaga caggatcatc       60
gccgagtaca tctgggttgg aggctccggc atagacctca ggagcaaagc aaggacggtg      120
aaaggcccca tcaccgatcc gagccagctg ccaaaatgga actacgacgg ctccagcacc      180
gggcaggctc ccggagagga cagcgaagtc atcctctacc ctcaagccat tttcaaggac      240
ccgttcagga agggtaacaa catccttgtg atgtgtgact gctacacgcc acaaggcgag      300
ccaatcccca gtaacaagag gtacaaagct gccacggttt tcagccaccc cgatgttgca      360
gctgaggtgc cgtggtacgg tattgagcag gagtacactc tccttcagaa ggatgtgagc      420
tggccccttg gctggcctgt tggtggatac cctggtcccc agggaccata ctactgtgct      480
gccggtgccg ataaggcctt tgggcgcgac gtggttgacg cccactacaa agcctgcctc      540
tacgccggca tcaacatcag cggcatcaac ggcgaagtca tgcctggaca gtgggagttc      600
caagtcgggc cgtccgttgg gatctctgcc ggcgacgaga tatgggtcgc ccgctacatt      660
ctcgagagga tcactgagat ggccggagtc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074
```

```
<210> SEQ ID NO 121
```

<211> LENGTH: 1074
<212> TYPE: DNA
<213> ORGANISM: Zea mays

<400> SEQUENCE: 121

```
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacgcc acaaggcgag     300
ccaatcccca gtaacaagag gtacaaagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc agggaccata ctactgtgct   480
gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa gaaggcgatc gagaagctgg ggaagaggca cagggagcac   840
atcgccgcgt acggcgaggg caacgagcgc cgcctcacgg gccgccacga gaccgccgac   900
atcaacacct tcaaatgggg cgtggcgaac cgcggcgcgt ccatccgcgt cggccgcgac   960
accgagaagg agggcaaggg atacttcgag gaccgcaggc cggcttccaa catggacccc  1020
tacgtcgtca ccggcatgat cgccgacacc accatcctgt ggaagggaaa ctaa        1074
```

<210> SEQ ID NO 122
<211> LENGTH: 1074
<212> TYPE: DNA
<213> ORGANISM: Zea mays

<400> SEQUENCE: 122

```
atggccagcc tcactgacct cgtcaacctc gacctgagtg actgcacaga caggatcatc    60
gccgagtaca tctgggttgg aggctccggc atagacctca ggagcaaagc aaggacggtg   120
aaaggcccca tcaccgatcc gagccagctg ccaaaatgga actacgacgg ctccagcacc   180
gggcaggctc ccggagagga cagcgaagtc atcctctacc ctcaagccat tttcaaggac   240
ccgttcagga agggtaacaa catccttgtg atgtgtgact gctacgcc acaaggcgag     300
ccaatcccca gtaacaagag gtacaaagct gccacggttt tcagccaccc cgatgttgca   360
gctgaggtgc cgtggtacgg tattgagcag gagtacactc tccttcagaa ggatgtgagc   420
tggccccttg gctggcctgt tggtggatac cctggtcccc agggaccata ctactgtgct   480
gccggtgccg ataaggcctt tgggcgcgac gtggttgacg cccactacaa agcctgcctc   540
tacgccggca tcaacatcag cggcatcaac ggcgaagtca tgcctggaca gtgggagttc   600
caagtcgggc cgtccgttgg gatctctgcc ggcgacgaga tatgggtcgc ccgctacatt   660
ctcgagagga tcactgagat ggccggaatc gttctctccc tcgacccgaa gccgatcaag   720
ggtgactgga acggcgccgg cgctcacacc aactacagca ccaagtcgat gagggaggcc   780
ggtggctacg aggtgatcaa ggaggcgatc gggaagctgg ggaagaggca cagggagcac   840
atcgccgcgt acggcgaggg caacgagcgc cgcctcacgg gccgccacga gaccgccgac   900
```

```
atcaacacct tcaaatgggg cgtggcgaac cgcggcgcgt ccatccgcgt cggccgcgac    960
accgagaagg agggcaaggg atacttcgag gaccgcaggc cggcttccaa catggacccc   1020
tacgtcgtca ccggcatgat cgccgacacc accatcctgt ggaagggaaa ctaa         1074
```

<210> SEQ ID NO 123
<211> LENGTH: 1074
<212> TYPE: DNA
<213> ORGANISM: Zea mays

<400> SEQUENCE: 123

```
atggccagcc tcactgacct cgtcaacctc gacctgagtg actgcacaga caggatcatc     60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacacgcc acaaggcgag    300
ccaatcccca gtaacaagag gtacaaagct gccacggttt tcagccaccc cgatgttgca    360
gctgaggtgc cgtggtacgg tattgagcag gagtacactc tccttcagaa ggatgtgagc    420
tggccccttg gctggcctgt tggtggatac cctggtcccc agggaccata ctactgtgct    480
gccggtgccg ataaggcctt tgggcgcgac gtggttgacg cccactacaa agcctgcctc    540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctcgagagga tcactgagat ggccggaatc gttctctccc tcgacccgaa gccgatcaag    720
ggtgactgga acggcgccgg cgctcacacc aactacagca ccaagtcgat gagggaggcc    780
ggtggctacg aggtgatcaa ggaggcgatc gacaagctgg ggaagaggca cagggagcac    840
atcgccgcgt acggcgaggg caacgagcgc cgcctcacgg gccgccacga gaccgccgac    900
atcaacacct tcaaatgggg cgtggcgaac cgcggcgcgt ccatccgcgt cggccgcgac    960
accgagaagg agggcaaggg atacttcgag gaccgcaggc cggcttccaa catggacccc   1020
tacgtcgtca ccggcatgat cgccgacacc accatcctgt ggaagggaaa ctaa         1074
```

<210> SEQ ID NO 124
<211> LENGTH: 1074
<212> TYPE: DNA
<213> ORGANISM: Zea mays

<400> SEQUENCE: 124

```
atggccagcc tcactgacct cgtcaacctc gacctgagtg actgcacaga caggatcatc     60
gccgagtaca tctgggttgg aggctccggc atagacctca ggagcaaagc aaggacggtg    120
aaaggcccca tcaccgatcc gagccagctg ccaaaatgga actacgacgg ctccagcacc    180
gggcaggctc ccggagagga cagcgaagtc atcctctacc ctcaagccat tttcaaggac    240
ccgttcagga agggtaacaa catccttgtg atgtgtgact gctacacgcc acaaggcgag    300
ccaatcccca gtaacaagag gtacaaagct gccacggttt tcagccaccc cgatgttgca    360
gctgaggtgc cgtggtacgg tattgagcag gagtacactc tccttcagaa ggatgtgagc    420
tggccccttg gctggcctgt tggtggatac cctggtcccc agggaccata ctactgtgct    480
gccggtgccg ataaggcctt tgggcgcgac gtggttgacg cccactacaa agcctgcctc    540
tacgccggca tcaacatcag cggcatcaac ggcgaagtca tgcctggaca gtgggagttc    600
```

```
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgacgg caacgagcgc cgcctcacgg gccgccacga gaccgccgac      900
atcaacacct tcaaatgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074

<210> SEQ ID NO 125
<211> LENGTH: 1074
<212> TYPE: DNA
<213> ORGANISM: Zea mays

<400> SEQUENCE: 125
atggccagcc tcactgacct cgtcaacctc gacctgagtg actgcacaga caggatcatc      60
gccgagtaca tctgggttgg aggctccggc atagacctca ggagcaaagc aaggacggtg     120
aaaggcccca tcaccgatcc gagccagctg ccaaaatgga actacgacgg ctccagcacc     180
gggcaggctc ccggagagga cagcgaagtc atcctctacc ctcaagccat tttcaaggac     240
ccgttcagga agggtaacaa catccttgtg atgtgtgact gctacgcc acaaggcgag      300 ccaatcccca gtaacaagag gtacaaagct gccacggttt tcagccaccc cgatgttgca     360
gctgaggtgc cgtggtacgg tattgagcag gagtacactc tccttcagaa ggatgtgagc     420
tggccccttg gctggcctgt tggtggatac cctggtcccc agggaccata ctactgtgct     480
gccggtgccg ataaggcctt tgggcgcgac gtggttgacg cccactacaa agcctgcctc     540
tacgccggca tcaacatcag cggcatcaac ggcgaagtca tgcctggaca gtgggagttc     600
caagtcgggc cgtccgttgg gatctctgcc ggcgacgaga tatgggtcgc ccgctacatt      660
ctcgagagga tcactgagat ggccggaatc gttctctccc tcgacccgaa gccgatcaag      720
ggtgactgga acggcgccgg cgctcacacc aactacagca ccaagtcgat gagggaggcc      780
ggtggctacg aggtgatcaa ggaggcgatc gagaagctgg ggaagaggca cagggagcac      840
atcgccgcgt acggcgaggg caacgagcgc cgcctcacgg gccgccacga gaccgccgac      900
atcaacacct tcgtgtgggg cgtggcgaac cgcggcgcgt ccatccgcgt cggccgcgac      960
accgagaagg agggcaaggg atacttcgag gaccgcaggc cggcttccaa catggacccc     1020
tacgtcgtca ccggcatgat cgccgacacc accatcctgt ggaagggaaa ctaa           1074

<210> SEQ ID NO 126
<211> LENGTH: 1074
<212> TYPE: DNA
<213> ORGANISM: Zea mays

<400> SEQUENCE: 126
atggccagcc tcactgacct cgtcaacctc gacctgagtg actgcacaga caggatcatc      60
gccgagtaca tctgggttgg aggctccggc atagacctca ggagcaaagc aaggacggtg     120
aaaggcccca tcaccgatcc gagccagctg ccaaaatgga actacgacgg ctccagcacc     180
gggcaggctc ccggagagga cagcgaagtc atcctctacc ctcaagccat tttcaaggac     240
ccgttcagga agggtaacaa catccttgtg atgtgtgact gctacgcc acaaggcgag      300 ccaatcccca gtaacaagag gtacaaagct gccacggttt tcagccaccc cgatgttgca     360
```

```
gctgaggtgc cgtggtacgg tattgagcag gagtacactc tccttcagaa ggatgtgagc    420
tggccccttg gctggcctgt tggtggatac cctggtcccc agggaccata ctactgtggt    480
gtcggtgccg ataaggcctt tgggcgcgac gtggttgacg cccactacaa agcctgcctc    540
tacgccggca tcaacatcag cggcatcaac ggcgaagtca tgcctggaca gtgggagttc    600
caagtcgggc cgtccgttgg gatctctgcc ggcgacgaga tatgggtcgc ccgctacatt    660
ctcgagagga tcactgagat ggccggaatc gttctctccc tcgacccgaa gccgatcaag    720
ggtgactgga acggcgccgg cgctcacacc aactacagca ccaagtcgat gagggaggcc    780
ggtggctacg aggtgatcaa ggaggcgatc gagaagctgg ggaagaggca cagggagcac    840
atcgccgcgt acggcgaggg caacgagcgc cgcctcacgg gccgccacga gaccgccgac    900
atcaacacct tcaaatgggg cgtggcgaac cgcggcgcgt ccatccgcgt cggccgcgac    960
accgagaagg agggcaaggg atacttcgag gaccgcaggc cggcttccaa catggacccc   1020
tacgtcgtca ccggcatgat cgccgacacc accatcctgt ggaagggaaa ctaa         1074

<210> SEQ ID NO 127
<211> LENGTH: 1074
<212> TYPE: DNA
<213> ORGANISM: Zea mays

<400> SEQUENCE: 127
atggccagcc tcaccgacct cgtcaacctc gacctgagtg actgcaccga caggatcatc     60
gccgagtaca tctggattgg aggaaccggc atagacctca ggagcaaagc gaggacggtg    120
aaaggcccca tcaccgaccc gagccagctg ccgaaatgga actacgacgg ctccagcacc    180
gggcaagctc ccggagagga cagcgaagtc atcctctacc tcaagccat tttcaaggac    240 ccgttcagga agggaaacca catccttgtg atgtgtgact gctacacgcc acaaggcgag    300
ccaatcccca ccaacaagag gtacagcgcc gccaaggttt tcagccaccc cgacgtcgca    360
gctgaggtgc cgtggtacgg tattgagcag gagtacaccc tccttcagaa ggacgtgagc    420
tggcccctcg gctggcctgt tggtggatac cctggtcccc agggaccata ctactgcgcc    480
gccggtgccg acaaggcctt tgggcgcgac gtggttgacg cccactacaa ggcctgcctc    540
tacgccggca tcaacatcag cggcatcaac ggcgaagtca tgcctggaca gtgggagttc    600
caagtggggc cgtccgttgg gatctctgcc ggcgacgaga tatgggtcgc ccgctacatt    660
ctcgagagga tcaccgagat ggccggaatc gtcctctccc tcgacccgaa gccgatcaag    720
ggcgactgga acggcgccgg cgcccacacc aactacagca ccaagtcgat gagggaggcc    780
gggggatacg aggtgatcaa ggcggcgatc gacaagctgg ggaagaggca aggagcac    840 atcgccgcgt acggcgaggg caacgagcgc cgcctcacgg gccgccacga aaccgccgac    900
atcaacacct tcaaatgggg cgtggcgaac cgcggcgcat ccatccgcgt cggccgcgac    960
accgagaggg agggcaaggg ctacttcgag gaccgcaggc cggcgtccaa catggacccc   1020
tacgtcgtca ccggcatgat cgccgagacg accatcctgt ggaatggaaa ctaa         1074

<210> SEQ ID NO 128
<211> LENGTH: 1107
<212> TYPE: DNA
<213> ORGANISM: Zea mays

<400> SEQUENCE: 128
atggctctgc tctccgacct catcaacctc gacctctcgg gccgcaccgg gaagatcatc     60
```

| | |
|---|---|
| gccgagtaca tctgggttgg cggttccggg atggacgtca ggagcaaagc caggacgctg | 120 |
| tccggacctg ttgatgaccc cagcaagctc ccgaagtgga acttcgacgg ctccagcacc | 180 |
| ggccaagctc cgggcgacga cagcgaagtc atcctttgcc ctcgggccat cttcagggac | 240 |
| ccgttcagga aggggcagaa catactggtc atgtgcgact gctacgagcc gaacggggag | 300 |
| ccgatcccga gcaacaagcg gcatggggcc gcgaagatct ttagccaccc tgacgtcaag | 360 |
| gctgaggaac cttggttcgg gattgagcag gagtacaccc ttctccagaa ggacaccaag | 420 |
| tggcctctcg gttggccgct ggcgtaccct ggccctcagg gaccttacta ctgcgccgcc | 480 |
| ggagcggaca gtcctacgg gcgggacatc gtggactgcg catacaaggc ctgcctctac | 540 |
| gccggcatcg acatcagtgg catcaacggg gaggtcatgc cggggcagtg ggagttccag | 600 |
| gtggcccctg ccgtcggcgt ctcggccggc gaccagctct gggtggctcg ctacattctt | 660 |
| gagaggatca ccgagatcgc cggcgtggtt gtctccttcg accccaagcc aattccgggg | 720 |
| gactggaatg cgctggtgc acacaccaac tacagcacca gtcgatgag agcgacggc | 780 |
| gggtacgagg tgatcaagaa ggcgatcggc aagctgggcc tccggcaccg ggagcacatc | 840 |
| gccgcgtacg gggacggcaa cgagcgcccg ctcaccggcc gccacgaaac cgccgacatc | 900 |
| aacaccttcg tctggggcgt gccgaaccgc ggggcgtcgg tgcgggtggg ccgagacacc | 960 |
| gagaaggaag gcaaaggcta cttcgaggac cggaggccgg cgtccaacat ggacccgtac | 1020 |
| gtcgtgacct gcctgatcgc ggagacaacc atgctgtggg agcccagcca ctccaacggc | 1080 |
| gacggcaagg gcgccgcggc tccttaa | 1107 |

<210> SEQ ID NO 129
<211> LENGTH: 1071
<212> TYPE: DNA
<213> ORGANISM: Zea mays

<400> SEQUENCE: 129

| | |
|---|---|
| atggcctgcc tcaccgacct cgtcaacctc aacctctcgg acaccaccga gaagatcatc | 60 |
| gcggaataca tatggatcgg tggatctggc atggatctca ggagcaaagc aaggaccctc | 120 |
| tccggcccag tgaccgatcc cagcaagctg cccaagtgga actacgacgg ctccagcacg | 180 |
| ggccaggccc ccggcgagga cagcgaggtc atcctgtacc cgcaggccat cttcaaggac | 240 |
| ccattcagga ggggcaacaa catccttgtg atgtgcgatt gctacacccc agccggcgag | 300 |
| ccaatcccca ccaacaagag gtacaacgcc gccaagatct tcagcagccc tgaggtcgcc | 360 |
| gccgaggagc cgtggtatgg tattgagcag gagtacaccc tcctccagaa ggacaccaac | 420 |
| tggcccccttg ggtggcccat cggtggcttc cccggccctc agggtcctta ctactgtgga | 480 |
| atcggcgccg aaaagtcgtt cggccgcgac atcgtgacg cccactacaa ggcctgcttg | 540 |
| tatgcgggca tcaacatcag tggcatcaac ggggaggtga tgccagggca gtgggagttc | 600 |
| caagtcgggc cttccgtggg tatttcttca ggcgaccagg tctgggtcgc tgctacatt | 660 |
| cttgagagga tcacggagat cgccggtgtg gtggtgacgt tcgacccgaa gccgatcccg | 720 |
| ggcgactgga acggcgccgg cgcgcacacc aactacagca cggagtcgat gaggaaggag | 780 |
| ggcgggtacg aggtgatcaa ggcggccatc gagaagctga gctgcggca gggagcac | 840 |
| atcgcggcct acgcgagggg caacgacggc cggctcaccg gcaggcacga aaccgccgac | 900 |
| atcaacacgt tcagctgggg cgtggccaac cgcggcgcgt cggtgcgcgt gggccgggag | 960 |
| acggagcaga acggcaaggg ctacttcgag gaccgccgcc cggcgtccaa catggacccc | 1020 |
| tacgtcgtca cctccatgat cgccgaaacc accatcatct ggaagcccta a | 1071 |

<210> SEQ ID NO 130
<211> LENGTH: 1071
<212> TYPE: DNA
<213> ORGANISM: Zea mays

<400> SEQUENCE: 130

| | | | | | |
|---|---|---|---|---|---|
| atggcctgcc | tcaccgacct | cgtcaacctc | aacctctcgg | acaccacaga | gaagatcatc | 60 |
| gccgagtaca | tatggatcgg | tggatctggc | atggatctca | ggagcaaagc | caggaccctc | 120 |
| ccgggcccag | tgaccgatcc | cagcaagctg | cccaagtgga | actacgacgg | ctccagcacc | 180 |
| ggccaggccc | ccggcgagga | cagcgaggtc | atcctgtacc | cgcaggccat | cttcaaggac | 240 |
| ccattcagga | ggggcaacaa | catccttgtc | atgtgcgatt | gctacacccc | agctggcgag | 300 |
| ccaattccca | ccaacaagag | gtacagcgcc | gccaagatct | tcagcagcct | tgaggtcgct | 360 |
| gccgaggagc | cctggtatgg | tatcgagcag | gagtacaccc | tccttcagaa | ggacaccaac | 420 |
| tggcccctcg | ggtggcctat | tggcggcttc | cctggcccct | caggtcctta | ctactgtgga | 480 |
| atcggcgcgg | agaaatcgtt | cgggcgtgac | atagtcgacg | cccactacaa | ggcctgcctg | 540 |
| tacgcaggca | tcaacatcag | tggcatcaac | ggggaggtca | tgccggggca | gtgggagttc | 600 |
| caagtgggac | cgtccgtcgg | catctcttcg | ggcgatcagg | tgtgggttgc | tcgctacatt | 660 |
| cttgagagga | tcaccgagat | cgccggcgtg | gtggtgacgt | tcgacccgaa | gccgatcccg | 720 |
| ggcgactgga | acggcgcggg | cgcccacacc | aactacagca | ccgagtccat | gaggaaggag | 780 |
| ggcgggtacg | aggtgatcaa | ggcggccatc | gagaagctga | gctgcggca | caaggagcac | 840 |
| atcgcggcct | acgcgagggg | caacgagcgc | cggctcaccg | gcaggcacga | aaccgccgac | 900 |
| atcaacacct | tcagctgggg | agtcgccaac | cgtggcgcgt | cggtgcgcgt | gggccgcgag | 960 |
| acggagcaga | acggcaaggg | ctacttcgag | gaccgccggc | cggcgtccaa | catggacccc | 1020 |
| tacgtcgtca | cctccatgat | cgccgaaacc | accatcgtct | ggaagcccta | a | 1071 |

<210> SEQ ID NO 131
<211> LENGTH: 1065
<212> TYPE: DNA
<213> ORGANISM: Delosperma nubigenum

<400> SEQUENCE: 131

| | | | | | |
|---|---|---|---|---|---|
| atgacaagcc | tcctcgacct | ccagaacctc | aacctcagcg | agtccaccga | gaaggtcatc | 60 |
| gccgaataca | tatggatagg | aggctccggt | atggacctca | gaagcaaggc | cagaacgctg | 120 |
| aacgacccgg | tggacgatcc | aaagaaactc | ccaaagtgga | actacgacgg | cagcagcacg | 180 |
| ggccaagcac | caggacaaga | cagcgaggtg | atcctctacc | cccaggcgat | cttcaaggac | 240 |
| ccattccgca | ggggcaacaa | catcctcgtc | atgtgcgacg | cctacactcc | acaaggtgag | 300 |
| ccgattccga | caaacaaaag | gtacaacgcc | gagaagatat | tcagcaaccc | ccaggtggcg | 360 |
| gcagaggaaa | cgtggtatgg | catcgaacag | gagtacaccc | tcctgcagaa | agacgtcaac | 420 |
| tggccagtgg | gctggccagt | cggtggcttc | ccgggtccac | aaggccccta | ttactgtggg | 480 |
| gtgggagccg | ataaagcttt | cggcagagac | atcgtggacg | cccactacaa | ggcctgcctc | 540 |
| tacgccggaa | taaacatcag | cggaaccaac | ggcgaggtca | tgccaggcca | gtgggaattc | 600 |
| caagtcggtc | cttccgtggg | gattagcgca | gccgatgaga | tctggatcgc | aaggtacatc | 660 |
| ctggagcgca | tcacagaaat | cgccggcgtt | gtcctcagct | tcgaccccaa | accgattccc | 720 |
| ggaggctgga | atggcgctgg | cgcacacaca | aactacagca | ccaaatcgat | gagagaagag | 780 |

```
ggcggctacg aggtcatcaa ggccgcgatc gagaagctcg gactcaagca caaggagcac      840
atagcagcct acggggaggg aaacgaaaga aggctgacgg ggaagcacga aacggcctcc      900
atcgacaact tcagctgggg agtcgccaac aggggcgcat cggtgagagt cggaagggat      960
acagagaagg aggggaaggg ctacttcgag gataggaggc ctgcgtctaa catggaccca     1020
tacattgtca ccagcatgat cgcagaaacg accatcctgg gctag                     1065

<210> SEQ ID NO 132
<211> LENGTH: 1074
<212> TYPE: DNA
<213> ORGANISM: Chlorophytum comosum Variegatum

<400> SEQUENCE: 132
atggcttccc tggtgaacga cctgatcaac ctcgacctca ccagcagcac agagaagatc       60
atcaccgagt acatatggat cggcggaagc gggatggaca taagatccaa ggcccggacc      120
ttgcctggcc ctgtgactga tccaagccag ctccccaagt ggaactacga cggttcatcg      180
actggtcagg ccccaggaga ggactcagag gtcatcctct accccaggc catcttcaag       240 gacccattcc gcaagggcaa caacatactc gtcatgtgcg actgttacac tcctgcaggc      300
gaaccaatcc caacaaacaa aagggcgaag gcggcgaaaa tattctcgcg cccggaggtg      360
gcagcagagg ttacttggta cggcatcgag caggagtaca ccctcctcca gaaagacgtc      420
aagtggcccc tcggatggcc agtgggcggc tatcccggac ccagggtcc atattactgc       480 gcagctggcg cggataaagc attcggcaga gacgttgtgg atgcacacta caaagcatgc      540
ctctacgccg gcataaacat cagcggaatc aacggggaag tcatgccagg ccagtgggaa      600
ttccaggtcg gtccatctgt gggaataagc gctggggacg aggtttgggt cgcaaggtat      660
atcctggagc gcataacaga gctggccggg gtcgttgtca gcttcgaccc caagccaatc      720
gaaggtgatt ggaacggcgc aggagcccac accaactaca gcaccaagag catgagagag      780
gacggcggct atgaggtcat taaaaaggcc atcgagaaac tcgggctcag gcacaaggag      840
cacatagcag cttatggcga ggggaacgaa aggaggctca ccgggaagca cgaaaccgcc      900
gacatcaaca ccttcaaatg gggagtggcc aaccggggag cctcgatcag agtgggccgc      960
gacacagaga agaacggcaa ggggtacttc gaggatcgga ggccagctag caacatggac     1020
ccctacgtcg tgacatctat ggtggcggac accaccatct gctggaagcc gtag           1074

<210> SEQ ID NO 133
<211> LENGTH: 1071
<212> TYPE: DNA
<213> ORGANISM: Peperomia caperata

<400> SEQUENCE: 133
atgagcctca taaacgacct gatcaacctc aacctctccg acaccaccga caagatcatc       60
gccgaataca tatggatagg cggttcaggc cttgacctca gatcaaaggc ccgcaccttg      120
ccaggaccag tgagcgaccc gagcgagctc cccaagtgga actacgacgg atcgtctacg      180
ggccaggcgc ctggagagga ttccgaggtg atcctgtacc cccaggccat cttcaaggac      240
ccattcaggc gcggcaacaa catcctcgtc atctgcgacg catacgccc agcagggag        300 cctatcccct cgaacaagag atataacgcc gccaagatat tcagccaccc ggacgtcgtc      360
gcagaagtgc cctggtacgg catagaacag gagtacaccc tcctccagaa agaggtcaag      420
tggccactcg ggtggccagt gggcggattc cccggaccac agggaccgta ctattgtggc      480
gtcggcgcag ataaagcttt cggccgcgac atagtcgact cgcactacaa agcatgcctg      540
```

```
tacgccggcg tgaatatcag cggcatcaac ggcgaggtca tgccaggcca gtgggaattc      600
caggttggcc cctctgtcgg tattagcgcc ggcgatgaaa tctggatcgc ccgatacatt      660
ctcgagcgca tcacagaaat cgcaggggtc gtgctcagcc tcgacccaaa gccaatccag      720
ggagattgga acgcgctgg cgcccacacc aactacagca ccgagtccat gagaaacgac       780
ggcggctacg agatcatcaa gaaggccatc gagaagctcg gcctgaaaca caaggagcac      840
atagcggcgt atggcgaggg caatgaaaga agattgacgg gccgccacga aacgccgac       900 atcaacacgt tcctttgggg ggttgcaaat cgcggagcat cgatcagagt gggcagagac      960
acagagaaag cggggaaggg gtacttcgag gatcgcagac cggcatctaa catggacccc      1020
tacgtcgtca ccagcaagat cgccgaaacg accatcctgt ggaagcccta g              1071

<210> SEQ ID NO 134
<211> LENGTH: 1071
<212> TYPE: DNA
<213> ORGANISM: Amaranthus hypochondriacus

<400> SEQUENCE: 134
atgagcctcc tgaacgacct tattaacctc aacctcagcg aaacgacgga caagatcatc      60
gccgaataca tatggatagg tggatcgggg ctggatatga aagcaaggc gaggaccctg       120 ccgggcccgg tgtccgaccc gtccgagctc cccaagtgga actacgacgg aagctcgaca      180
aaccaagctc cgggagacga cagcgaggtg atcatctacc cccaggccat cttcaaggac      240
ccattccgcc ggggggaacaa catactcgtc atgtgcgacg catacacgcc agccggtgaa      300
ccaattccca caaacaaacg cttcaacgcc aacaagatat tctcccaccc cgacgtcgtg      360
gcagaagagc cctggtacgg aatcgaacag gagtacacgc tcctgcagaa agacatcaac      420
tggcccctgg gctggccagt cggaggtttc ccgggcccac agggaccttta ttactgcggg     480 gtcggagctg acaagtcgtt tggcagagac atcgtcgacg cgcactacaa agcttgcctc     540
tacgcgggga tcaacataag cggaattaac ggcgaggtca tgccagggca atgggagttc      600
caagtcggac ctacggtcgg cattagctca ggcgatcaag tgtgggtcgc aagatacatt      660
ctcgagagga tcgccgaagt tgcgggtgca attgtcagct tcgacccaaa gccggtgaag      720
ggagactgga acggagcggg ggctcacaca aactacagca ccaagtctat gagaaacgac      780
ggcggcatcg acgtcatcaa gaaggcaatc gagaagctca gcctccggca caagagcat      840 atcagcagct acggggaggg aaacgaaaga aggctcaccg gaaggcacga aacagccgac     900
atcggcacct tcagctgggg agttgcgaac agaggtgcca gcgttagagt cggtagagac     960
acagaaaagg ccgggaaggg ctacttcgag gatagacggc cggcttcaaa catggacccc    1020
tacgtcgtca ccagcatgat cgccgaaacg accatcatct ggaagccgta g              1071

<210> SEQ ID NO 135
<211> LENGTH: 356
<212> TYPE: PRT
<213> ORGANISM: Glycine max
<220> FEATURE:
<221> NAME/KEY: VARIANT
<222> LOCATION: (3)..(3)
<223> OTHER INFORMATION: X is any amino acid
<220> FEATURE:
<221> NAME/KEY: VARIANT
<222> LOCATION: (5)..(5)
<223> OTHER INFORMATION: X is any amino acid
<220> FEATURE:
<221> NAME/KEY: VARIANT
<222> LOCATION: (8)..(8)
```

```
<223> OTHER INFORMATION: X is any amino acid
<220> FEATURE:
<221> NAME/KEY: VARIANT
<222> LOCATION: (11)..(11)
<223> OTHER INFORMATION: X is any amino acid
<220> FEATURE:
<221> NAME/KEY: VARIANT
<222> LOCATION: (14)..(14)
<223> OTHER INFORMATION: X is any amino acid
<220> FEATURE:
<221> NAME/KEY: VARIANT
<222> LOCATION: (15)..(15)
<223> OTHER INFORMATION: X is any amino acid
<220> FEATURE:
<221> NAME/KEY: VARIANT
<222> LOCATION: (18)..(18)
<223> OTHER INFORMATION: X is any amino acid
<220> FEATURE:
<221> NAME/KEY: VARIANT
<222> LOCATION: (26)..(26)
<223> OTHER INFORMATION: X is any amino acid
<220> FEATURE:
<221> NAME/KEY: VARIANT
<222> LOCATION: (29)..(29)
<223> OTHER INFORMATION: X is any amino acid
<220> FEATURE:
<221> NAME/KEY: VARIANT
<222> LOCATION: (33)..(33)
<223> OTHER INFORMATION: X is any amino acid
<220> FEATURE:
<221> NAME/KEY: VARIANT
<222> LOCATION: (41)..(41)
<223> OTHER INFORMATION: X is any amino acid
<220> FEATURE:
<221> NAME/KEY: VARIANT
<222> LOCATION: (55)..(55)
<223> OTHER INFORMATION: X is any amino acid
<220> FEATURE:
<221> NAME/KEY: VARIANT
<222> LOCATION: (79)..(79)
<223> OTHER INFORMATION: X is any amino acid
<220> FEATURE:
<221> NAME/KEY: VARIANT
<222> LOCATION: (84)..(84)
<223> OTHER INFORMATION: X is any amino acid
<220> FEATURE:
<221> NAME/KEY: VARIANT
<222> LOCATION: (108)..(108)
<223> OTHER INFORMATION: X is any amino acid
<220> FEATURE:
<221> NAME/KEY: VARIANT
<222> LOCATION: (109)..(109)
<223> OTHER INFORMATION: X is any amino acid
<220> FEATURE:
<221> NAME/KEY: VARIANT
<222> LOCATION: (113)..(113)
<223> OTHER INFORMATION: X is any amino acid
<220> FEATURE:
<221> NAME/KEY: VARIANT
<222> LOCATION: (118)..(118)
<223> OTHER INFORMATION: X is any amino acid
<220> FEATURE:
<221> NAME/KEY: VARIANT
<222> LOCATION: (123)..(123)
<223> OTHER INFORMATION: X is any amino acid
<220> FEATURE:
<221> NAME/KEY: VARIANT
<222> LOCATION: (126)..(126)
<223> OTHER INFORMATION: X is any amino acid
<220> FEATURE:
<221> NAME/KEY: VARIANT
<222> LOCATION: (161)..(161)
<223> OTHER INFORMATION: X is any amino acid
<220> FEATURE:
<221> NAME/KEY: VARIANT
<222> LOCATION: (171)..(171)
<223> OTHER INFORMATION: X is any amino acid
<220> FEATURE:
<221> NAME/KEY: VARIANT
```

<222> LOCATION: (172)..(172)
<223> OTHER INFORMATION: X is any amino acid
<220> FEATURE:
<221> NAME/KEY: VARIANT
<222> LOCATION: (230)..(230)
<223> OTHER INFORMATION: X is any amino acid
<220> FEATURE:
<221> NAME/KEY: VARIANT
<222> LOCATION: (268)..(268)
<223> OTHER INFORMATION: X is any amino acid
<220> FEATURE:
<221> NAME/KEY: VARIANT
<222> LOCATION: (271)..(271)
<223> OTHER INFORMATION: X is any amino acid
<220> FEATURE:
<221> NAME/KEY: VARIANT
<222> LOCATION: (278)..(278)
<223> OTHER INFORMATION: X is any amino acid
<220> FEATURE:
<221> NAME/KEY: VARIANT
<222> LOCATION: (286)..(286)
<223> OTHER INFORMATION: X is any amino acid
<220> FEATURE:
<221> NAME/KEY: VARIANT
<222> LOCATION: (305)..(305)
<223> OTHER INFORMATION: X is any amino acid
<220> FEATURE:
<221> NAME/KEY: VARIANT
<222> LOCATION: (320)..(320)
<223> OTHER INFORMATION: X is any amino acid

<400> SEQUENCE: 135

Met Ser Xaa Leu Xaa Asp Leu Xaa Asn Leu Xaa Leu Ser Xaa Xaa Thr
1               5                   10                  15

Glu Xaa Val Ile Ala Glu Tyr Ile Trp Xaa Gly Gly Xaa Gly Met Asp
            20                  25                  30

Xaa Arg Ser Lys Ala Arg Thr Leu Xaa Gly Pro Val Ser Asp Pro Ser
        35                  40                  45

Glu Leu Pro Lys Trp Asn Xaa Asp Gly Ser Ser Thr Gly Gln Ala Pro
    50                  55                  60

Gly Glu Asp Ser Glu Val Ile Leu Tyr Pro Gln Ala Ile Phe Xaa Asp
65                  70                  75                  80

Pro Phe Arg Xaa Gly Asn Asn Ile Leu Val Ile Cys Asp Ala Tyr Thr
                85                  90                  95

Pro Ala Gly Glu Pro Ile Pro Thr Asn Lys Arg Xaa Xaa Ala Ala Lys
            100                 105                 110

Xaa Phe Ser His Pro Xaa Val Val Ala Glu Xaa Pro Trp Xaa Gly Ile
        115                 120                 125

Glu Gln Glu Tyr Thr Leu Leu Gln Lys Asp Ile Gln Trp Pro Leu Gly
    130                 135                 140

Trp Pro Val Gly Gly Phe Pro Gly Pro Gln Gly Pro Tyr Tyr Cys Gly
145                 150                 155                 160

Xaa Gly Ala Asp Lys Ala Phe Gly Arg Asp Xaa Xaa Asp Ala His Tyr
                165                 170                 175

Lys Ala Cys Ile Tyr Ala Gly Ile Asn Ile Ser Gly Ile Asn Gly Glu
            180                 185                 190

Val Met Pro Gly Gln Trp Glu Phe Gln Val Gly Pro Ser Val Gly Ile
        195                 200                 205

Ser Ala Gly Asp Glu Ile Trp Ala Ala Arg Tyr Ile Leu Glu Arg Ile
    210                 215                 220

Thr Glu Ile Ala Gly Xaa Val Val Ser Phe Asp Pro Lys Pro Ile Lys
225                 230                 235                 240

Gly Asp Trp Asn Gly Ala Gly Ala His Thr Asn Tyr Ser Thr Lys Ser

-continued

```
                245                 250                 255
Met Arg Glu Asp Gly Gly Tyr Glu Val Ile Lys Xaa Ala Ile Xaa Lys
            260                 265                 270

Leu Gly Lys Lys His Xaa Glu His Ile Ala Ala Tyr Gly Xaa Gly Asn
        275                 280                 285

Glu Arg Arg Leu Thr Gly Arg His Glu Thr Ala Asp Ile Asn Thr Phe
    290                 295                 300

Xaa Trp Gly Val Ala Asn Arg Gly Ala Ser Val Arg Val Gly Arg Xaa
305                 310                 315                 320

Thr Glu Lys Ala Gly Lys Gly Tyr Phe Glu Asp Arg Arg Pro Ala Ser
            325                 330                 335

Asn Met Asp Pro Tyr Val Val Thr Ser Met Ile Ala Asp Thr Thr Ile
            340                 345                 350

Leu Trp Lys Pro
            355
```